United States Patent [19]
Kusaka et al.

[11] Patent Number: 5,130,735
[45] Date of Patent: Jul. 14, 1992

[54] AUTOMATIC FOCUS STATE DETECTING APPARATUS

[75] Inventors: Yosuke Kusaka; Yoshio Matsuzawa; Masaru Muramatsu, all of Yokohama, Japan

[73] Assignee: Nikon Corporation, Tokyo, Japan

[21] Appl. No.: 759,116

[22] Filed: Sep. 12, 1991

Related U.S. Application Data

[63] Continuation of Ser. No. 604,336, Oct. 26, 1990, abandoned, which is a continuation of Ser. No. 413,759, Sep. 28, 1989, abandoned.

[30] Foreign Application Priority Data

Sep. 29, 1988 [JP] Japan .................................. 63-247829
Nov. 25, 1988 [JP] Japan .................................. 63-297342
Mar. 27, 1989 [JP] Japan .................................. 1-75575

[51] Int. Cl.⁵ .............................................. G03B 13/00
[52] U.S. Cl. ................................. 354/402; 354/408; 354/430
[58] Field of Search ................. 354/402, 403, 404, 405, 354/406, 407, 408, 430; 358/227

[56] References Cited

U.S. PATENT DOCUMENTS 4,812,912  3/1989  Iida et al. ............................ 354/402
4,831,403  5/1989  Ishida et al. ......................... 354/402
4,872,058  10/1989  Baba et al. ......................... 354/402

Primary Examiner—L. T. Hix
Assistant Examiner—David M. Gray
Attorney, Agent, or Firm—Shapiro and Shapiro

[57] ABSTRACT

An automatic focus state detecting apparatus is capable of focus detection with respect to an object in different focus state detection areas, such as a narrow area or a wide area of an object field, or in areas extending in different directions in the object field. The focus state detecting area may be selected automatically or manually, and the automatic selection may depend upon whether the object is stationary or moving, and the direction of movement. Automatic switching between narrow and wide focus state detecting areas may occur after an in-focus state or a nearly in-focus state is obtained in the narrow area, after a predetermined time has elapsed from the selection of the narrow area, or after a predetermined number of focus detecting operations in the narrow area. Defocus amounts may be calculated for a plurality of sub-areas of the wide area. The defocus amount or a lens driving amount may be limited when the wide area is selected.

51 Claims, 61 Drawing Sheets

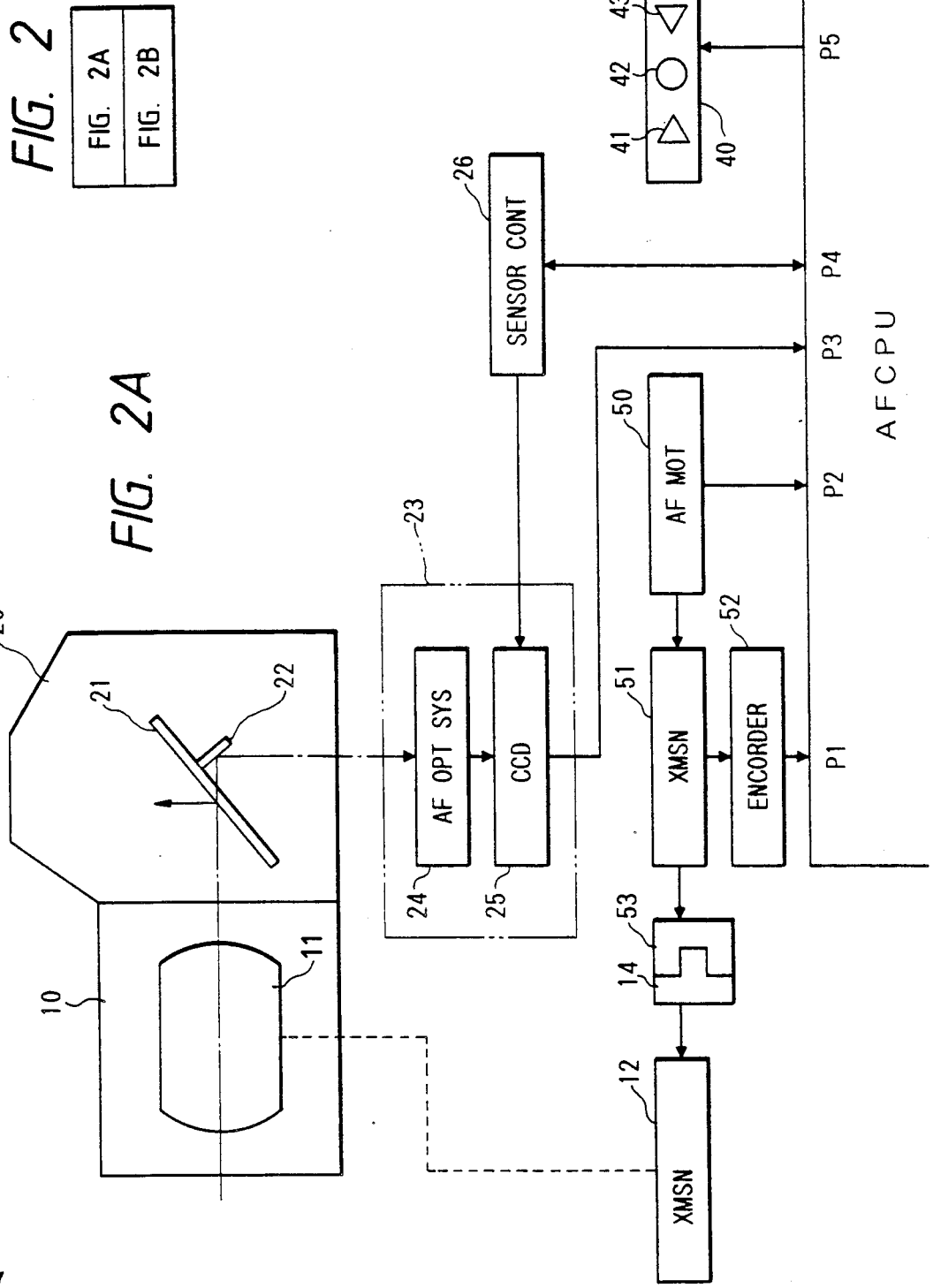

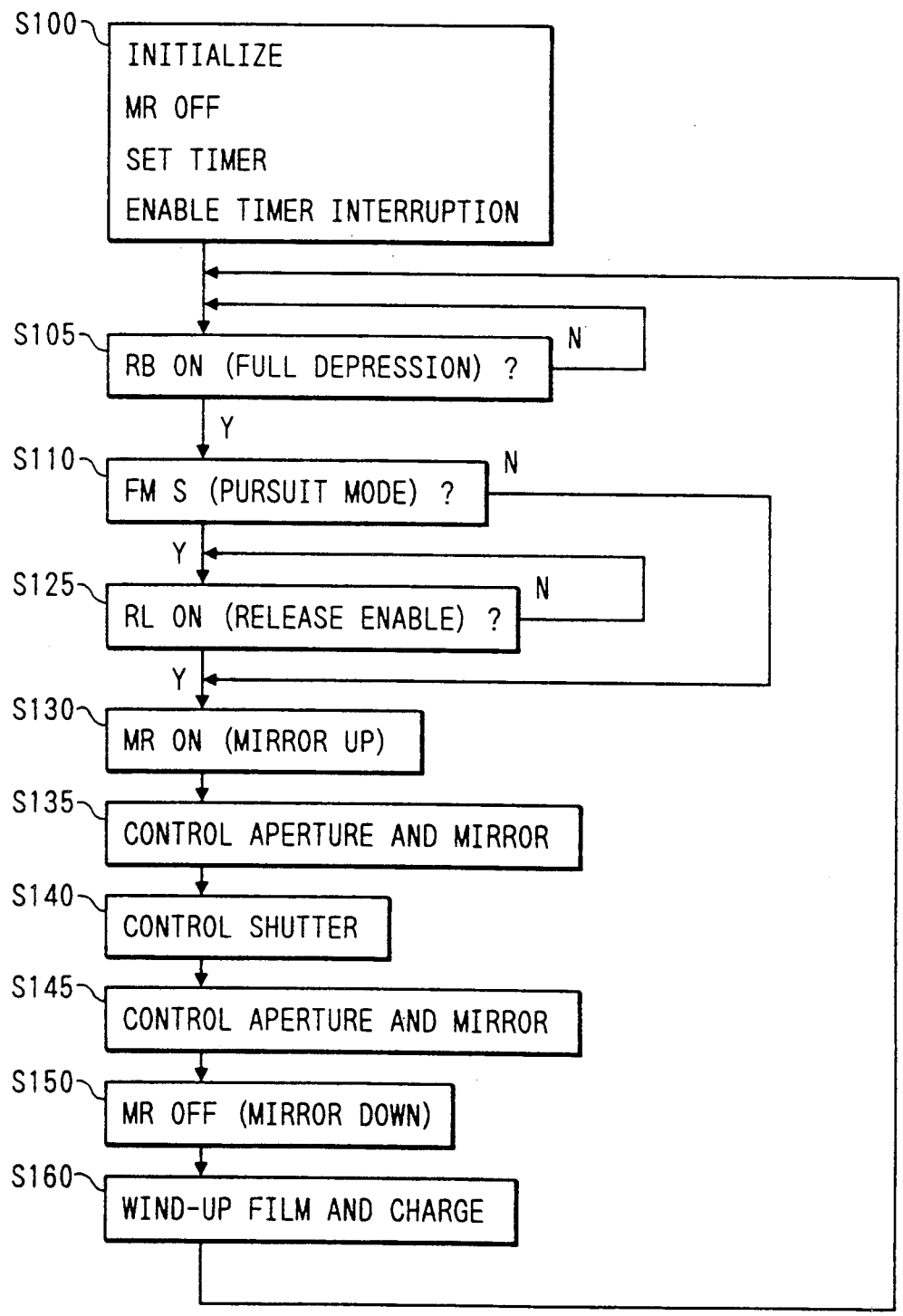

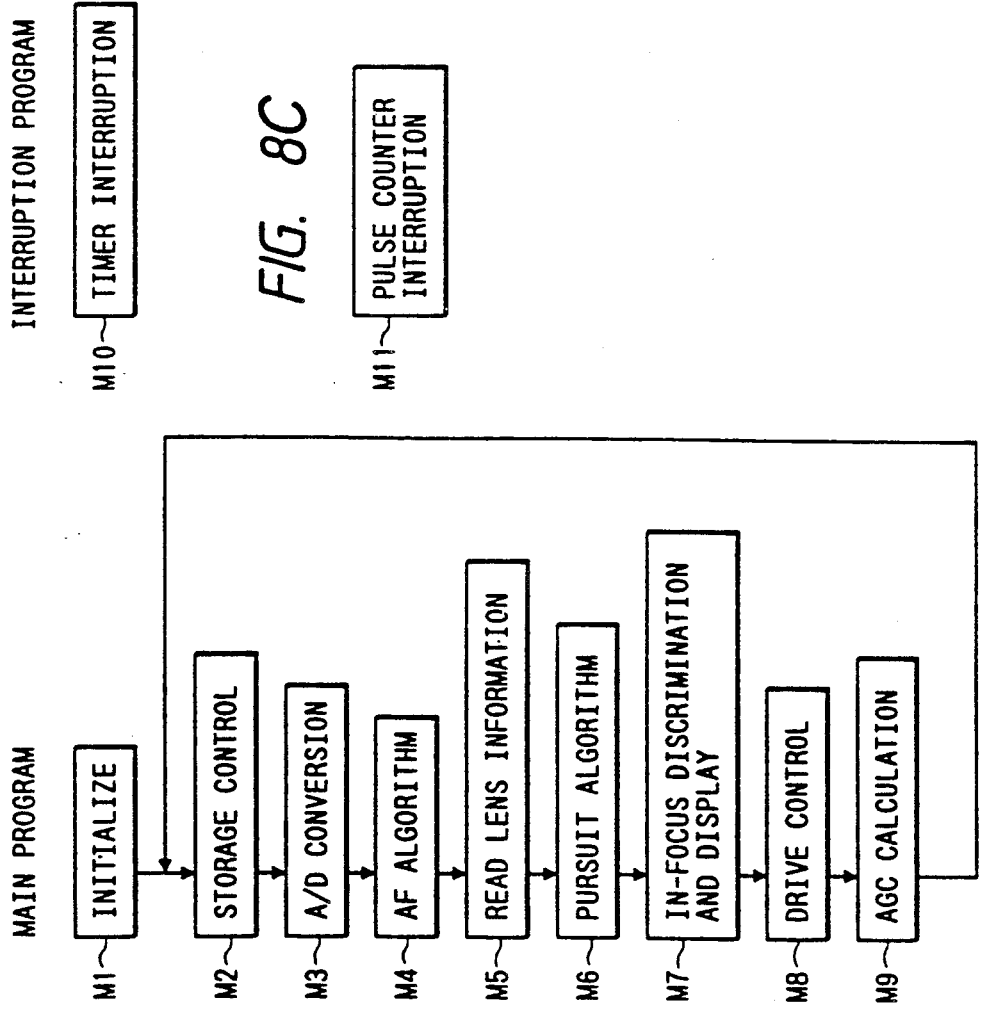
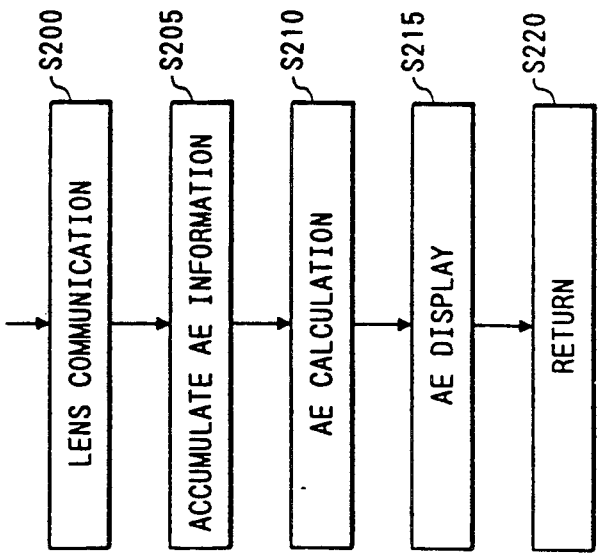

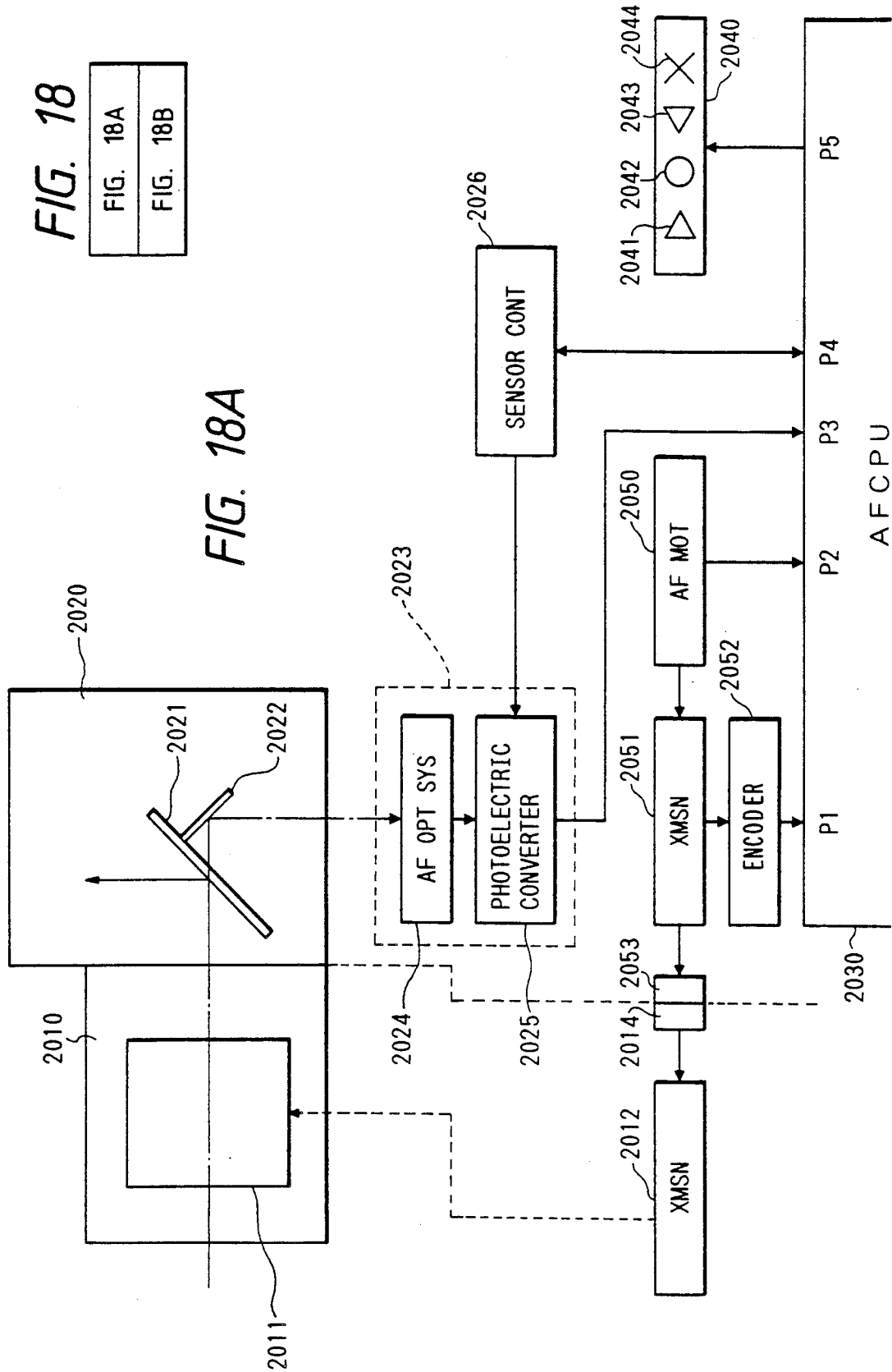

|    | a1 | a2 |   |   | ai | aj |   |   |   |   | ak | al |   |   | an |
|----|----|----|---|---|----|----|---|---|---|---|----|----|---|---|----|
| b1 | L | L | L | L | L |   |   |   |   |   |   |   |   |   |   |
| b2 | L | L | L | L | L | L |   |   |   |   |   |   |   |   |   |
|    | L | L | L | L | L | L | L |   |   |   |   |   |   |   |   |
|    | L | L | L | L | L | L | L | L |   |   |   |   |   |   |   |
| bi | L | L | L | L | L | L | L |   |   |   |   |   |   |   |   |
| bj |   | L | L | L | L | L |   |   |   |   |   |   |   |   |   |
|    |   |   | L | L | L |   |   |   |   |   |   |   |   |   |   |
|    |   |   |   | L |   |   |   |   |   |   |   |   |   |   |   |
|    |   |   |   |   |   |   |   |   |   |   |   | R |   |   |   |
|    |   |   |   |   |   |   |   |   |   |   | R | R | R |   |   |
| bk |   |   |   |   |   |   |   |   |   |   | R | R | R | R | R |
| bl |   |   |   |   |   |   |   |   |   | R | R | R | R | R | R | R |
|    |   |   |   |   |   |   |   |   | R | R | R | R | R | R | R | R |
|    |   |   |   |   |   |   |   |   |   | R | R | R | R | R | R |
|    |   |   |   |   |   |   |   |   |   | R | R | R | R | R | R |
| bn |   |   |   |   |   |   |   |   |   |   | R | R | R | R | R |

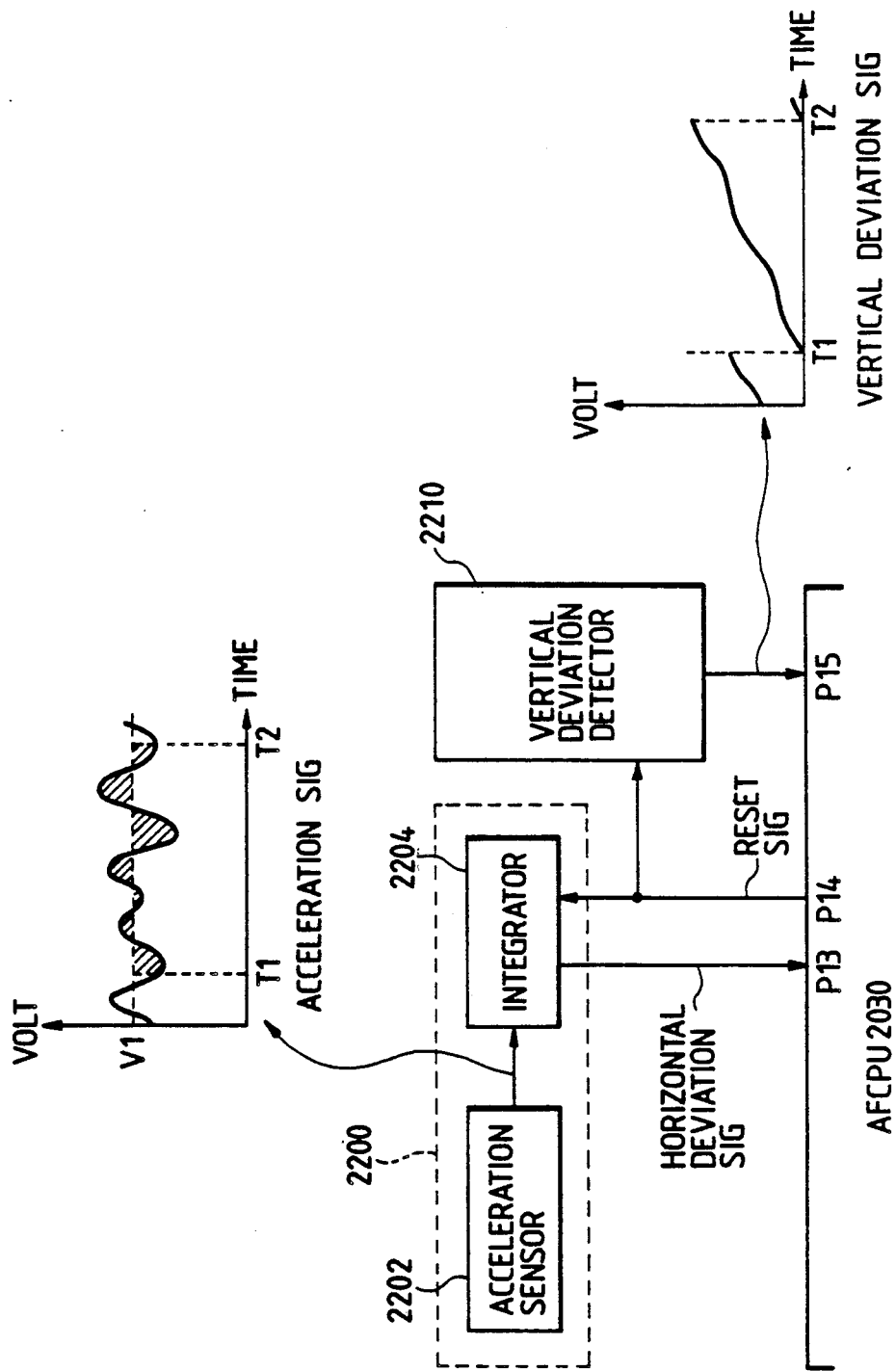

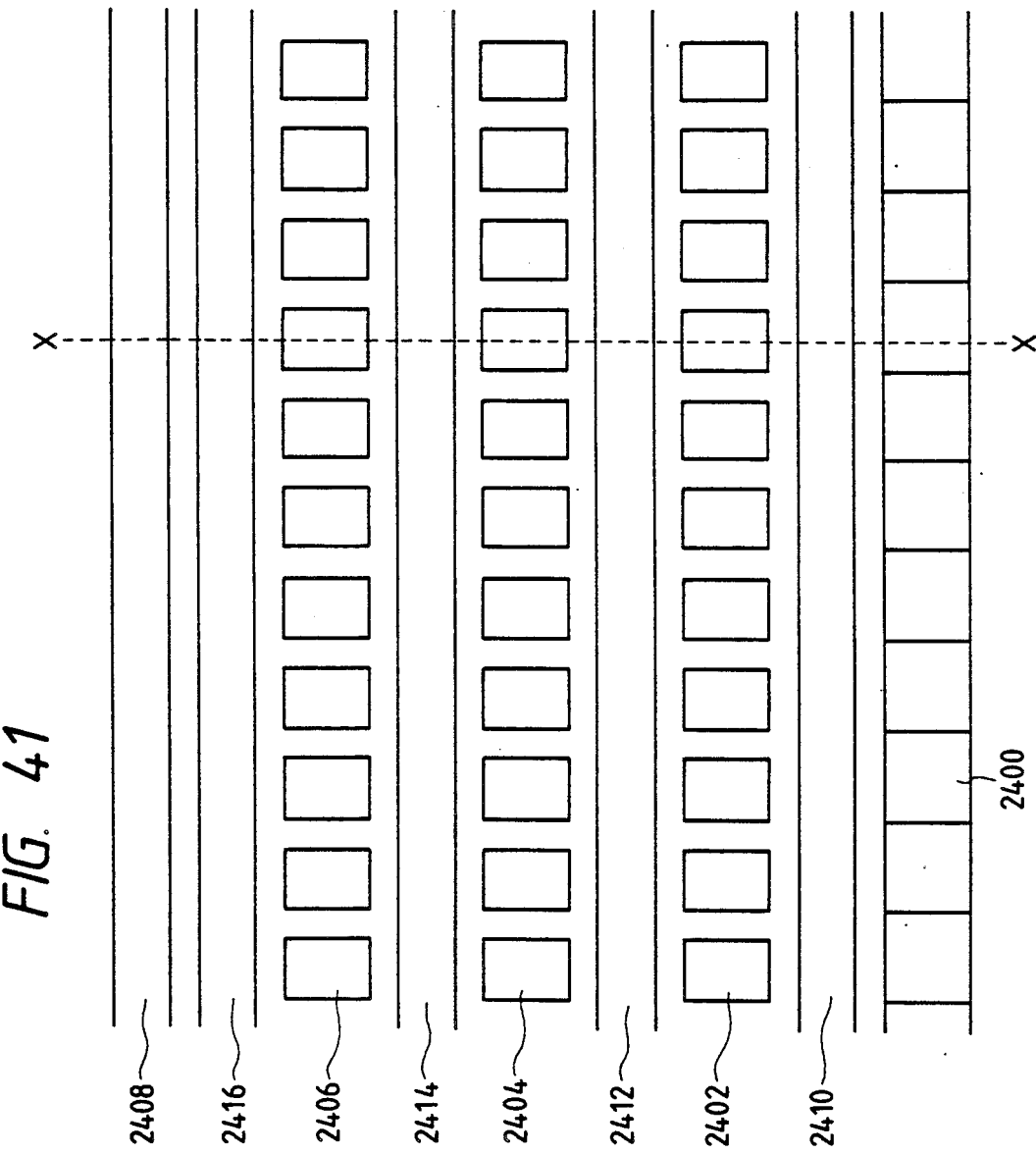

FIG. 51A
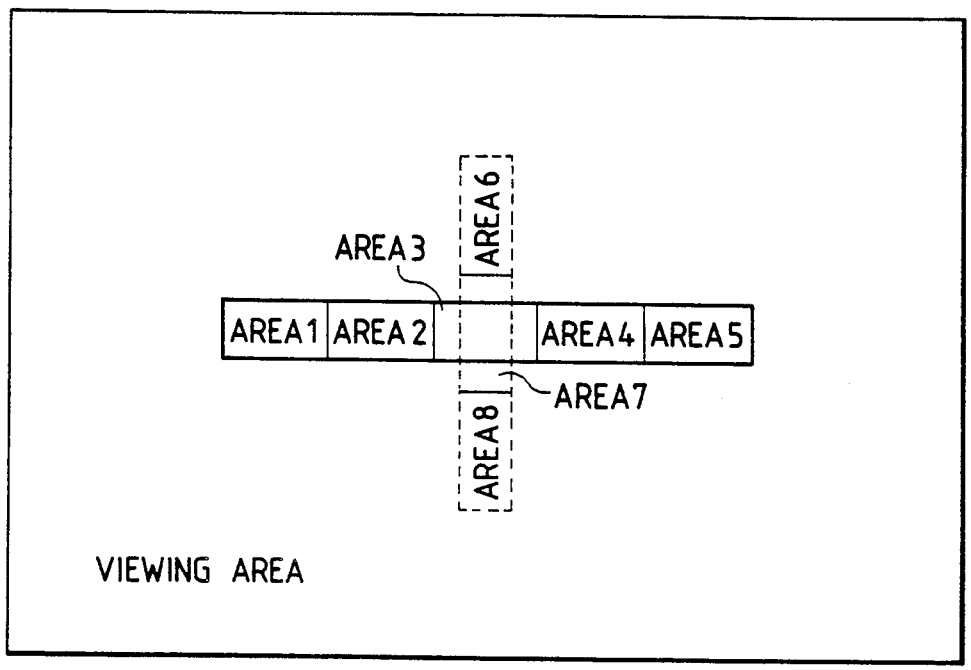
VIEWING AREA
FIG. 51B
1ST FOCUS DETECTION AREA
AREA 3 + AREA 7
FIG. 51C
2ND FOCUS DETECTION AREA
AREA 1~8
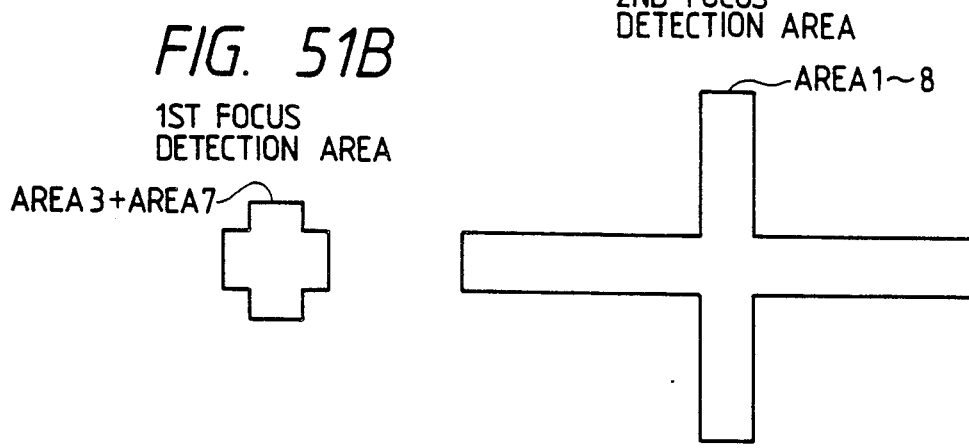
FIG. 51D
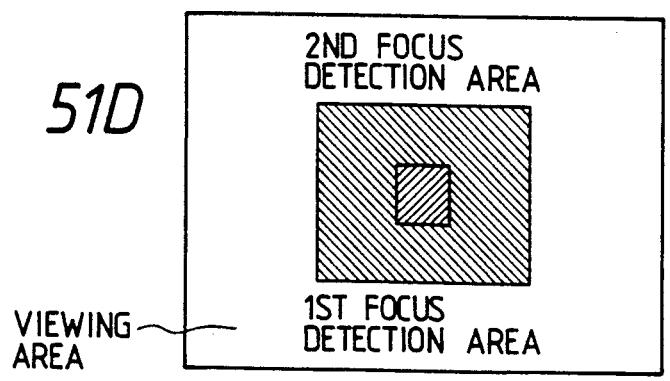
2ND FOCUS DETECTION AREA
1ST FOCUS DETECTION AREA
VIEWING AREA

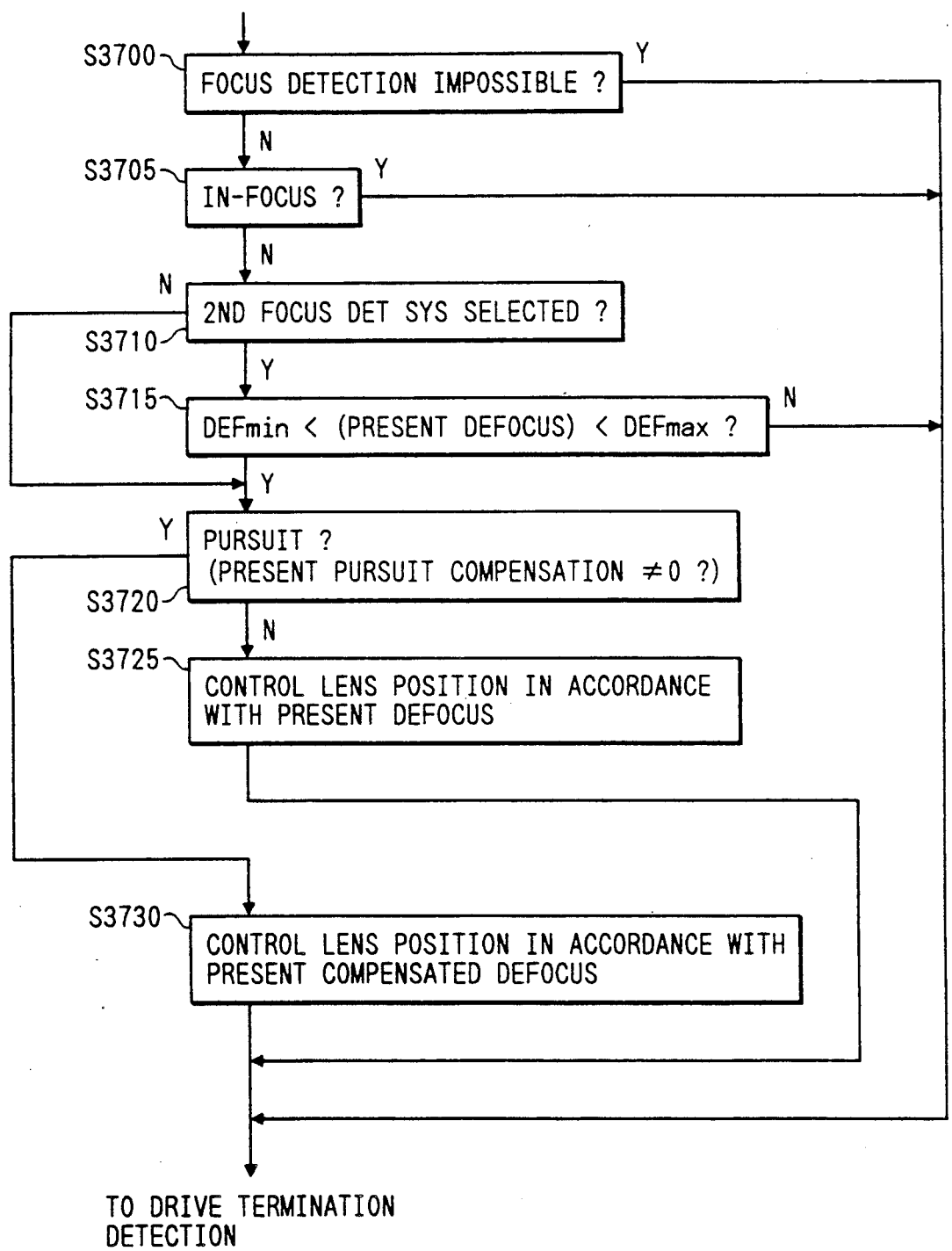

ns, or in the
AUTOMATIC FOCUS STATE DETECTING APPARATUS

This is a continuation of application Ser. No. 604,336 filed Oct. 26, 1990, which is a continuation of application Ser. No. 413,759 filed Sep. 28, 1989, both of which are now abandoned.

BACKGROUND OF THE INVENTION

1. Field of the Invention

The present invention relates to an automatic focus state detecting apparatus for use in a camera or the like.

2. Related Background Art

There is already known an automatic focus state detecting apparatus having a relatively narrow first focus state detecting area and a wider second focus state detecting area, both in the photographing field and either of which is selectable by the photographer, thus detecting the amount of defocus of the image plane of a photographing optical system with respect to a predetermined plane in the selected focus state detecting area, and moving the photographing optical system to the focused position based on thus detected amount of defocus.

However, such automatic focus state detecting apparatus the following drawbacks in either detecting area:

1) When the relatively narrow first focus state detecting area is selected by the photographer:

Because the area is relatively narrow, a stationary or slow-moving object can always be caught in the area without presence of an undesired object, but it is difficult to hold a fast-moving object in the detecting area. If the object runs out of the detecting area, the apparatus becomes unable to detect the focus state, thus resulting in unnecessary scanning motions of the lens, or focusing to other objects in the background.

2) When the relatively wide second focus state detecting area is selected by the photographer:

It is easier to retain even a fast-moving object always in the detecting area, but, in case of a stationary or slow-moving object, the possibility of presence of other objects becomes higher as the detecting area is wider. If the area contains another object which is not desired by the photographer, the lens may be focused to such another object.

Also the Japanese Patent Application Sho 63-17418 discloses an automatic focus state detecting device capable of forming, in the photographing field, a relatively narrow first focus state detecting area and a wider second focus state detecting area. In response to a half push of the shutter release button, the apparatus selects the narrower first area, and, if the focus state is undetectable, the wider second detecting area is selected. The apparatus detects the amount of defocus of the image plane of the photographing optical system with respect to a predetermined plane in the selected detecting area, and moves the optical system to the focused position based on the detected amount of defocus.

However, such automatic focus state detecting apparatus still has the following drawback. If the focus state detection is not possible because of low contrast of the image of the object formed on the focus state detecting device such as a CCD, it is still difficult to detect the focus state of the object in the wider second detecting area as the desired object is often affected by other objects of higher contrast.

Furthermore there is also known an automatic focus state detecting apparatus capable of so-called following drive for moving a photographing lens without delay to a moving object. Such apparatus repeatedly detects the amount of defocus of the photographing lens, and discriminates whether the object is moving, from the present and past amounts of defocus. If the object is moving, it determines a correcting value, based on the present and past amounts of defocus, for correcting the position of the photographing lens toward the moving object, and moves the photographing lens based on the amount of defocus and the determined correcting value. There is further known an automatic focus state detecting apparatus of such following drive type, combined with narrow and wide detecting areas mentioned above.

However, such conventional apparatus has the following drawback, because the following drive and the switching of detecting area are conducted independently. When the following drive operation is started in the narrower first focus state detecting area, the photographer has to change the position of the camera according to the movement of the object, in order to retain the moving object in the first detecting area, but this operation is difficult because the first detecting area is narrow. If the object escapes even momentarily from the first detecting area, the following drive is interrupted because the focus state detection is made on other objects in the background or becomes impossible, and smooth following drive cannot be achieved for this reason. On the other hand, when the wider second focus state detecting area is selected, it is easier to hold the object in that area because it is wider. However, if the main object starts to move from a stationary state, it is difficult to discriminate whether the object is moving because the detecting area contains other stationary objects, so that the following drive cannot be started immediately, without delay with respect to the movement of the object.

SUMMARY OF THE INVENTION

An object of the present invention is to provide a focus state detecting apparatus capable of securely continuing the focus state detection even when the object escapes from the focus state detecting area.

Another object of the present invention is to provide an automatic focus state detecting apparatus capable of effective transition from the narrower focus state detecting area to the wider detecting area, thereby enabling secure focusing to the main object.

Still another object of the present invention is to provide an automatic focus state detecting apparatus capable of using a wide focus state detecting area for a moving object and a narrow focus state detecting area for a stationary object, thereby improving the following capability for the object.

FIG. 1A shows the concept of a first example of the automatic focus state detecting apparatus of the present invention, provided with focus state detecting means 101 capable of focus state detection in a narrow focus state detecting area and a wide focus state detecting area in the object field. The apparatus is further provided with discrimination means 102 for discriminating whether an object present in either detecting area is a moving object; and selector means 103 for causing the focus state detecting means 101 to effect the focus state detection in the wider detecting area for an object identified as moving by said discrimination means, or in the narrower detecting area for an object identifed as stationary by said discrimination means.

FIG. 1B shows the concept of a second example, in which the automatic focus state detecting apparatus is provided with photoelectric conversion means 204 for converting, into electrical signals, the image of an object 206 formed through a photographing lens 205; defocus amount calculating means 201 for repeatedly calculating the amount of defocus corresponding to the distance between the plane of image of the object 206 and the preset focal plane, based on the electrical signals released in succession from the conversion means 204; and selector means 203 capable of selecting either the narrow focus state detecting area or the wide focus state detecting area in the object field and causing said calculating means 201 to calculate the defocus amount of the object in said narrow detecting area when it is selected, or the defocus amount of the object in said wide detecting area when it is selected. The apparatus is further provided with discrimination means 202 for discriminating whether the object 206 is moving, and is adapted to cause the selector means 203 to automatically select the wide or narrow detecting area respectively when the discrimination means 202 identifies the object 206 as moving or stationary.

FIG. 1C shows the concept of a third example, in which the automatic focus state detecting apparatus is provided with photoelectric conversion means 304 for converting, into electrical signals, the image of an object 306 formed through a photographing lens 305; and defocus amount calculating means 301 for repeatedly calculating the amount of defocus corresponding to the distance between the plane of image of the object 306 and the preset focal plane, based on the electrical signals released in succession from the conversion means 304. There are further provided discrimination means 302 for discriminating whether the object 306 is moving, based on the defocus amounts repeatedly released from the calculation means 301; selector means 303 capable of selecting either a wide focus state detecting area or a narrow detecting area in the object field and adapted to cause the calculation means 301 to calculate the defocus amount of the object 306 either in said wide detecting area or in said narrow detecting area respectively when the discrimination means 302 identifies the object 306 as moving or stationary correction means 307 for predicting the variation in the defocus amount resulting from the movement of the object 306, based on the defocus amounts repeatedly released from the calculation means 301 and for correcting the defocus amount from the calculation means 301 with the predicted variation; and drive amount calculation means 308 for calculating the drive amount of the photographing lens 305 based on the defocus amount corrected by the correction means 307.

In a 4th example of the present invention, a camera equipped with a photographing optical system for forming the image of an object on a predetermined plane; a focus state detecting optical system for forming the image of an object with the light beam passing through said photographing optical system; photoelectric conversion means composed of plural photosensor elements and adapted to generate object image signals corresponding to the intensity distribution of said object image; and focus state operating means for applying a predetermined operation to said object image signals, thereby detecting the defocus amount of a current object image plane with respect to the aforementioned predetermined plane, is provided with vibration detection means for detecting the movement of said photographing optical system or the relative movement between said optical system and the object; and selector means adapted, in focus state detection by said focus state detection means based on the object image signals from a relatively narrow first focus state detecting area among plural detecting areas defined on said photoelectric conversion means, if a relative movement is detected by said vibration detection means, to switch to a wider second detecting area for focus state detection. In such focus state detecting apparatus as explained above, if vibration of the optical system or relative movement of the optical system and the object occurs in the course of focus state detection in the narrow detecting area, such vibration or movement is detected by the vibration detection means, and, in response, the wider detecting area is automatically selected for focus state detection. Consequently, the photographer is not required to retain the object always in the narrow detecting area, and the convenience of use is thus improved.

A 5th example of the automatic focus state detecting apparatus of the present invention is schematically shown in FIG. 47. The apparatus is provided with a photographing optical system 3501 for forming the image of an object on a predetermined plane; drive means 3502 for focusing said optical system 3501; first focus state detecting means 3503 for detecting the amount of defocus of the image plane of said photographing optical system 3501 with respect to a predetermined plane, in a relative narrow first focus state detecting area defined in the object field; second focus state detecting means 3504 for detecting the amount of defocus of the image plane of said optical system 3501 with respect to a predetermined plane, in a second focus state detecting area wider than said first detecting area; selector means 3505 for selecting the first or second focus state detecting means; drive control means 3506 for controlling the drive amount of the drive means according to the defocus amount detected by the focus state detecting means; and control means 3507 for limiting the defocus amount or lens drive amount enabling focus state detection when the second detecting means 3504 is selected by the selector means 3505.

In the above-explained apparatus, the defocus amount or lens drive amount is limited when the detection is shifted from the first detecting means 3503 to the second detecting means 3504, so that, once the main object is captured in the wider second detecting area, the result of focus state detection is not affected by other objects eventually present in the wider detecting area. The focusing to the desired object is therefore made easier.

In the following, there will be explained a 6th example, which is a variation of the 5th embodiment, with reference to FIG. 47. In this example, in addition to the photographing optical system 3501, drive means 3502, and first and second focus state detecting means 3503, 3504, there are further provided discrimination means 3508 for discriminating whether focusing is completed; selector means 3505 for selecting the first focus state detecting means until the focused state is identified by said discrimination means 3508 and selecting the second detecting means 3504 after the identification of the focused state; and drive control means 3506 for controlling the drive amount of the drive means, 3502 according to the defocus amount of the detecting means 3503 or 3504.

In this example, when the focusing is completed with the first focus state detecting means 3503, the second detecting means 3504 is selected. Consequently, if an undesired object is captured in the focus state detection after the shifting to the wider detecting area, the influence of such undesired object is not direct, and the focusing to the main object is easier.

In a 7th example, which is a variation of the 6th embodiment and which will be explained with reference to FIG. 47, there is further provided limiting means 3507 for limiting the defocus amount or lens drive amount enabling focus state detection when the second focus state detecting means 3504 is selected by the selector means 3505.

In this example, a large defocus amount is not obtained corresponding to an undesired object when the focus state detection is shifted to the second detecting means, and the lens drive amount is limited even if a large defocus amount is obtained. Consequently the influence of an undesired object on the result of focus state detection is further reduced.

The selector means 3505 may be so constructed as to select the first detecting means 3503 immediately after the actuation of a shutter releasing member 3509.

In an eighth example, the focus state detection is at first conducted in the first focus state detecting area for a predetermined period, and is then conducted in the second detecting areas. As the focus state detection is shifted to the second detecting area after the main object is securely captured by the first detecting area in said predetermined period, it is less influenced by another object eventually appearing in the second detecting area.

In a ninth example, if the defocus amount is calculated in the focus detection in the first detecting area, the operation is shifted to the second detecting area even prior to the lapse of said predetermined period. This example enables more efficient focus state detection.

BRIEF DESCRIPTION OF THE DRAWINGS

FIGS. 6 and 7 are flow charts of control sequences of a main CPU;

FIG. 8 (comprising FIGS. 8A, 8B, and 8C) is a flow chart of control sequence of an AFCPU;

FIGS. 21A, 21B, 22, 23, 24, 25A, 25B, 26, 27, 28A, 28B and 28C are views showing the principle of calculation for focus state detection;

FIGS. 37, 38 and 39 are charts and flow charts of still another example of the apparatus shown in FIG. 1;

FIGS. 48 to 62 are views of a 3rd embodiment of the automatic focus state detecting apparatus corresponding to the concept shown in FIG. 47, wherein:

FIG. 48 is a block diagram of the entire apparatus;

FIG. 49 is a schematic view of a focus state detecting optical system;

FIG. 50 is a schematic view of a CCD image sensor;

FIGS. 51A to 51D are schematic views of focus state detecting areas;

FIG. 52 is a flow chart of the control sequence of focus state detection and focusing;

FIG. 55 is a chart showing the principle of calculation of focus state detection;

FIGS. 56 and 57 are charts showing the principle of three-point interpolation;

FIGS. 58 and 59 are flow charts of control sequence of focus state detection;

FIG. 60 is a chart showing the following operation;

FIG. 61 is a flow chart therefor;

FIG. 62 is a chart showing the principle of range limitation;

FIG. 64 is a flow chart showing the control sequence of lens driving.

DETAILED DESCRIPTION OF THE PREFERRED EMBODIMENTS

(1) 1st Embodiment

In the following the 1st embodiment of the present invention will be explained with reference to FIGS. 2 to 17.

Figure 2B:
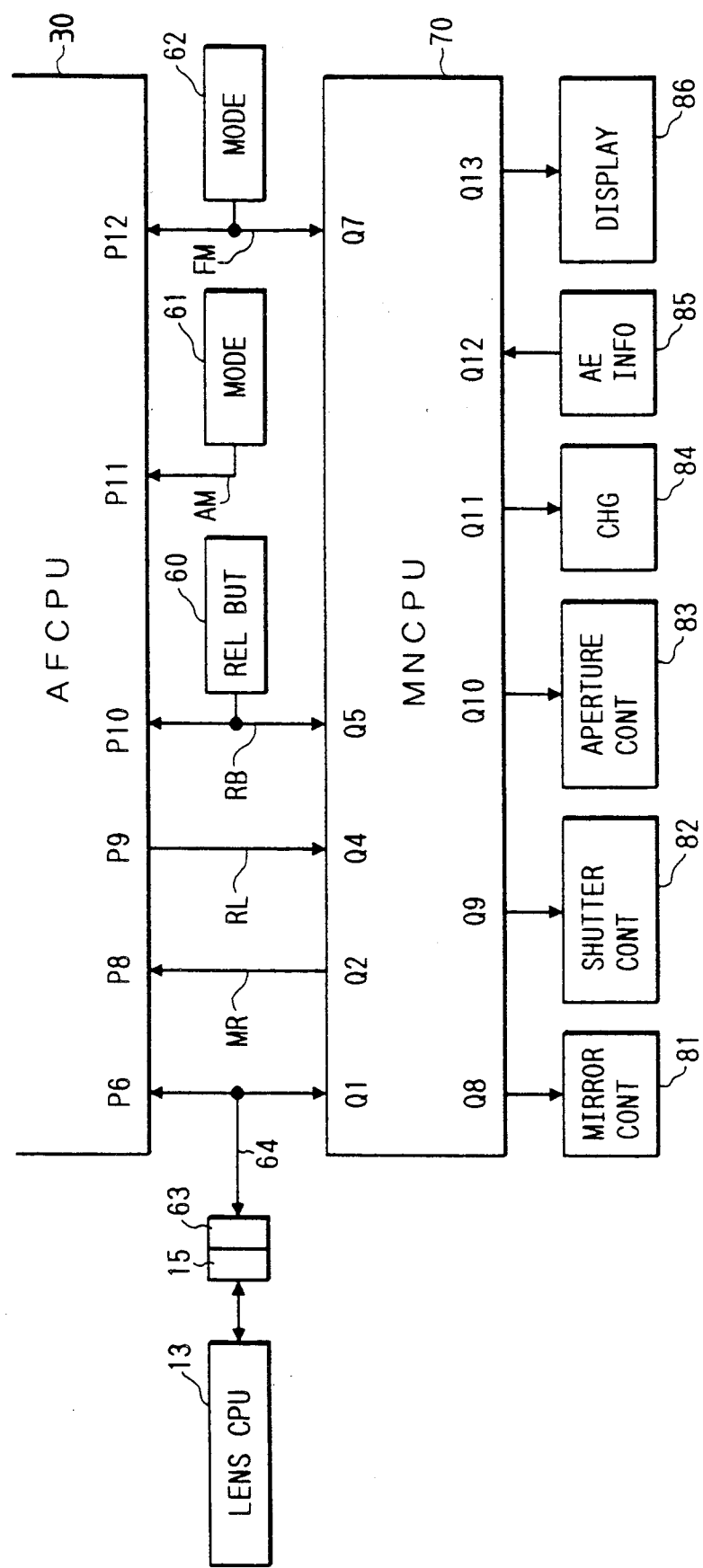
FIG. 2 consisting of FIGS. 2A and 2B, is a block diagram of said 1st embodiment.

FIG. 2 shows an example of the present invention applied to a single-lens reflex camera with interchangeable lens, wherein an interchangeable lens 10 is detachably mounted on a camera body 20. When lens 10 is mounted, a part of the light beam coming from an object is transmitted by a photographing lens 11, then reflected by a main mirror 21 provided in the camera body 20 and guided to an a view finder (not shown). At the same time another part of the light beam is transmitted by main mirror 21, then reflected by a sub mirror 22 and guided, as the focus detecting light beam, to an auto focusing (AF) module 23.

AF Module 23

Figure 3:
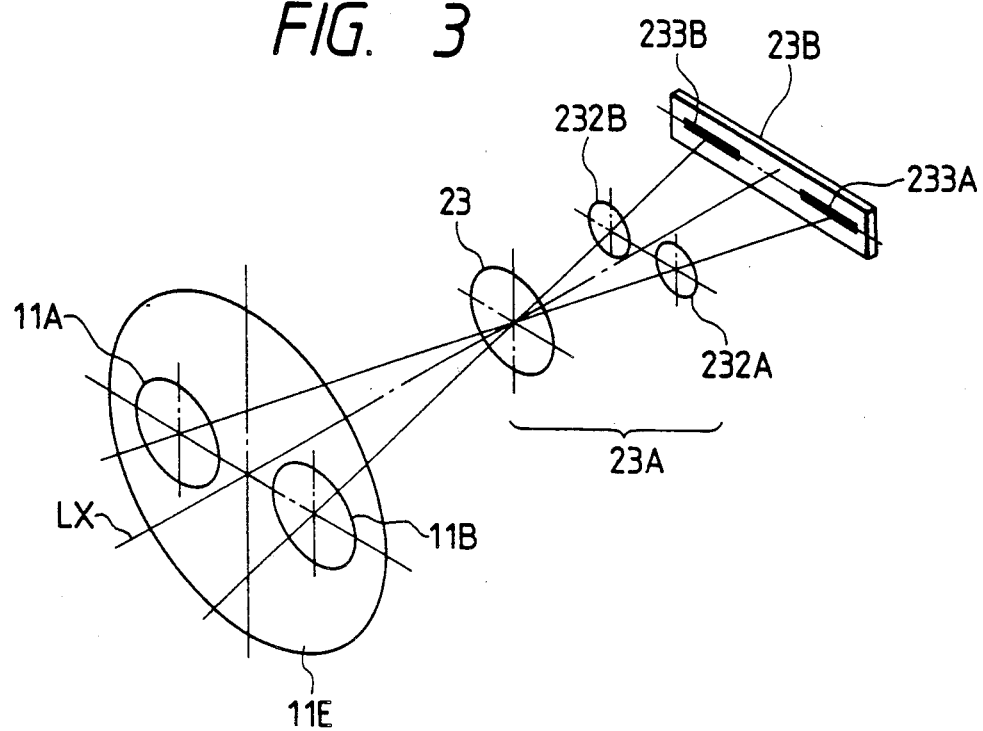
FIG. 3 is a perspective view of an automatic focusing module.

FIG. 3 shows an example of the AF module 23, which is composed of a focus detecting optical system 23A consisting of a field lens 231 and a pair of re-imaging lenses 232A, 232B, and a CCD image sensor chip 23B (hereinafter simply called CCD) having a pair of photosensor arrays 233A, 233B.

Rays passing through areas 11A, 11B which are contained in the exit pupil 11E of the lens 11 and are symmetrical to the optical axis LX form primary images for focus detection in the vicinity of the field lens 231, and further form a pair of secondary images on paired photosensor arrays 233A, 233B of the CCD 23B through the field lens 231 and re-imaging lenses 232A, 232B. When the primary images lie on a plane conjugate with a photographic film (not shown), the relative positions of the secondary images along the photosensor arrays assume predetermined values determined by the structure of the focus detecting optical system. The photosensor arrays 233A, 233B are respectively composed of n photosensors ai, bi (i=1 to n). Each photosensor ai, bi is composed of a charge accumulating element such as photodiode, and executes charge accumulation for a period corresponding to the light intensity on the CCD 23B, thereby providing an output signal suitable for the processing to be explained later. The photosensor arrays are so positioned that mutually corresponding photosensors (ai and bi) provide equal output signals when the primary image coincides with the conjugate plane of the film.

When the primary image is aberrated from the conjugate plane of the film, the relative position of the secondary images on the CCD 23B varies from the above-mentioned predetermined value, depending on the axial aberration of the primary image, namely on the front focus or rear focus. More specifically, the distance of the secondary images increases or decreases respectively in case of front focus or rear focus. Thus the relative position of the secondary images is determined by the axial difference between the image plane of the object formed by the focus detecting optical system 23A and the predetermined focal plane specific to the optical system 23A.

AFCPU 30

Again referring to FIG. 2, a sensor controller 26 receives commands for starting and terminating the charge accumulation from a port P4 of the auto focusing CPU (AFCPU) 30, and sends corresponding control signals to the CCD 23B, thereby controlling the start and end of charge accumulation thereof. It also sends transfer clock signals to the CCD 23B, thereby transferring the output signals of photosensors to the AFCPU 30 in time-sequential manner. It also sends a synchronization signal for the output signals of the photosensors to the port P4 of the AFCPU 30, which in response starts the A/D conversion by an internal A/D converter and executes the A/D conversion by sampling the output of the photosensors at a port P3 at every cycle time of the transfer clock signals. After A/D converted data (2n) corresponding to the number of photosensors are obtained, there is conducted the calculation of focus state detection as will be explained later, for determining the amount of defocus between the primary image and the conjugate plane of the film.

Based on the result of this calculation, the AFCPU 30 controls, through a port P5, an AF display unit 40. For example there is activated a triangle display 41 in case of front focus, another triangle display 43 in case of rear focus, a circular display 42 in the focused state, or a cross 44 in case the focus state detection is not possible.

Also based on the result of the calculation, the AFCPU 30 controls the direction and amount of drive of an AF motor 50, thereby moving the lens 11 to the focused position. At first, according to the sign of the defocus amount (front or rear focus), the AFCPU 30 releases, from a port P2, a drive signal for rotating the AF motor 50 in a direction for bringing the lens 11 toward the focused position. The rotation of the AF motor 50 is transmitted, through a transmission system 51 composed for example of gears incorporated in the camera body 20, to a coupling 53 of the camera body provided at a mount for the lens 10. The rotation is further transmitted to a coupling 14 of the lens and a lens transmission system 12 composed of gears incorporated in the lens 10, thereby moving the lens 11 toward the focused position.

The drive amount of the AF motor 50 is detected by the amount of rotation of a gear in the body transmission system 51, and the amount of rotation is converted into pulses by an encoder 52 composed for example of a photointerruptor and fed back to the AFCPU 30 through a port P1 thereof. The AFCPU 30 moves the lens 11 by a predetermined amount, by controlling the drive amount of the AF motor 50, namely the number of pulses supplied from the encoder 52, according to certain parameters such as the reducing ratio of the transmission systems 51, 12. The AFCPU 30 is provided with a pulse counter for counting the pulses entered from the port P1, and a comparison register for comparing with the content of the pulse counter, and is capable of starting an internal interruption procedure when the contents of the registers mutually coincide.

The AFCPU 30 controls the drive amount of the AF motor 50 in the following manner.

At first the pulse counter is cleared, then a desired number is set in the comparison register, and the AF motor 50 is started. In response to the rotation of the AF motor 50, the encoder 52 generates pulses to increase the count of the pulse, counter. When the content thereof coincides with that of the comparison register, an interruption procedure is started whereby the AFCPU 30 stops the AF motor 50. Thus the AF motor 50 is driven by a desired number of pulses. The AFCPU 30 is also provided with a timer, and a timer interruption function for effecting the interruption at a constant interval.

As explained above, the AFCPU 30 mainly controls the auto focusing.

Main CPU 70

Again referring to FIG. 2, the camera body 20 also incorporates a main CPU 70 for principally controlling the sequences of the camera and the automatic exposure (AE) operation. The main CPU 70 receives information on exposure such as the object luminance, film sensitivity, diaphragm aperture, shutter speed etc. from an AE information unit 85 through a port Q12, and determines the diaphragm stop value and the shutter speed based on the AE information. The main CPU 70 displays the determined stop value and shutter speed on a display unit 86 through a port Q13, and stores the data in memory areas as the diaphragm aperture and shutter speed for the photographing operation. In the photographing operation, the main CPU 70 sends a signal, through a port Q8, to a mirror control unit 81, thereby controlling the up-down motion of a main mirror 21. It also controls an aperture control unit 83 through a port Q10 thereby controlling an aperture mechanism (not shown) of the 10. It also controls a shutter control unit 82 through a port Q9, thereby controlling a shutter mechanism (not shown).

When the photographing operation is completed, the main CPU 70 controls, through a port Q11, a charging control unit 84 to activate an unrepresented charging mechanism, in order to prepare for the next photographing operation.

Lens CPU 13

The lens is provided with a lens CPU 13 which sends AE information, such as full-open F-stop value, required by the main CPU 70, and AF information such as the rotation of coupling 14 per unit movement of the lens 11, required by the AFCPU 30, to a communication bus 64 of the camera body through lens contacts 15 and body contacts 63 provided in the mounting.

The AFCPU 30 receives the AF information from the lens CPU 13, through a port P6 connected to the bus 64. Also the main CPU 70 receives the AE information from the lens CPU 13, through a port Q1 connected to the bus 64. The main CPU 70 and the AFCPU 30 can exchange various data through the ports Q1, P6 and the bus 64.

Input/Output Signals Between CPU's 30, 70

In addition, there are provided direct I/O lines between the main CPU 70 and the AFCPU 30 as shown in FIG. 2.

A mirror-up signal MR is sent from a port Q3 of the main CPU 70 to a port P8 of the AFCPU 30, and is turned on during the up-state of the mirror and in the up- and down-motions thereof, and is off during the down-state.

A release enable signal RL is sent from a port P9 of the AFCPU 30 to a port Q4 of the main CPU 70, and enables, in the on-state, the photographing operation by the main CPU 70.

A release button signal RB, indicating the state of a shutter release button 60, which is provided on the camera body 20 and externally actuatable, is sent to a port P10 of the AFCPU 30 and a port Q5 of the main CPU 70, is turned on when the release button 60 is fully depressed and is off otherwise.

Figure 4:
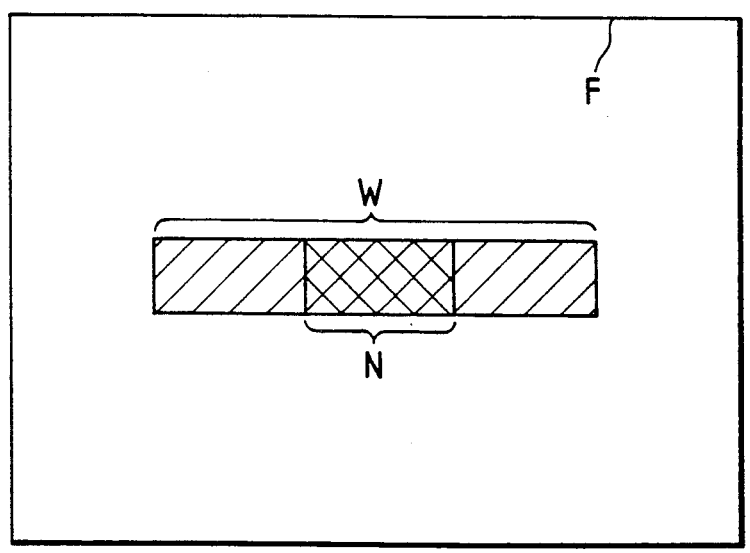
FIG. 4 is a schematic view of focus state detecting areas.

An area mode signal AM sends the area mode selected by an area mode selector switch 61 provided on the camera body 20 to a port P11 of the AFCPU 30. The area mode signal indicates a W (wide) mode or an N (narrow) mode, corresponding to the size of the focus detecting area as shown in FIG. 4, wherein F indicates the frame of photographing.

A focus mode signal FM sends the focus mode selected by a focus mode selector switch 62 provided on the camera body 20 to a port P12 of the AFCPU 30 and a port Q7 of the main CPU 70. The focus mode signal FM indicates a pursuit mode (S mode) or a normal mode (A mode). In the pursuit mode, when a moving object is identified, the drive amount of the lens is controlled by a pursuit correcting amount in consideration of the movement of the object, in addition to the defocus, amount detected corresponding to a stationary object. In the normal mode, the lens drive amount is controlled by the detected defocus amount.

CPU's 30, 70 During the Pursuit Drive

Figure 5:
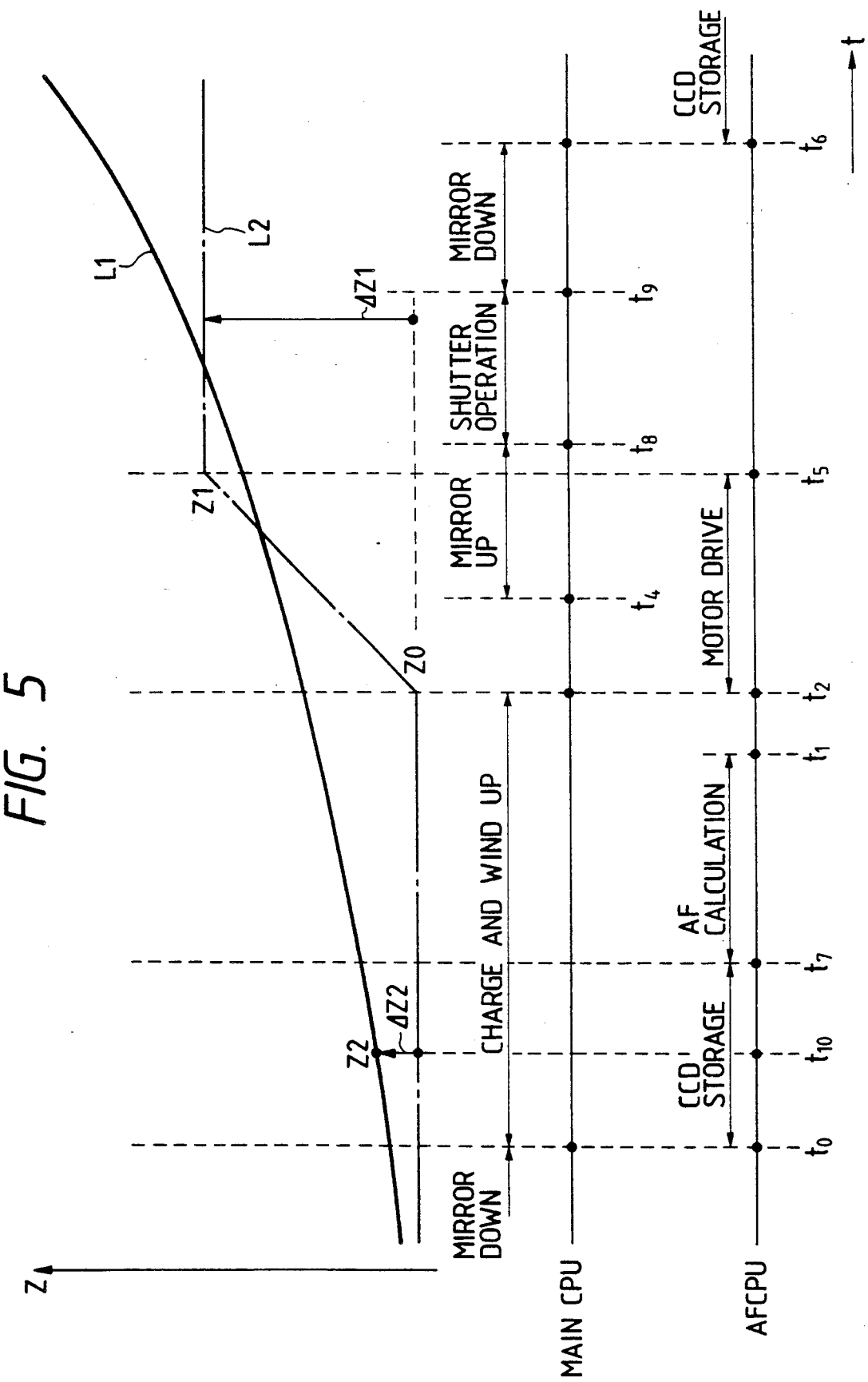
FIG. 5 is a chart showing the following operation.

Now reference is made to FIG. 5 for explaining the function of the AFCPU 30 and the main CPU 70 in the pursuit mode, with reference to an example disclosed in the Japanese Patent Application Sho 63-179112 of the present applicant.

FIG. 5 shows the relation between the movements of object and lens when the release button is fully depressed in the pursuit mode, and the functions of the CPU's 30, 70, wherein the abscissa indicates the lens position Z and the ordinate indicates the time t. A solid line L1 indicates the trajectory of the ideal position of the lens 11 for constantly focusing the image of a continuously moving object on the film plane, and a chain line L2 is the trajectory of the actual lens movement.

At a time $t_0$ when the mirror-down operation is completed, the lens 11 is stopped at a position Z0. The AFCPU 30 executes the charge accumulation of the photosensor arrays 232A, 232B of the CCD 23B from $t_0$ to $t_7$, and starts the A/D conversion and the focus state detecting calculation of the data of CCD from $t_7$. In pursuit mode, if a moving object is identified by a pursuit algorithm to be explained later, a pursuit correction value is added to the defocus amount determined for a stationary object, and the photographing lens 11 is driven according to the result of the addition. In the present example, there is determined, at $t_1$, a pursuit defocus amount including a pursuit correction and a defocus amount corresponding to the difference between the solid line L1 and the chain line L2 at a time $t_{10}$ at the center of $t_0$ and $t_7$ ($\Delta Z2 = Z2 - Z0$).

The main CPU 70 executes a charging-winding operation from $t_0$ to $t_2$. In response the AFCPU 30 starts the motor driving at $t_2$, thus moving the lens 11 by an amount ($\Delta Z1 = Z1 - Z0$) corresponding to the pursuit defocus amount mentioned above. At $t_4$, after a predetermined period from $t_2$, the main CPU 70 starts a mirror-up operation. The AFCPU 30 terminates the motor driving forcedly, at $t_5$ after a predetermined period from $t_2$. At $t_6$, after a predetermined period from $t_4$, the main CPU 70 completes the mirror-up operation and starts a shutter releasing operation. This operation is completed at $t_9$, when a mirror-down operation is started, which is completed at $t_6$. At $t_6$, the main CPU 70 starts the charging-winding operation again, and the AFCPU 30 starts the next charge accumulation of the CCD.

As explained above, in the photographing operation in the pursuit mode, the motor is so driven as to move the photographing lens without delay in pursuit of the moving object, and the shutter is activated close to the completion of the motor driving. Thus, as shown in FIG. 5, the exposure can be made in a state of little deviation between the lines L1 and L2, thus providing a well-focused photograph.

Programs of CPU's 30, 70

In the following there will be explained programs and functions of the main CPU 70 and the AFCPU 30 of the present embodiment.

[1] Main CPU 70

At first reference is made to flow charts shown in FIGS. 6 and 7, for explaining the program of the main CPU 70, which is composed of a main program shown in FIG. 6 and a timer interruption program shown in FIG. 7.

Main Program of Main CPU 70

In FIG. 6, a step S100 at first executes initialization by turning off the mirror-up signal MR to the AFCPU 30, and enabling timer interruption by setting the timer for effecting timer interruption at a constant interval (for example every 50 ms). Then a step S105 awaits the full depression of the release button RB.

When the release button RB is fully depressed, a step S110 discriminates whether the focusing mode FM is the pursuit mode S, and, if not, the sequence proceeds to a step S130 for the photographing process, without a step S115 for awaiting the enabling of the shutter releasing. If the pursuit mode is selected, the step S115 awaits that the release enable signal RL is turned on, and the sequence then proceeds to the step S130.

Step S130 turns on the mirror-up signal MR. Then a step S135 controls the diaphragm aperture to a desired stop based on the result of AE calculation executed by a timer interruption procedure to be explained later, and also executes a mirror-up operation. A step S140 controls the shutter with a shutter speed determined by the AE calculation. A step S145 executes a mirror-down operation, and fully opens the aperture. Then a step S150 turns off the mirror-up signal MR, and a step S160 executes the charging operation. Upon completion of this operation, the sequence returns to the step S105, whereupon the photographing sequence is repeated.

Timer Interruption Program of Main CPU 70

FIG. 7 shows a timer interruption program of the main CPU 70, activated at a given interval (for example 50 ms) during the execution of the main program.

When timer interruption is started, a step S200 effects communication with the lens CPU 13 shown in FIG. 2 through the bus 64, thus fetching the AE information (aperture value, focal length etc.) of the lens. Then a step S205 fetches the AE information of the camera body (light value, film sensitivity etc.) from the AE information unit 85 shown in FIG. 2. A step S210 then executes AE calculation based on the AE information of the body and the lens, thus determining the aperture value and shutter speed. A step S215 displays the results of AE calculation on the display unit 86 shown in FIG. 2, and a step S220 returns the sequence to the main program.

[2] AFCPU 30

In the following the program of the AFCPU 30 is explained. The AFCPU 30 is provided with a memory for storing A/D converted data from the CCD, a timer, and a pulse counter, and is capable of timer interruption and pulse counter interruption. The program of the AFCPU 30 is composed of a main program and two interruption programs, which are a timer interruption program and a pulse counter interruption program.

Main Program of AFCPU 30

FIG. 8 is a flow chart showing the program of the AFCPU 30, composed of modules M1-M9 and having a large loop structure.

An initialize module M1 executes initialization of various flags, data and signals, initialization of displays, AF motor and CCD sensor, and, initialization of timer interruption and pulse counter initialization. The timer interruption is repeated at a constant interval after initialization.

The functions of the following modules will be explained in a state after certain turns of the loop structure of these modules.

After the mirror-down operation by the mirror-up signal MR and the completion of function of the AF motor are confirmed, a CCD accumulation control module M2 controls the accumulation start signal for the CCD by means of the sensor control unit 26, thereby effecting the charge accumulation, of the CCD for an accumulating time determined by an AGC calculation module M9 to be explained later. Upon completion of the charge accumulation, an A/D conversion module M3 executes A/D conversion of the data released from the CCD, and stores two series of CCD data a1-an, b1-bn in an internal memory. After this storage, an AF algorithm module M4 calculates the defocus amount from the CCD data, as will be explained later.

A lens information reading module M5 effects communication with the lens CPU 13 through the bus 64, thus fetching and storing the lens information required by the AFCPU 30 in the internal memory For example a pulse conversion coefficient KL required in the conversion of the defocus amount into a pulse number, the focal length FL of the lens etc. are supplied from the lens CPU 13 to the AFCPU 30.

A pursuit algorithm module M6 discriminates whether the object is moving, and, in case of a moving object, determines a pursuit drive amount (lens drive amount for moving object) by adding a pursuit correction to the defocus amount for the stationary object, as will be explained later in detail.

An in-focus discrimination/display module M7 discriminates the focus state based on the determined defocus amount, in case of a stationary object, and renews the display on the AF display unit 40 according to the result of the discrimination. On the other hand, in case of a moving object, the discrimination is not conducted, and a particular pattern is displayed on the AF display unit 40.

A drive control module M8 converts the defocus amount into a number of pulses, sets the data on the number of pulses in the comparison register, and starts the AF motor toward the focused position, as will be explained later.

An AGC (auto gain control) calculation module M9 determines the accumulation time of CCD next time, based on the previously obtained CCD data, so as to obtain appropriate CCD data next time. The sequence then returns to the accumulation control module M2.

Interruption Program of AFCPU 30

In the following interruption programs are explained.

A timer interruption module M10 executes generation of various I/O signals, detection of changes therein, setting and resetting of corresponding flags, detection of lens end position, control of various intervals, and detection of status of various operating means. In a non-pursuit operation in the pursuit mode, the release enable signal RL is always maintained on to enable the shutter release operation any time. In a pursuit operation, the release enable signal RL is normally turned off to prohibit the lens operation, and, when the release button RB is fully depressed, the release enable signal RL is turned on at $t_4$ shown in FIG. 5, thereby enabling the release operation by the main CPU 70. Also when the main CPU 70 starts the mirror-up operation and turns on the mirror-up signal MR in response to the on-state of the release enable signal RL, the release enable signal RL is turned off.

A pulse counter interruption module M11 is started when the cumulative number ECNT of the pulses generated by the encoder 52 reaches a preset pulse number ETM calculated by the drive control module M8, and terminates the driving of the AF motor after the lens has been moved to the focused position. These modules are executed in succession, to control the focus state detection and the AF motor driving.

In the following there will be explained the details of the AF algorithm module M4, the pursuit algorithm module M6, and the drive control module M8.

Prior to the explanation of the module M4, there is explained the known correlation calculation employed in the focus state detection.

Correlation Calculation

The paired CCD data a1 to an and ba to bn are subjected to the calculation of correlation according to equation (1) to obtain correlation C(L):

$$C(L) = \sum_i \{a_i - b(i + L)\} \quad (1)$$

wherein L is an interger, indicating the relative shift of the paired CCD data, counted by the number of pitches of the photosensors arranged on the CCD chip 23B. In equation (1), the relation between the parameter i and the shift L is determined, for example, as shown in FIG. 9.

Figure 9:
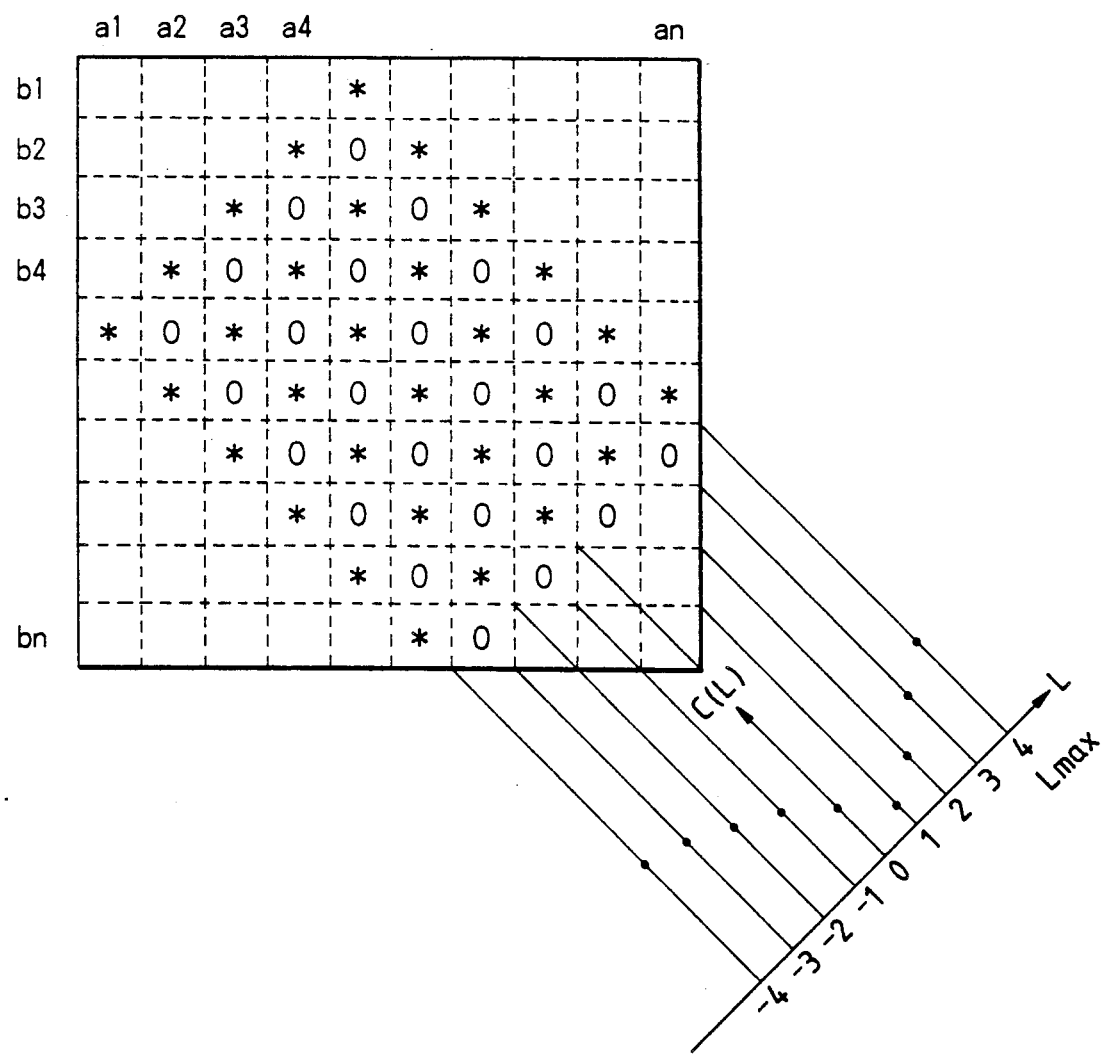
FIGS. 9, 10 and 11 are charts showing the principle of calculation for focus state detection.

In FIG. 9, the shift L can assume a value in a range from $-4$ to 4, and the range of the parameter i is represented by a relation (2):

$$3 + INT\left(\frac{L+1}{2}\right) \leq i \leq (n-2) + INT\left(\frac{L+1}{2}\right) \quad (2)$$

wherein INT( ) indicates taking a largest integral value not exceeding the number in the parentheses. In the equation (1), the number Nx of paired data a and b can be represented by an equation (3):

$$Nx = n - Lmax \quad (3)$$

wherein Lmax is the maximum value of the shift L. Thus the number Nx of pairs decreases as the maximum shift Lmax increases. The combinations of pairs of the data a and b used in the calculation (1) are positioned in a rectangular area represented by "*" and "0" in FIG. 9, indicating the data a and b respectively in the abscissa and ordinate. In case L=0, corresponding to the in-focus state, the CCD data employed in the equation (1) are to a(n−2) and b3 to b(n−2), corresponding to the focus detecting area shown in FIG. 9. Thus, according to the relation (3), if the focus state detecting area is selected larger, the number of pairs increases so that the maximum amount of shift has to be decreased. On the other hand, if the maximum amount of shift is increased for increasing the detectable defocus amount, it is necessary to reduce the number of pairs and therefore to reduce the focus state detecting area.

Figure 10:
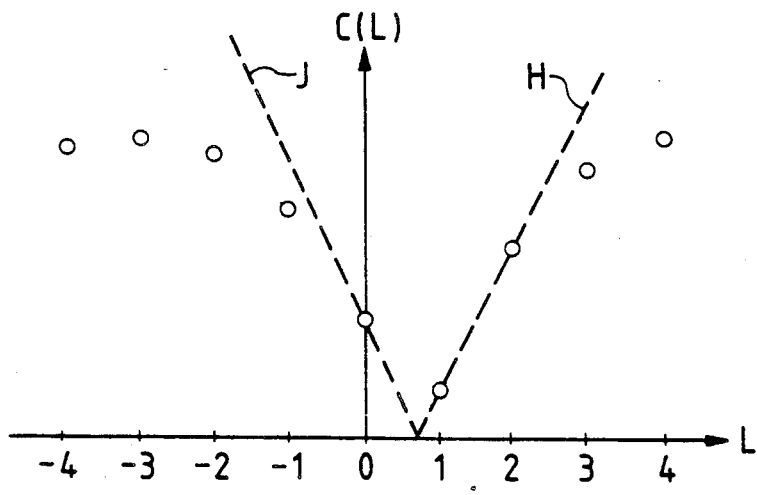

The calculation according to the equation (1), as shown in FIG. 10 in which the abscissa and the ordinate respectively indicate the relative shift L and the correlation value C(L), shows a minimum correlation C(L) at a shift L where the paired CCD data have a high correlation.

In practice, however, the correlation value C(L) is not continuous, because the relative shift L is determined from the non-continuous data obtained from the photosensor arrays 233A, 233B. Consequently the minimum correlation $C(L)_{min}$ is not necessarily obtained directly from the calculated correlation C(L).

Figure 11:
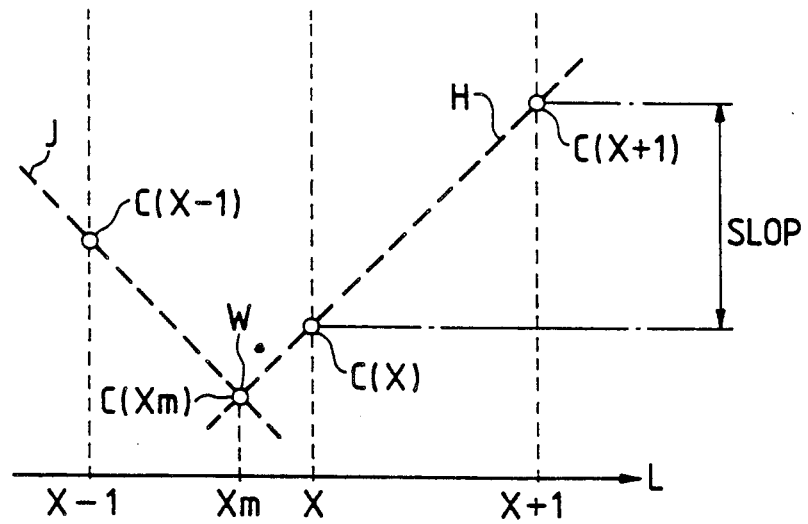

Thus the minimum value $C(L)_{min}$ of the correlation C(L) is determined from three-point interpolation shown in FIG. 11.

It is assumed that the minimum value of non-continuous correlation C(L) appears at a relative shift L=x. Thus the correlation values C(L) corresponding to neighboring relative shifts x−1, x and x+1 are C(x−1), C(x) and C(x+1). Thus a straight line H is drawn passing through the minimum correlation C(x) and the larger one of two other correlations C(x−1) and C(x+1), which is C(x+1) in the case shown in FIG. 11. Then a line J is drawn passing through the remaining correlation C(x−1) and with an inclination opposite to that of the line H, and the crossing point W of the lines H, J is determined.

The coordinates of point W are represented by the relative shift xm and the corresponding correlation C(xm). These values are the minimum correlation C(xm) and the corresponding relative shift xm in continuous manner.

In the three-point interpolation, the minimum relative shift xm can be represented by:

$$xm = x + \frac{D}{SLOP} \quad (4)$$

and the corresponding correlation C(xm) can be represented by:

$$C(xm) = C(x) - |D| \quad (5)$$

wherein D is the deviation of the correlation between relative shifts x−1 and x+1, and can be represented by:

$$D = \frac{C(x-1) - C(x+1)}{2} \quad (6)$$

Also in the equations (4) and (5), SLOP indicates the larger one of the deviations of the correlations C(x−1), C(x) and C(x+1) corresponding, to relative shifts x−1, x, x+1, and can be represented as follows:

$$SLOP = MAX\{C(x+1) - C(x), C(x-1) - C(x)\} \quad (7).$$

The equations (4)-(7) indicate the relative shift xm of the paired CCD data, so that the relative lateral shift of two object images on the CCD 25 can be represented by:

$$SHIFT = y \times xm \quad (8)$$

wherein y is the pitch of the photosensor elements.

Also the defocus amount DEF at the focal plane can be represented by:

$$DEF = KX \times SHIFT \quad (9)$$

wherein KX is a coefficient determined by the structure of the focus state detecting optical system shown in FIG. 3.

The parameter SLOP determined by (7) becomes larger as the decrease in the correlation C(L) in FIG. 10 is larger, so that the determined defocus amount DEF is more reliable.

AF Algorith Module M4

In the following there will be explained in detail four examples of the AF algorithm module M4, with reference to FIGS. 12A-12F.

1st Example of Module M4

Figure 12A:
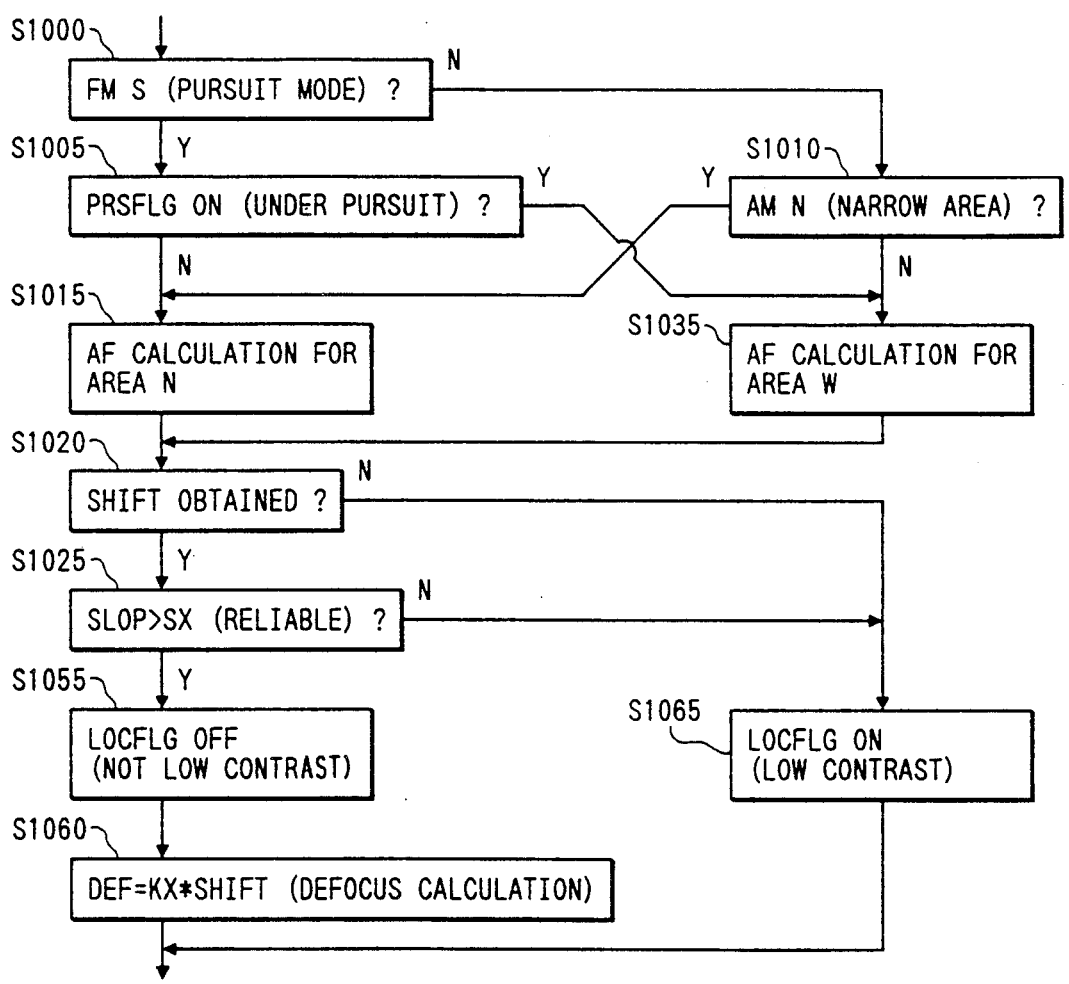
FIGS. 12A to 12G are flow charts of the control sequence of an AF algorithm module.

Referring to FIG. 12A, a step S1000, discriminates whether the focus mode is the pursuit mode according to the focus mode signal FM, and, if the pursuit mode is identified, a step S1005 discriminates whether a pursuit operation is in progress, namely whether it has been decided to execute the pursuit by the pursuit algorithm module M6 executed in the preceding loop, according to a pursuit flag PRSFLG. The flag PRSFLG is set when the pursuit algorithm module M6 shown in FIG. 16 executes a pursuit drive for a moving object. If the step S1005 identifies that the pursuit is in progress, the sequence proceeds to a step S1035 for selecting the wide (W) focus detecting area for the calculation of focus state detection. If the pursuit is not in progress, a step S1015 selects the narrow area N for the calculation of focus state detection. If the step S1000 identifies that the pursuit mode is not selected, a step S1010 discriminates whether the area mode is the narrow area mode N, by the area mode signal AM, and, if so, a step S1015 selects the narrow focus detecting area N for calculating the focus state detection. If the wide area W is indicated by the area mode signal AM, the step S1035 selects the wide focus detecting area W for effecting the calculation of focus state detection.

In the following the focus detecting areas N, W will be explained with reference to FIG. 13.

Figure 13:
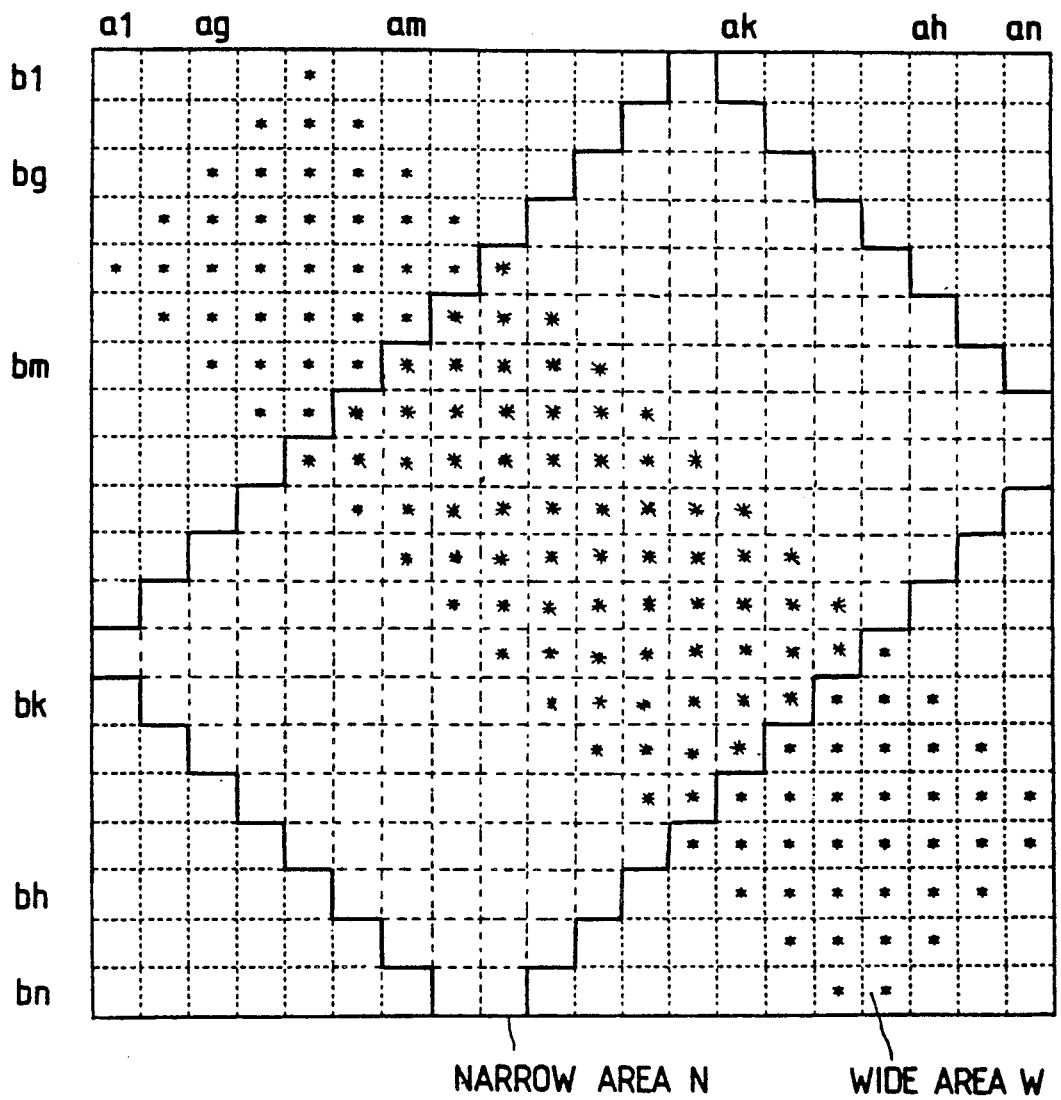
FIGS. 13 and 14 are charts showing the relation between the focus state detecting areas and the correlation calculation.

In case of focus state detection in the narrow area N, the correlation calculation according to the equation (1) is conducted, with respect to the data a and b, in a hatched rectangular area in FIG. 13. For a shift L=0, data am-ak, bm-bk are used for the calculation. On the other hand, in case of focus state detection in the wide area W, the calculation is conducted in a rectangular area marked with * in FIG. 13, and data ag-ah, bg-bh are used in the calculation for L=0.

In the focus state detection in the narrow area N, it is possible to place the desired object only in the detecting area because it is narrow. There is obtained, therefore, an advantage of a large detectable defocus amount because the shift amount L can be selected large, but there is associated a disadvantage in it is difficult to always hold the object in the detecting area.

On the other hand, in the focus state detection in the wide area W, there is obtained an advantage of easier holding of the desired object always in the detecting area because it is wide, but there are associated disadvantages in the probability of presence of other objects in the detecting area is higher, and in the maximum detectable defocus amount becomes smaller as the shift L cannot be selected large.

In case of normal AF mode, the focus detecting area is manually selected by the photographer, and is switched in the step S1010 according to the area mode. In case of the pursuit focus mode, the detecting area is automatically switched to the wide area W during the pursuit operation, or the narrow area N except in the pursuit operation.

Such switching selects the narrow, area in the non-pursuit state thereby enabling the camera to hold the desired object only in the area, and selects the wide area once the pursuit operation is started, whereby the focus state detection is made securely possible even if the object is slightly aberrated from the center of the detecting area.

When the calculation for focus state detection is completed in the steps S1015 and S1035, a step S1020 discriminates whether the shift amount SHIFT is obtained in the calculation. If not, for example if the correlation does not show a decrease as shown in FIG. 10, the focus state detection is identified impossible, and the sequence proceeds to a step S1065 for setting a flag LOCFLG. Then the sequence proceeds to the next module. If the shift amount SHIFT is determined, a step S1025 discriminates whether the parameter SLOP is at least equal to a predetermined value SC, for evaluating the reliability of the determined shift amount SHIFT.

The value SX may be selected differently for the focus state detection in the narrow area N and that in the wide area W.

If the step S1025 identifies lack of reliability, a step S1065 identifies that the focus state detection is impossible, and sets the flag LOCFLG, and the sequence proceeds to the next module. If the reliability is confirmed, a step S1055 resets the flag LOCFLG, indicating that the focus state detection is possible. Then a step S1060 determines the defocus amount DEF from the shift amount SHIFT according to the equation (9), and the sequence proceeds to the lens information reading module M6.

(2nd Example of Module M4)

Figure 12B:
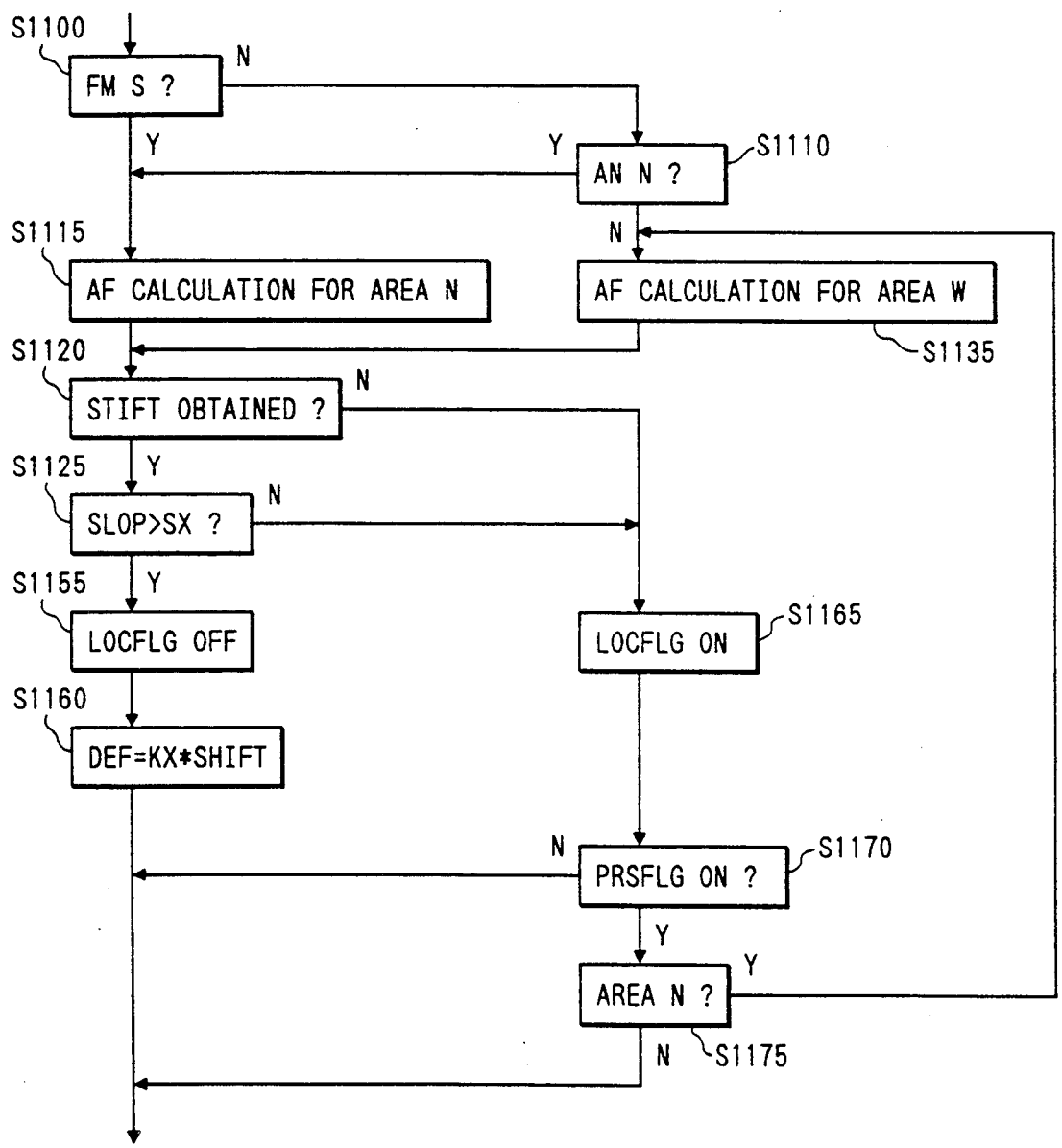

FIG. 12B is a flow chart of a 2nd example of the AF algorithm module M4. In this example, the focus state detection is conducted at first in the narrow area N in the pursuit mode, and it is switched to the wide area W only if the focus state detection is impossible and if the pursuit operation is in progress. Such switching method reduces the possibility that, in case the detecting area is switched to the wide area W in the course of pursuit operation, the pursuit for the desired object becomes impossible due to the inclusion of other objects into the detecting area.

In this example, if a step S1100 identifies the pursuit focus mode or if the step S1100 identifies a non-pursuit focus mode but a step S1110 identifies the narrow area mode, a step S1115 selects the narrow detecting area N for effecting the focus state detection. On the other hand, if the step S1100 identifies a non-pursuit focus mode and the step S1110 identifies that the area mode is not the narrow area mode N, a step S1135 selects the wide detecting area W for effecting the focus state detection.

When the calculation of focus state detection is completed in the steps S1115 and S1135, steps S1120-S1165 discriminate whether the focus state detection is possible, as in the steps S1020-S1065 in FIG. 12A. If it is possible, a step S1160 determines the defocus amount DEF and the sequence proceeds to the next module. If it is impossible, a step S1170 discriminates whether the pursuit operation is in progress, and, if not, the sequence proceeds to the next module. In normal AF mode, the pursuit algorithm module M6 turns off the pursuit flag PRSFLG to select the non-pursuit state, whereby the sequence proceeds from the step S1170 to the next module. On the other hand, if the pursuit operation is in progress, a step S1175 discriminates whether the focus state detection has been conducted in the narrow area N, and, if so, the sequence returns to the step S1135 for repeating the focus state detection in the wide area W. If the step S1175 identifies that the focus state detection has been conducted in the wide area W, the sequence proceeds to the next module.

3rd Example of Module M4

Figure 12C:
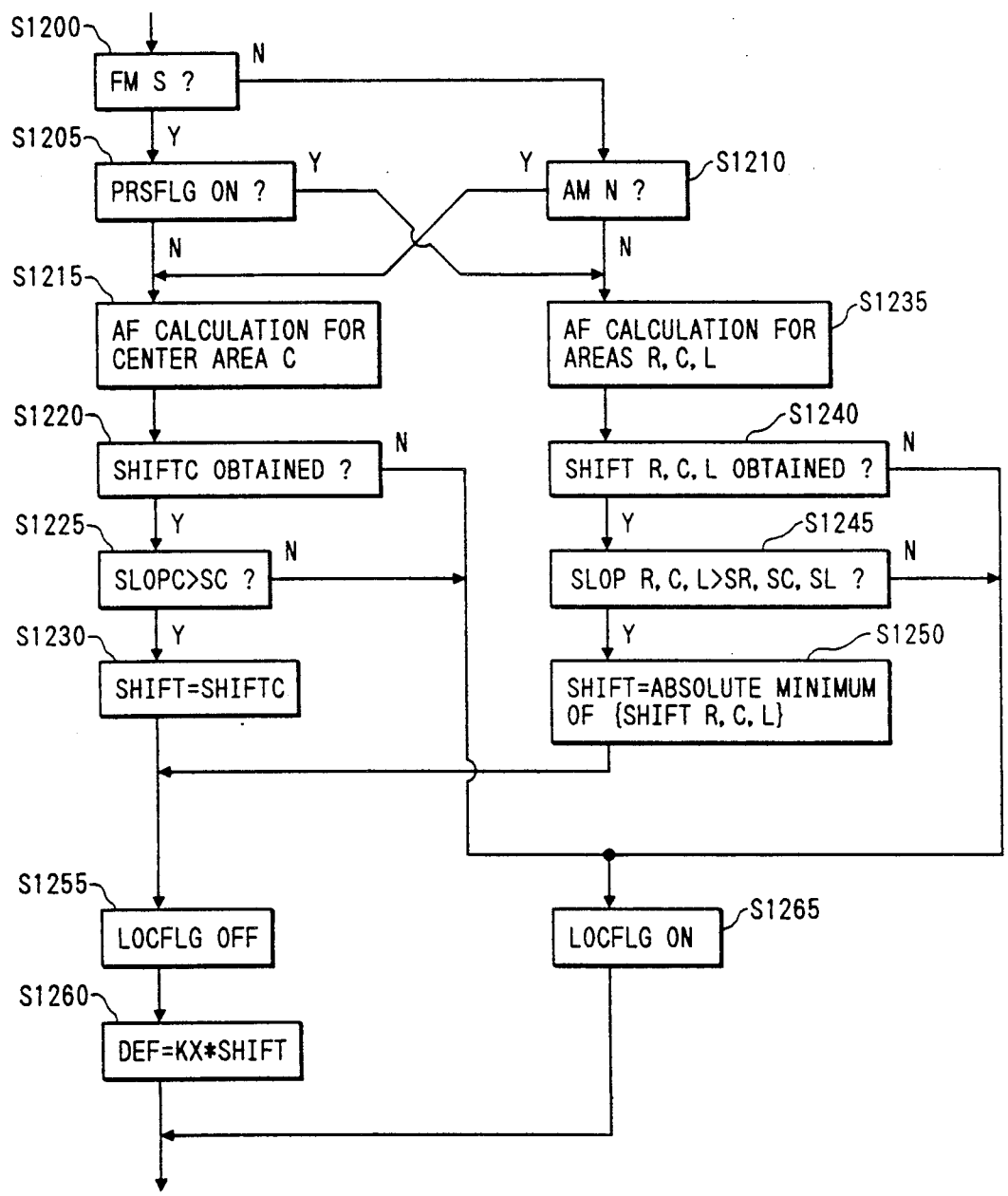
Figure 15:
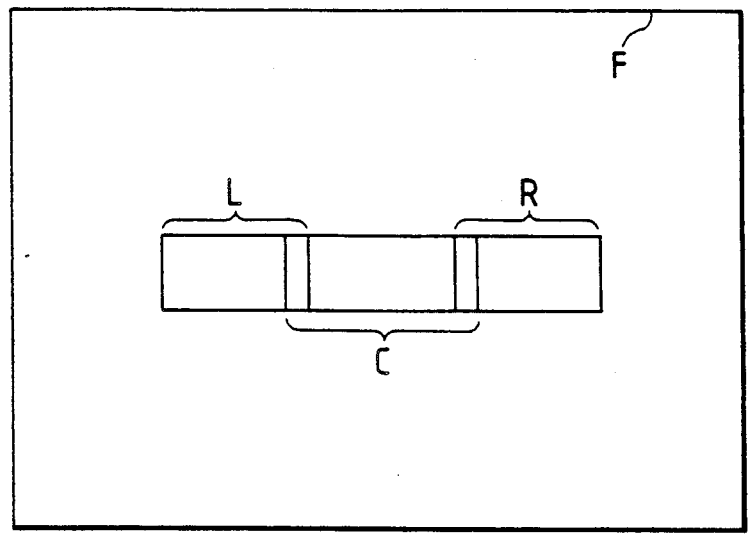
FIG. 15 is a schematic view of focus state detecting areas.

FIG. 12C is a flow chart of a 3rd example of the AF algorithm module M4. In contrast to the foregoing 1st and 2nd examples employing narrow and wide detecting areas N, W as shown in FIG. 4, the present example employs three divided areas L, C, R as shown in FIG. 15, wherein the calculation for focus detection is conducted in areas L, C, R when the wide area W is selected, or only in the central area C when the narrow area N is selected. The areas L, C, R mutually overlap.

Figure 14:
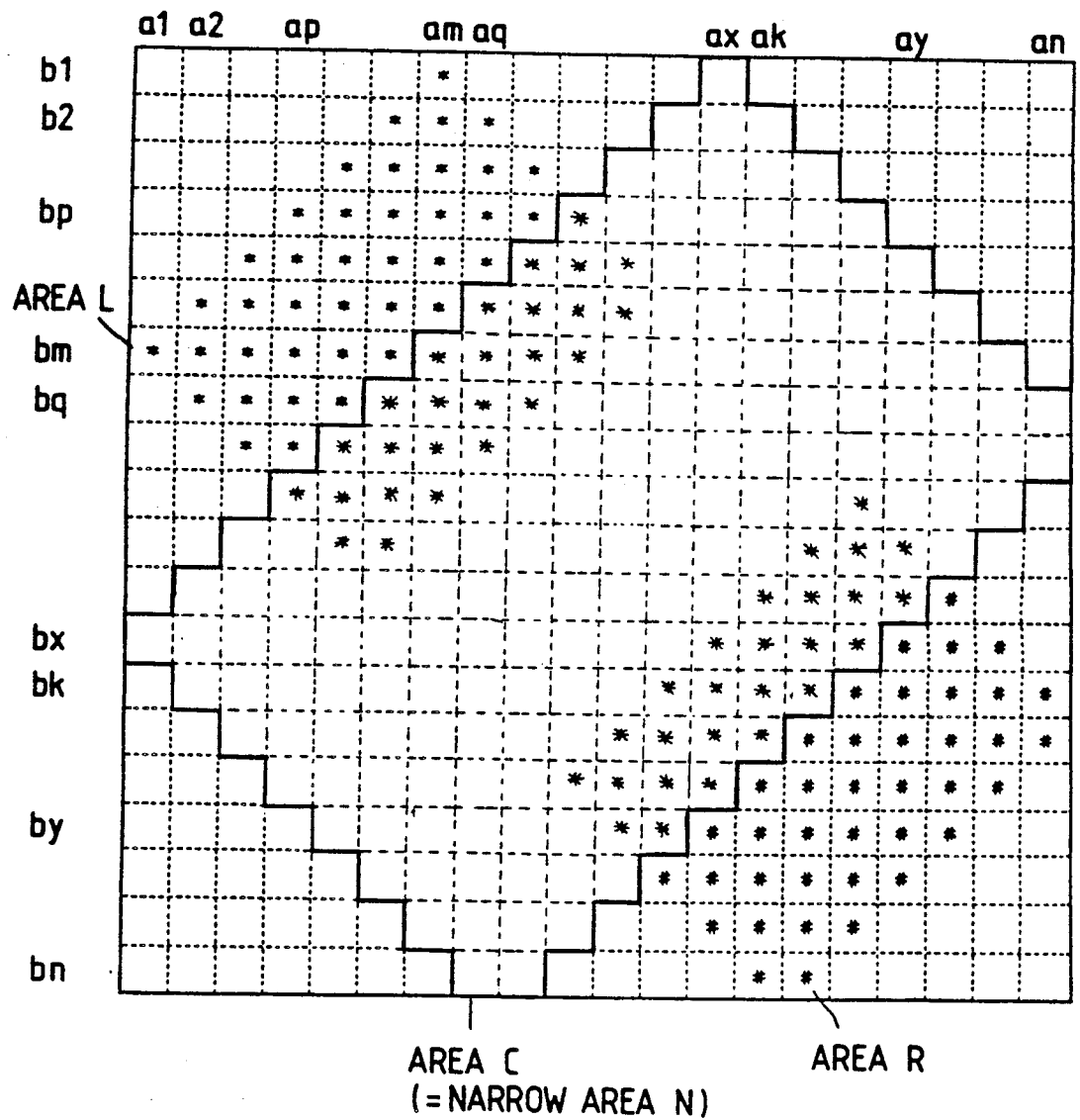

In the area L, the correlation calculation is conducted within a rectangular area marked with * in FIG. 14, utilizing data ap-aq and bp-bq for a shift L=0. In the area C, the calculation is conducted within a hatched rectangular area in FIG. 14, with data am-ak and bm-bk for L=0. In the area R, the calculation is conducted in a rectangular area marked with #, with data ax-ay and bx-by for L=0.

In FIG. 12C, steps S1200, S1205 and S1210 are identical with the steps S1000, S1005 and S1010 in FIG. 12A. More specifically, if the pursuit focus mode is selected and the pursuit operation is not in progress, and if the normal AF mode is selected and the narrow area mode N is selected, the sequence proceeds to a step S1215 to effect the calculation for focus state detect in the narrow area N, namely in the area C only. On the other hand, if the pursuit focus mode is selected and the pursuit operation is in progress, or if the normal AF mode is selected and the wide area W is selected for the area mode, the sequence proceeds to a step S1235 to effect the R, C and L.

Upon completion of the calculation in the step S1215, steps S1220 and S1225 discriminate whether the focus state detection is possible. More specifically, the step S1220 discriminates whether the shift amount SHIFTC in the central area C has been determined, and the step S1225 discriminates the reliability by comparing the parameter SLOP, obtained by the calculation in the central area C, with a predetermined value SC. If the focus detection is possible, a step S1230 sets the shift amount SHIFT as the shift amount SHIFTC in the central area, then a step S1255 resets the flag LOCFLG to indicate that the focus detection is possible, and a step S1260 calculates the defocus amount. Then the sequence proceeds to the next module.

When the calculation for focus detection is completed in the step S1235, a step S1240 discriminates whether the shift amounts SHIFTL, SHIFTC, SHIFTR have been determined in respective areas. If none has been determined, a step S1265 sets the flag LOCFLG and the sequence proceeds to the next module. If the step S1240 identifies that at least one of the shift amounts has been determined, a step S1245 compares the parameters SLOPL, SLOPC, SLOPR with predetermined values SR, SC, SL in the areas where the shift amounts have been determined. If the amounts are all less than the predetermined values, the focus detection is identified impossible and a step S1265 resets the flag LOCFLG, and the sequence proceeds to the next module. If the step S1245 identifies that at least one of the shift amounts is at least equal to the corresponding predetermined value, the sequence proceeds to a step S1250 for taking a shift amount, with smallest absolute value, among those satisfying the conditions of the steps S1240 and S1245, as the representative shift amount SHIFT.

Then a step S1255 resets the flag LOCFLG, indicating that the focus detection is possible, then a step S1260 calculates the defocus amount DEF from the determined shift amount SHIFT, and the sequence proceeds to the next module.

In the step S1250, the shift amount of smallest absolute value is selected in order to prevent a hunting phenomenon at the focused position in the normal AF mode. In the pursuit mode, this is because the predicted defocus amount is zero, as the lens is so driven as to obtain zero defocus during the pursuit operation. If the photographing operation is conducted during the pursuit operation, the predicted defocus amount is slightly aberrated from zero as shown in FIG. 5, so that the selection in the step S1250 may be made in consideration of the correction therefor. However the selecting condition of the step S1250 is not limited to such example. It is also possible to select the shift amount for the closest object among plural shift amounts SHIFTL, SHIFTC and SHIFTR, or to give increased priority to the central area C, or to make a decision according to the value of the parameter SLOP.

4th Example of Module M4

Figure 12D:
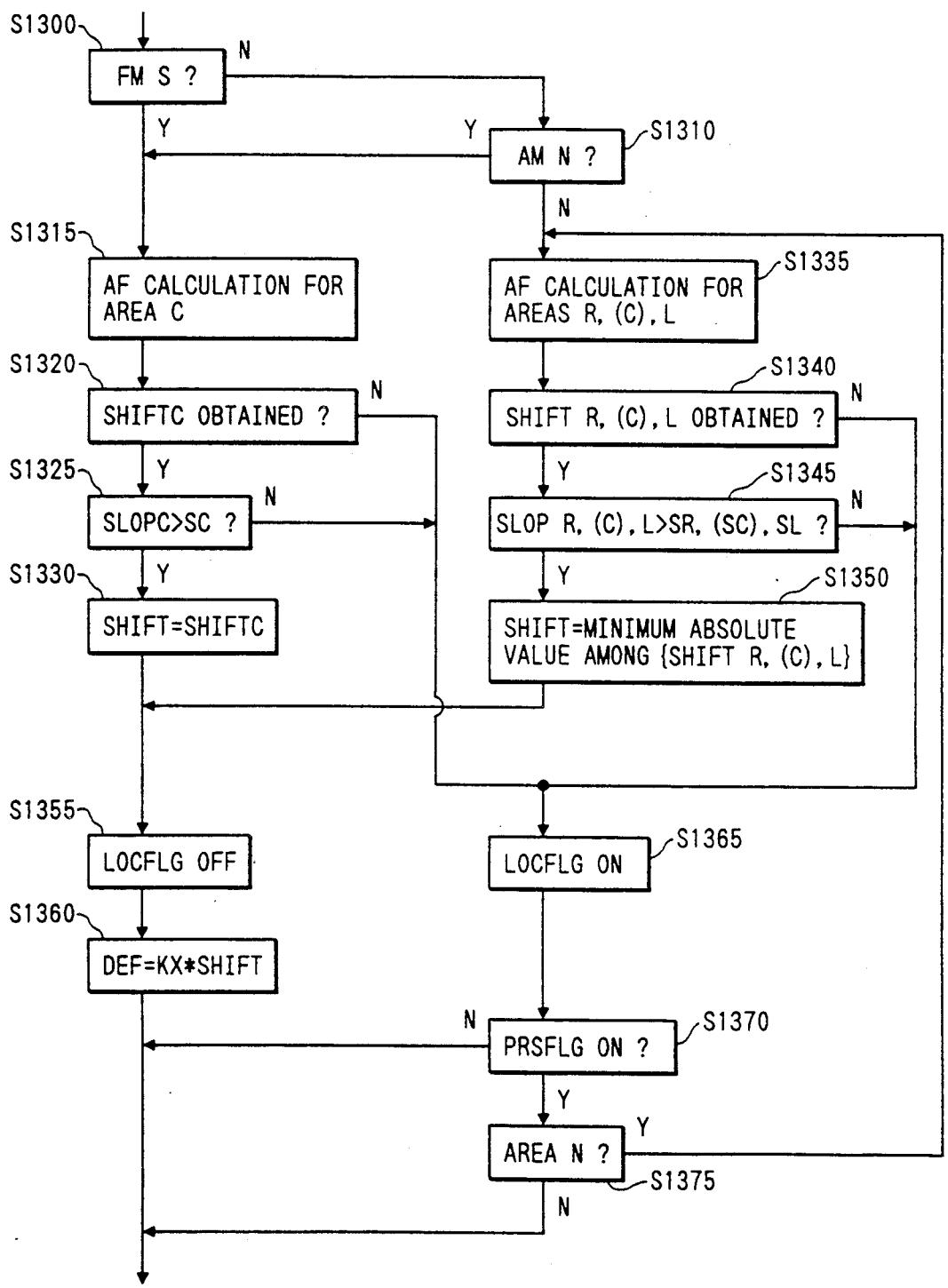

FIG. 12D is a flow chart of a 4th example of the AF algorithm module M4. In this example, if the pursuit mode is selected, the focus state detection is conducted at first in the narrow area N, and, if the focus state detection is impossible and if the pursuit operation is in progress, the focus state detection is continued in the wide area W.

If a step S1300 identifies the pursuit focus mode, or the step S1300 identifies a non-pursuit mode and a step S1310 identifies a narrow area mode, a step S1315 effects the calculation for focus state detection by selecting the narrow detecting area N, namely the area C. On the other hand, in case the, step S1300 does not identify the pursuit mode and the step S1310 does not identify the narrow area mode, a step S1335 effect the calculation by selecting the wide detecting area W, or the areas L, C and R. After the calculation in the step S1315 or S1335, steps S1320-1365 discriminate whether the focus state detection is possible, in the same manner as in the steps S1220–S1265 in FIG. 12C. If the focus detection is possible, a step S1360 determines the defocus amount DEF, and the sequence proceeds to the next module.

If the focus detection is impossible, a step S1370 discriminates whether the pursuit operation is in progress, and, if not, the sequence proceeds to the next module. In case of the normal AF mode, the pursuit operation is never in progress, so that the sequence always proceeds to the next module. If the step S1370 identifies the pursuit operation in progress, a step S1375 discriminates whether the calculation for focus state detection has been conducted in the narrow area N, and, if so, the sequence returns to the step S1335 to repeat the calculation again in the wide area W. In this case, since the focus state detection in the central area C has been completed, the calculation therefor may, be dispensed with in the steps S1335–S1350. If the step S1375 identifies the calculation in the wide area W, the sequence proceeds to the next module. Thus, in the present example shown in FIG. 12D, the focus state detection is conducted again in the wide area W, if the focus detection has been impossible in the narrow area N.

In the 2nd and 4th examples shown in FIGS. 12B and 12D, the step S1170 or S1370 executes discrimination as to whether the pursuit operation is in progress but there may be adopted, instead, a discrimination as to whether the pursuit mode is selected.

Figure 12E:
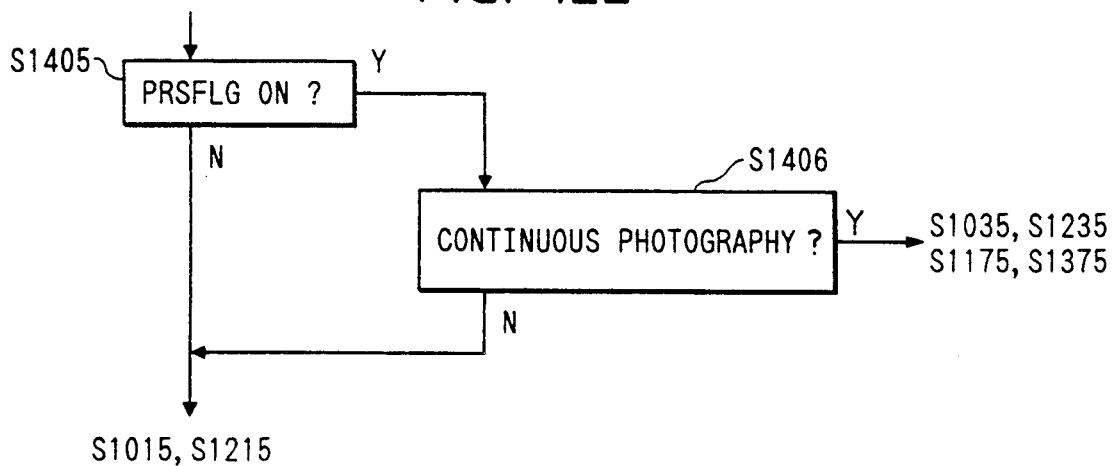
Figure 12F:
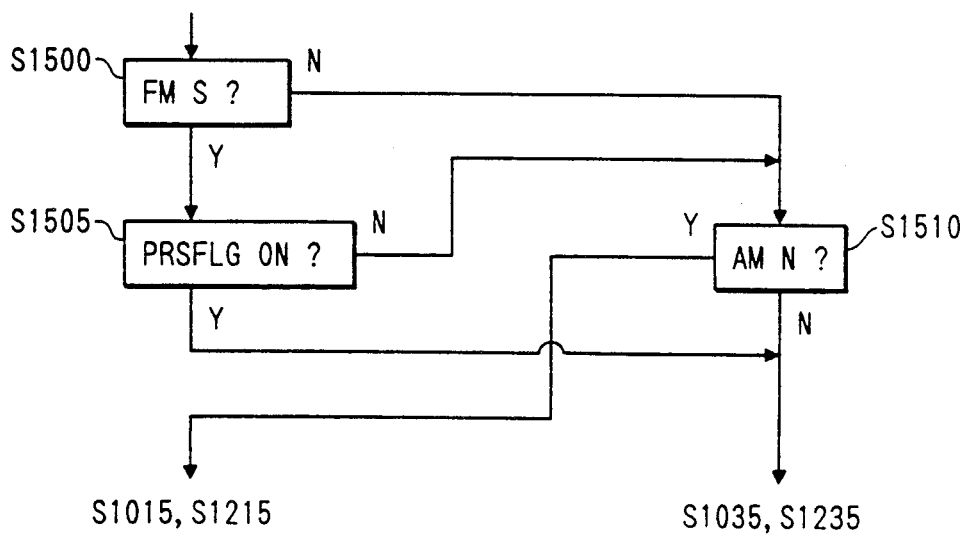

Also in the 1st and 3rd examples shown in FIGS. 12A and 12C, the step S1005 or S1205 switches the narrow and wide areas according to whether the pursuit operation is in progress, but there may also be employed a flow as shown in FIG. 12E.

In FIG. 12E, a step S1405 discriminates whether the pursuit operation is in progress, and, if not, the sequence proceeds to the step S1015 or S1215 for effecting the focus state detection in the narrow area N. If the step S1405 identifies that the pursuit operation is in progress, a step S1406 discriminates whether a continuous photographing operation with a motor drive unit is in progress, and, if not, the sequence proceeds to the step S1015 or S1215 for effecting the focus detection in the narrow area N. However, if continuous photographing operation is in progress in the step S1406, the sequence proceeds to the step S1035 or S1235 for effecting the focus detection in the wide area W.

If the pursuit operation and the continuous photographing operation are conducted in parallel manner, the object image cannot be detected by the image sensor during the photographing period, so that the probability that the object escapes from the narrow detecting area N becomes higher. It is therefore effective to select the wide area W only when the pursuit operation and the continuous photographing operation are in progress as shown in FIG. 12E. Also the sequence shown in FIG. 12E may be applied in the step S1170 or S1370 shown in FIG. 12B or 12D.

Also in the 1st and 3rd examples shown in FIGS. 12A and 12C, the focus state detection is conducted in the narrow area N if the pursuit operation is not in progress in the pursuit mode. It is however also possible to employ a sequence shown in FIG. 12F. In this case, if a step S1500 identifies the pursuit mode and a step S1505 identifies that the pursuit operation is not in progress, the sequence proceeds to a step S1510 for switching the focus state detecting area according to the area mode.

Figure 12G:
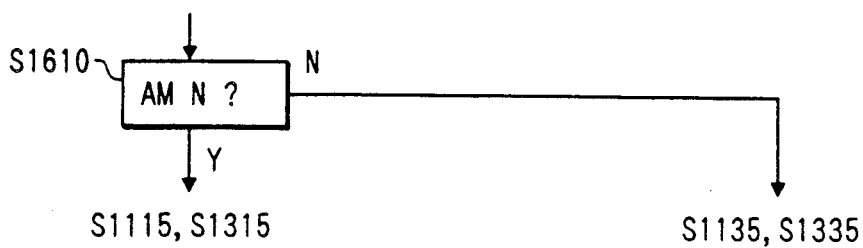

Also in the examples shown in FIGS. 12B and 12D, the step S1100 or S1300 for setting the pursuit mode may be dispensed with as shown in FIG. 12G. In this case the sequence branches at a step S1610 either to the focus state detection in the narrow area N in the step S1115 or S1315, or to the detection in the wide area W in the step S1135 or S1335, according to the area mode.

Also in the 1st to 4th examples shown in FIGS. 12A to 12D, the focus detecting area is switched according to the area mode if the pursuit mode is not selected, but it is also possible to fixedly select the narrow or wide area, omitting the switching with the area mode selector switch 61. Also the selection of the focus mode is given priority over the area mode as shown in FIG. 12G, but the priority may be given to the area mode. For example, it is possible to enable the selection of focus mode only when the area mode is set at the narrow or wide area mode.

Also in the foregoing examples a linear detecting area is employed for focus state detection when the wide area is selected, but it is also possible to so construct the image sensor and the detecting optical system as to obtain plural detecting areas, for example of a cross-shaped pattern, and to effect the focus state detection in at least two of the plural areas when the wide area is selected.

Pursuit Algorithm Module M6

Figure 16:
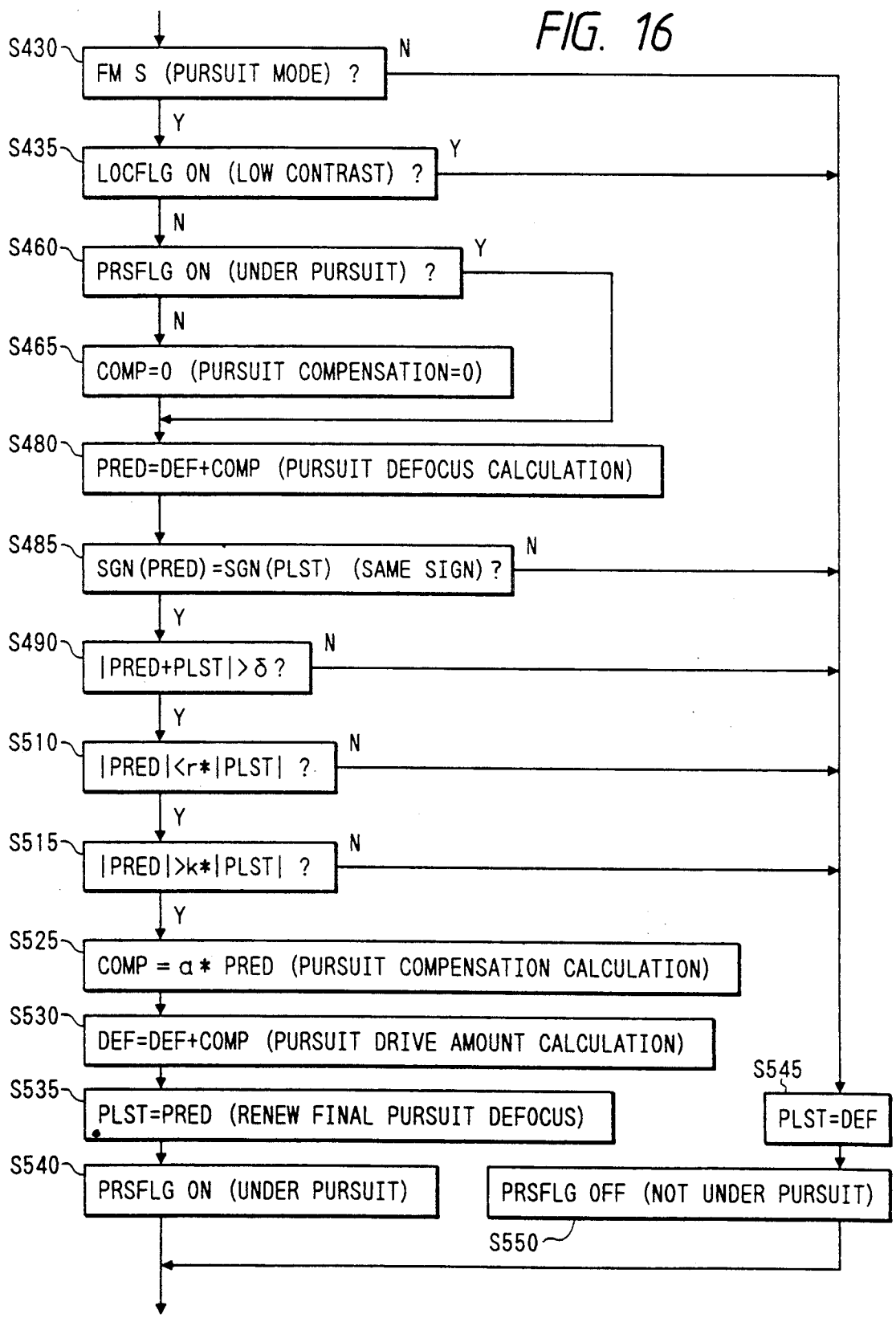
FIG. 16 is a flow chart showing the control sequence of a following algorithm module.

FIG. 16 is a flow chart of the pursuit algorithm module M6, in which steps S430 to S515 discriminate whether or not to execute the pursuit operation in the pursuit mode, as will be explained in the following.

A step S430 discriminates whether the pursuit mode is presently selected, according to the focus mode signal FM. If not, the pursuit operation is not conducted, and the sequence proceeds to a step S545. If the pursuit mode is identified in the step S430, a step S435 discriminates whether the focus state detection is possible, by the flag LOCFLG. If the focus state detection is impossible, the pursuit operation is not conducted and the sequence proceeds to the step S545. If the focus state detection is identified possible in the step S435, a step S460 discriminates whether the pursuit operation is in progress, by the pursuit flag PRSFLG, which is set in the pursuit operation as will be explained later.

If the pursuit operation is not in progress, a step S465 clears the pursuit correction value COMP to zero, and the sequence proceeds to a step S480. If the pursuit operation is in progress, the sequence directly proceeds to the step S480. The step S480 adds the present defocus amount DEF to the preceding pursuit compensation value COMP thereby determining the present pursuit defocus amount PRED.

A step S485 discriminates whether the sign of the present pursuit defocus amount PRED is the same as that of the last pursuit defocus amount PLST, and, if not, the sequence jumps to a step S545 without the pursuit operation. Thus, when the direction of pursuit is reversed, the pursuit operation is interrupted and a normal drive is executed, thereby preventing unstable states such as hunting or over-run.

If the step S485 identifies the same sign, a step S490 discriminates whether the absolute value of sum of the present and last pursuit defocus amounts (|PRED+PLST|) is at least equal to a predetermined value δ, for example 200 ms. If not, the sequence jumps to the step S545 without the pursuit operation. In the vicinity of the in-focus position, the pursuit defocus amount and the errors contained therein become comparable, so that a pursuit operation utilizing such pursuit defocus amount may result in unstable operations such as hunting or over-run, and the step S490 is provided for avoiding such situation.

If the discrimination of the step S490 is affirmative, there are executed steps S510 and S515 for discriminating whether or not to enable the pursuit operation, according to the ratio of the present pursuit defocus amount PRED and the last pursuit defocus amount PLST. In the course of pursuit operation, the defocus amount becomes almost zero, and the pursuit correction value COMP becomes almost constant. Consequently the ratio of the present pursuit defocus amount PRED to the last one PLST is ideally equal to 1. The pursuit correction is conducted on the assumption that the object is moving at a substantially constant speed, and such correction may result in unstable operations such as hunting or over-run in case of a sudden change in the speed of the object. A change in the object speed results in a change in the pursuit defocus amount, so that the ratio fluctuates from the value 1. Consequently the steps S510, S515 enable the pursuit operation only if the ratio remains within a range around 1, thereby preventing the unstable situations resulting from a sudden change in the object speed.

More specifically, the step S510 discriminates whether the absolute value of the present pursuit defocus amount PRED is less than r times (for example 3 times) that of the last pursuit defocus amount PLST, and, if not, the sequence jumps to the step S545 without the pursuit operation. Otherwise, a step S515 discriminates whether the ratio of the absolute value of the present pursuit defocus amount PRED to that of the last pursuit defocus amount PLST is at least equal to a predetermined value k, for example $\frac{1}{3}$. If not, the sequence jumps to the step S545 without the pursuit operation. If affirmative, the pursuit operation is enabled and the sequence proceeds to a step S525. Steps S525 to S540 execute calculations for pursuit operation.

A step S525 determines the pursuit correction value COMP by multiplying the present pursuit defocus amount PRED with a coefficient α, for example 0.9. Then a step S530 corrects the defocus amount DEF, by adding the present defocus DEF to the pursuit correction value COMP determined in the step S525. A step S535 replaces the last pursuit defocus amount PLST with the present pursuit defocus amount PRED, thereby preparing for the next process and discrimination of next time. A step S540 turns on the pursuit flag PRSFLG, indicating that the pursuit operation is in progress, and the sequence then proceeds to the next in-focus discrimination/display module M7. The pursuit operation is conducted as explained above.

Steps S545 and S550 are executed when the pursuit operation is identified impossible. A step S545 replaces the last pursuit defocus amount with the present defocus amount DEF, thereby preparing for the next pursuit process. A step S550 resets the pursuit flag PRSFLG to indicate that the pursuit operation is not in progress, and the sequence proceeds to the next in-focus discrimination/display module M7.

Drive Control Module M8

Figure 17:
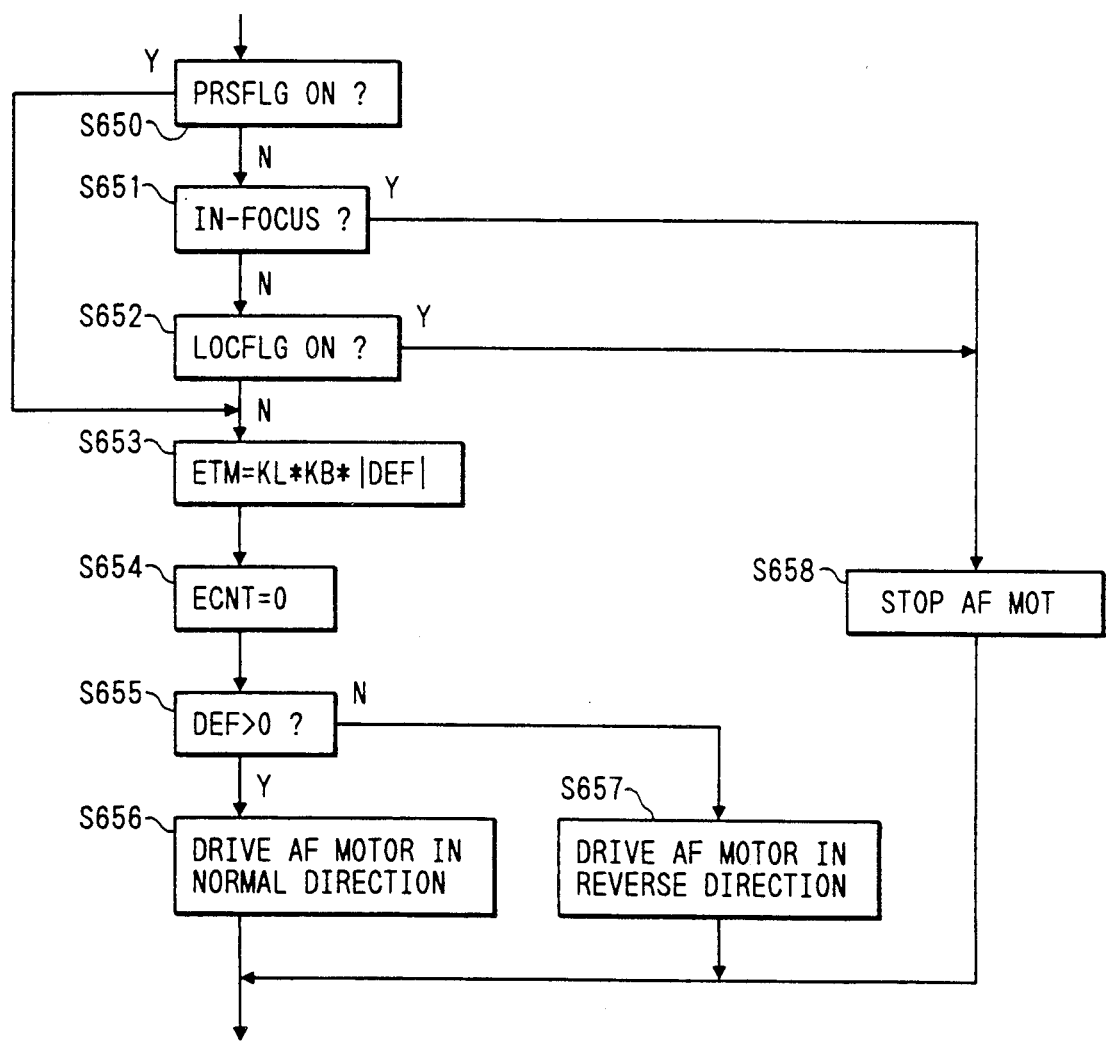
FIG. 17 is a flow chart of the control sequence of a drive control module.

FIG. 17 is a detailed flow chart of the drive control module M8.

A step S650 discriminates whether the pursuit operation is in progress, namely whether the object is moving, and, if it is in progress, the sequence jumps to a step S653 for effecting unconditional drive. If the pursuit is not in progress, namely if normal AF mode is selected or if the object is stationary a step S651 discriminates whether the in-focus discrimination/display module M7 has identified an in-focus state. If so, a step S655 stops the AF motor and the sequence proceeds to the next AGC calculation module M9. If not, a step S652 discriminates whether the focus state detection is impossible, by the state of the flag LOCFLG. If it is impossible, a step S658 stops the AF motor and the sequence proceeds to the next AGC calculation module M8. If the focus state detection is possible, the sequence proceeds to a step S653.

The step S653 calculates the drive amount of the AF motor corresponding to the present defocus amount DEF, or the estimated number ETM of pulses to be supplied from the encoder 52, as follows:

$$ETM = KL \times KB \times |DEF| \qquad (10)$$

wherein KL is the number of rotations of the lens coupling 14 per unit defocus amount of the image plane of the photographing lens; and KB is the number of pulses generated by the encoder 52 per turn of the body coupling 53. Thus the equation (10) gives the number of pulses generated by the encoder 52 when the image plane of the lens is moved by the present defocus amount DEF. The estimated number of pulses thus calculated is stored in the comparison register as the preset number for pulse counter interruption procedure.

A step S654 clears the pulse counter ECNT to zero prior to the start of drive. Steps S655 to S657 determine the direction of drive according to the sign of the present defocus amount DEF, and start the drive. A step S655 discriminates the sign of present defocus amount DEF, and, in case of front focus (positive sign), a step S656 drives the AF motor toward the farther direction. In case of rear focus (negative sign), a step S658 drives the AF motor toward the nearer-position. Then the sequence proceeds to the AGC calculation module M9.

In the foregoing explanation, the focus state detection is conducted in the wide detecting area in the presence of a moving object in the pursuit drive, but such detection in the wide detecting area may also be conducted in the presence of a moving object in the normal AF mode.

In the first embodiment explained above, it is easier to capture the moving object in the focus state detecting area, as the detecting area is automatically made wider if the object is moving. Also in the 3rd example, the detecting area is automatically widened in the course of a pursuit operation, so that the photographer can easily select the object to be captured and continue to retain the object in the detecting area when the pursuit operation is started. In this manner the convenience of use is significantly improved.

[2] 2nd embodiment

Figure 18B:
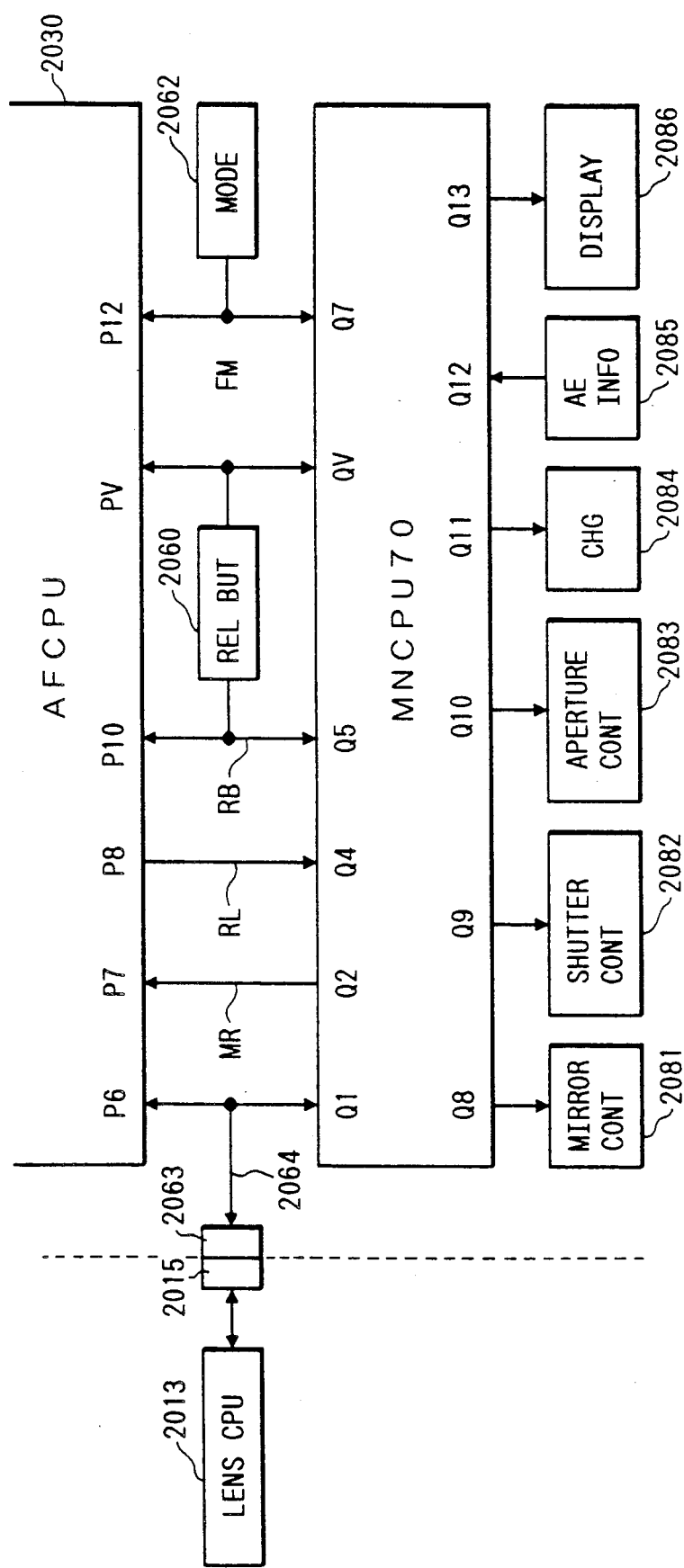
FIG. 18 consisting of FIGS. 18A and 18B, is a block diagram of the focus state detecting apparatus of a second embodiment corresponding to the 4th example.

FIG. 18 shows a second embodiment of the present invention applied to a single-lens reflex camera with interchangeable lens 2010 detachably mounted on a camera body 2020.

When lens 2010 is mounted, a part of the light beam coming from an object is transmitted by a photographing lens 2011, then reflected by a main mirror 2021 provided in the camera body 2020 and guided to a view finder, while another part of the light beam is transmitted by main mirror 2021, then reflected by a sub mirror 2022 and guided, as the focus detecting light beam, to a focus state detecting module 2023.

Figure 19:
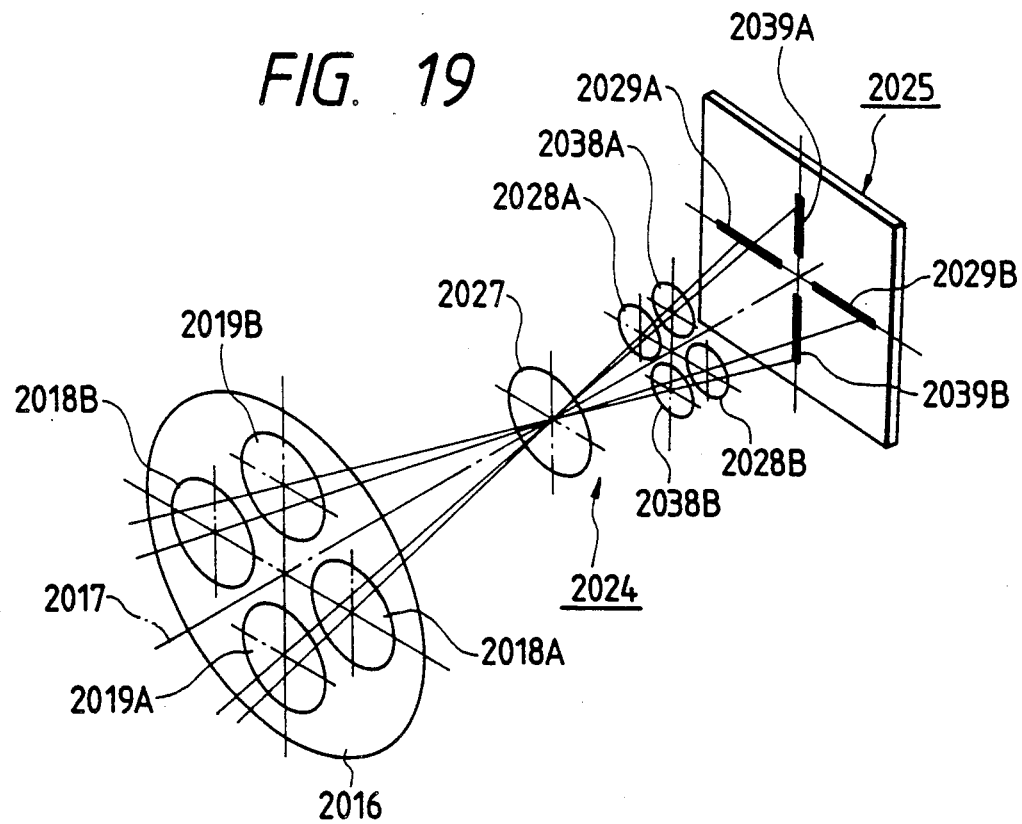
FIG. 19 is a schematic view of a focus state detecting optical system employed in the 2nd embodiment.

FIG. 19 shows an example of the focus state detecting module 2023, which is composed of a focus detecting optical system 2024 consisting of a field lens 2027 and two pairs of re-imaging lenses 2028A, 2028B, 2038A, 2038B, and photoelectric conversion means such as CCD, consisting of two pairs of photosensors 2029A, 2029B, 2039A, 2039B.

Rays passing through areas 2018A, 2018B, 2019A, 2019B which are contained in the exit pupil 2016 of the photographing lens 2011 and are symmetrical to the optical axis 2017 form primary images in the vicinity of the field lens 2027, and further form two pairs of secondary images on two pairs of photosensor arrays 2038A, 2038B, 2039A, 2039B of the photoelectric conversion means 2025 by means of the field lens 2027 and the re-imaging lenses 2028A, 2028B, 2038A, 2038B. When the primary images lie on a plane conjugate with a photographic film (not shown), the relative distance of the secondary images along the photosensor arrays assumes a predetermined value, determined by the structure of the focus state detecting optical system. Also when the primary images are aberrated from the conjugate plane of the film, the relative distance of the paired secondary images on the photoelectric conversion means 2025 varies from the predetermined value, depending on the axial displacement (namely front focus or rear focus) of the primary images. The distance becomes larger or smaller respectively in case of rear focus or front focus.

Figure 20:
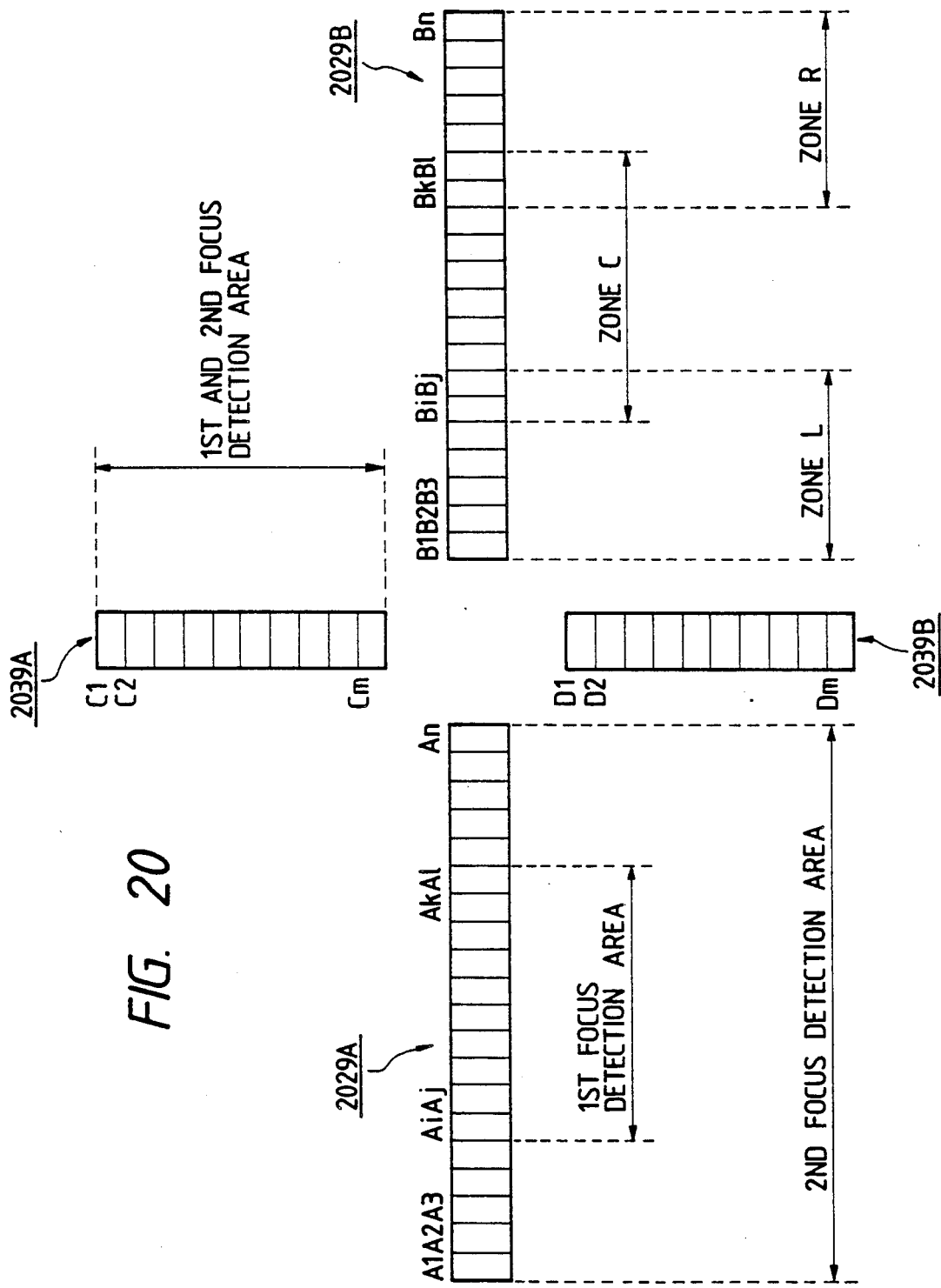
FIG. 20 is a schematic view of photoelectric converting means.

FIG. 20 shows the arrangement of the photosensor arrays on the photoelectric conversion means 2025.

The photosensor arrays 2029A, 2029B are respectively composed of n photosensor elements Ap, Bp (p=1 to n) and are so arranged that the mutually corresponding photosensor elements (A1 and B1, A2 and B2, ...) generate equal outputs when the primary images lie on the conjugate plane of the film.

The photosensor arrays 2039A, 2039B are respectively composed of m photosensor elements Cq, Dq (q=1 to m) and are so arraged that the mutually corresponding photosensor elements (C1 and D1, C2 and D2, ...) generate equal outputs when the primary images lie on the conjugate plane of the film.

In the calculation for focus detection in a first focus detecting area, to be explained later, for a relative shift L=0, there are employed data of elements Ap, Bp (p=i to 1) of the photosensor arrays 2029A, 2029B and those of elements Cq, Dq (q=1 to m) of the photosensor arrays 2039A, 2039B. In the calculation in a second focus detecting area, for a relative shift L=0, there are employed data of elements Ap. Bp (p=1 to n) of the photosensor arrays 2029A, 2029B and those of elements Cq, Dq (q=1 to m) of the photosensor arrays 2039A, 2039B.

Also in the calculation in the second area, for a relative shift L=0, the data of the elements Ap, Bp (p=1 to n) of the photosensor arrays 2029A, 2029B are divided into three zones L, C, R, and the calculation is made in each zone.

The photosensor element constituting the photosensor arrays 2029A, 2029B, 2039A, 2039B is composed of a charge accumulating element such as a photodiode, and executes charge accumulation for a period corresponding to the light intensity on the photoelectric conversion means 2025, thereby providing an output signal suitable for the calculation for focus state detection to be explained later.

Figure 21A:
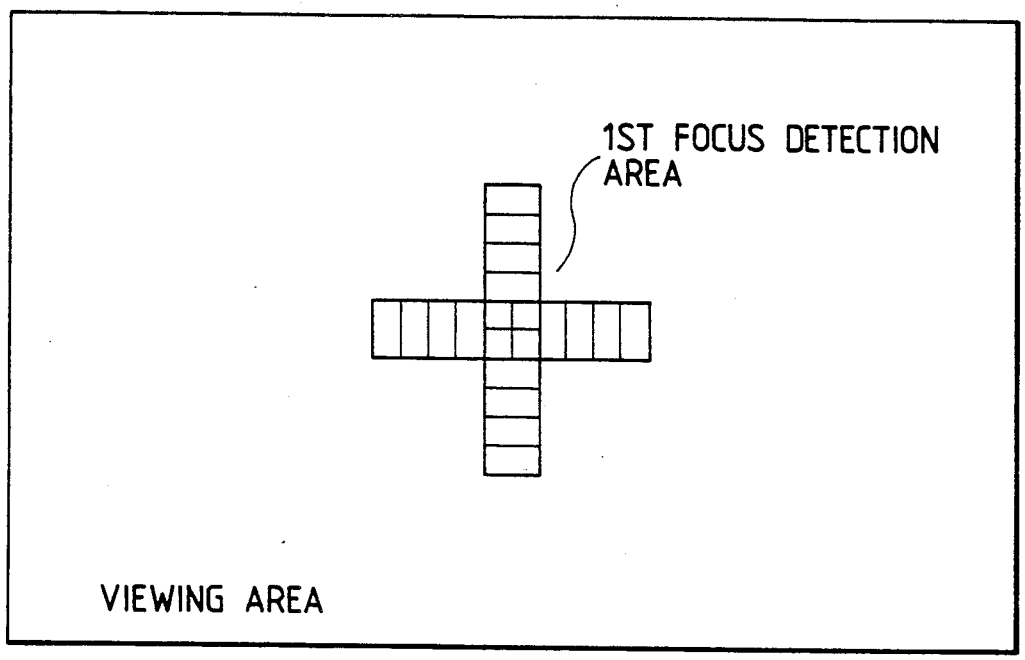
Figure 21B:
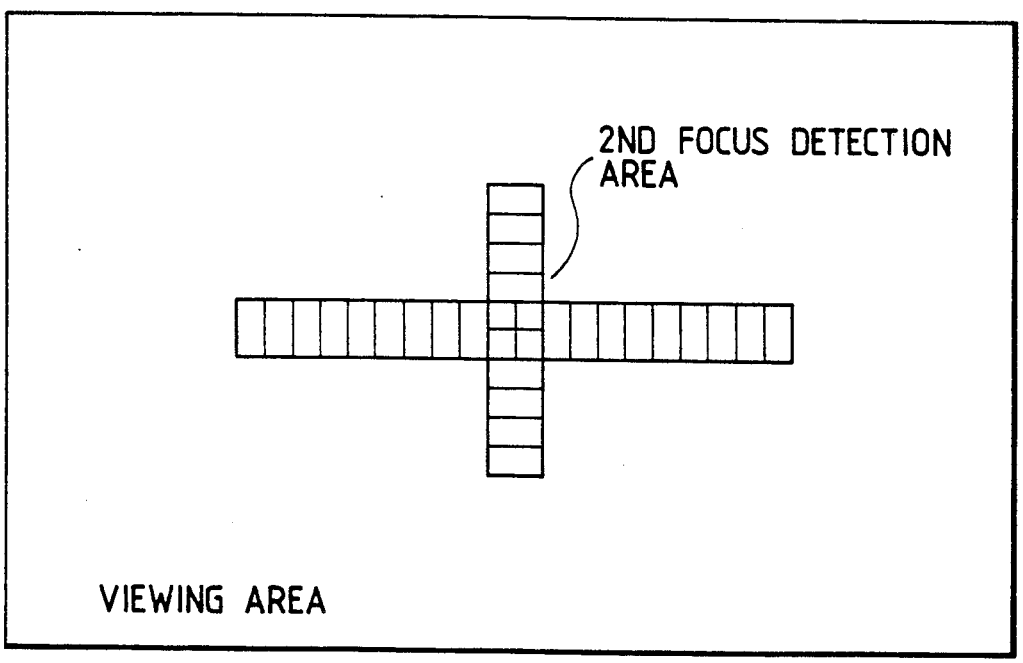

Owing to the above-explained structure of the optical system, there are formed first and second focus detecting areas on the image frame conjugate with the photographic film, as shown in FIGS. 21A and 21B. In the first detecting area shown in FIG. 21A, longitudinal (horizontal) portions, parallel to the logitudinal direction of the image frame, are substantially equal in length to perpendicular (vertical) portions. In the second detecting area shown in FIG. 21B, the longitudinal portions are longer than the perpendicular portions.

Again referring to FIG. 18, a sensor controller means 2026 receives commands for starting and terminating the charge accumulation from a port P4 of the auto focusing CPU (AFCPU) 2030, and sends corresponding control signals to the photoelectric conversion means 2025, thereby controlling the charge accumulation time thereof. It also sends transfer clock signals to the photoelectric conversion means 2025, thereby transferring the output signals of photosensors to the AFCPU 2030 in time-sequential manner. It also sends a synchronization signal, synchronized with the start of transfer of the output signals of photosensors, to the port P4 of the AFCPU 2030, which in response starts the A/D conversion by an internal A/D converter and executes the A/D conversion of the output signals of photosensors received through a port P3, thereby obtaining A/D converted data corresponding to the number of photosensor elements. After the A/D conversion, there is conducted the calculation for focus state detection as will be explained later, for determining the amount of defocus.

Based on the result of focus state detection, the AFCPU 2030 controls, through a port P5, display units 2041, 2042, 2043, 2044 of AF display means 2040.

Also based on the result of focus state detection, the AFCPU 2030 controls the direction and amount of drive of an AF motor 2050, thereby moving the lens 2011 to the focused position.

At first, according to the sign of the defocus amount (front or rear focus), the AFCPU 2030 releases, from a port P2, a drive signal for rotating the AF motor 2050 in a direction for bringing the lens 2011 toward the focused position. The rotation of the AF motor 2050 is transmitted, through a transmission system 2051 composed for example of gears incorporated in the camera body 2020, to a coupling 2053 of the camera body provided at a mount for the lens 2011, and further to a coupling 2014 of the lens and a lens transmission system 2012 composed of gears incorporated in the lens 2010, thereby moving the lens 2011 toward the focused position.

The drive amount of the AF motor 2050 is detected by the amount of rotation of a in the body transmission system 2051, and the amount of rotation is converted into pulse signals by an encoder 2052 for example composed of a photointerruptor and fed back to the AFCPU 2030 through a port P1 thereof. The AFCPU 2030 controls the AF motor 2050 by counting the pulses.

As explained above, the AFCPU 2030 principally controls the auto focusing operation.

The camera body 2020 also contains a main CPU 2070 for principally controlling the sequences of the camera and the exposure operation. The main CPU 2070 receives information on exposure such as the object luminance, film sensitivity, diaphragm aperture, shutter speed etc. from an auto exposure (AE) information unit 2085 through a port Q12, and determines the diaphragm stop value and the shutter speed based on said information. The main CPU 2070 displays the determined data on a display unit 2086 through a port Q13. In the photographing operation, it controls the up-down operation of the main mirror 2021 through a port Q8 and mirror control means 2081, also controls the diaphragm mechanism through a port Q10 and control means 2083, and controls a shutter mechanism through a port Q9 and shutter control means 2082. After the photographing operation, it controls a winding-charging mechanism through a port Q11 and charging control means 2084, in preparation for the next photographing operation.

The lens 2010 is provided with a lens CPU 2013, which is connected to the AFCPU 2030 through a port P6 thereof and to the main CPU 2070 through a port Q1 thereof through a bus 2064 composed of lens contacts 2015 and body contacts 2063 formed in the mount, and sends exposure information such as fully-open aperture value to the main CPU 2070 and AF-related information of the lens to the AFCPU 2030.

A release button signal RB, indicating the state (open, half-push, full-push) of a shutter release button 2060, is sent to a port P10 of the AFCPU 2030 and a port Q5 of the main CPU 2070. A power supply port PV of the AFCPU 2030 and a power supply port QV of the main CPU 2070 are turned on or off respectively when the release button 2060 is depressed by half- or full-push, or is non-depressed.

Focus mode selector means 2062 is provided for selecting either a single AF mode (focus locking and shutter releasing after focusing), or a continuous AF mode (shutter releasing being always enabled; no focus locking after focusing), and sends a focus mode signal FM, indicating the selected mode, to a port P12 of the AFCPU 2030 and a port Q7 of the main CPU 2070.

There are also provided direct signal lines between the AFCPU 2030 and the main CPU 2070. A mirror signal MR, indicating a mirror-up state, is sent from a port Q2 of the main CPU 2070 to a port P7 of the AFCPU 2030, which, in response, prohibits the charge accumulation of the photoelectric conversion means 2025 during the mirror-up state. A release enable signal RL, indicating an in-focus state, is sent from a port P8 of the AFCPU 2030 to a port Q3 of the main CPU 2070, which, in response, executes the shutter releasing operation in case of the single AF mode.

In the foregoing there has been explained the outline of structure and function of the 2nd embodiment of the present invention applied to a single-lens reflex camera. In the following there will be given a detailed explanation of the correlation calculation, which is the essential part of the present invention, to be executed in the AFCPU 2030.

At first an outline of the correlation calculation will be explained with reference to FIGS. 22, 23 and 24.

The output data of the photosensor elements obtained by A/D conversion of the AFCPU 2030 are represented by ap, bp (p=1 to n) and cq, dq (q=1 to m), respectively corresponding to the photosensor elements Ap, Bp (p=1 to n) and Cq, Dq (q=1 to m). For the purpose of simplicity, the following explanation will be given only as to the output data ap, bp, but the same applies to the output data cq, dq. A calculation according to an equation (2001) is applied to the data ap, bp to determine the correlation amount C(L):

$$C(L) = \sum_i |a(i + L) - b(i)| \tag{2001}$$

wherein L is an integer, indicating the amount of relative shift counted by the pitch of photosensor elements in the paired photosensor arrays. Also in the equation (2001), the range of the parameter i can be suitably determined, depending on the shift L and the number n of data.

Figure 22:
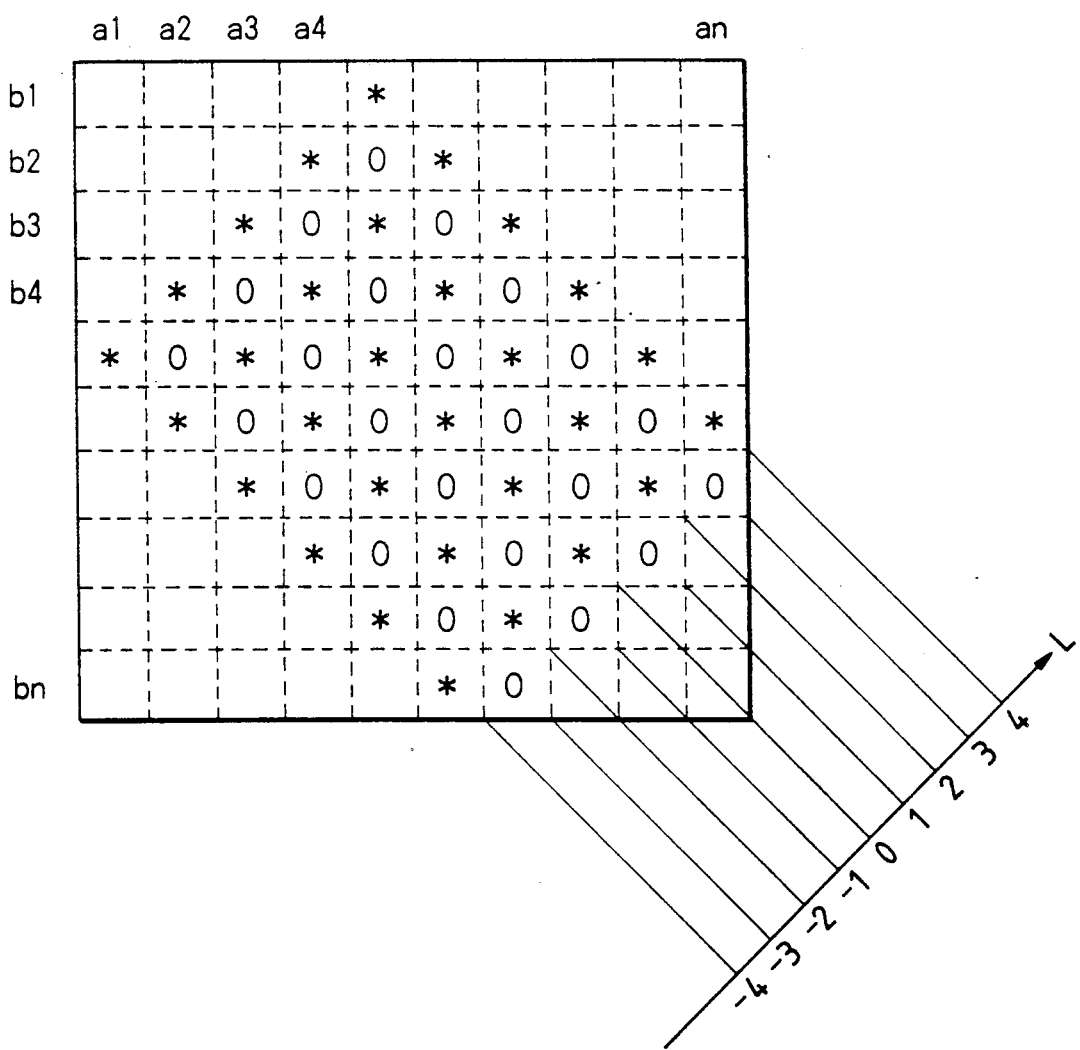

When the output data ap, bp are laid out in a matrix as shown in FIG. 22, the combination of the output data in (2001), or the range of the parameter i can be selected as ±4. In case of FIG. 22, the shift L is changed in a range from −4 to +4, and the marks * and o indicate the combinations of output data used for calculation for each value of L. Under such condition, the range of the parameter i can be represented by:

$$INT((L+1)/2+3) \leq i \leq INT((L+1)/2+n-2) \tag{2002}$$

Figure 23:
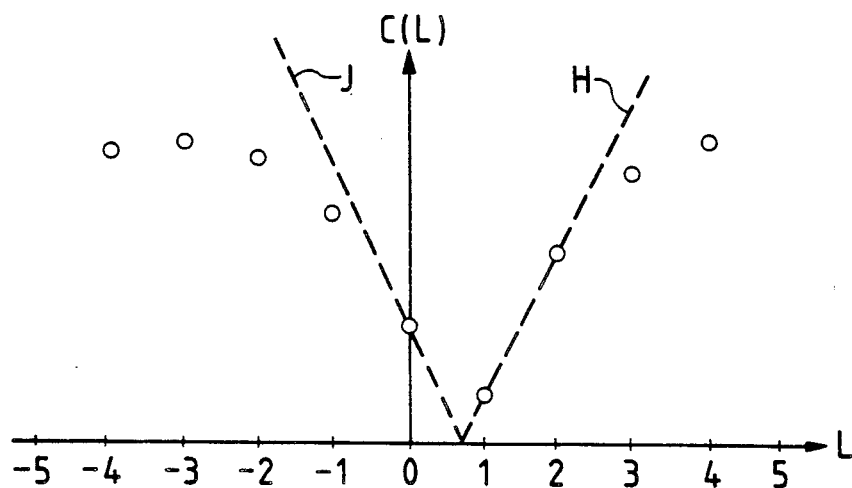

The result of calculation according to the equation (2001) is shown in FIG. 23, indicating the shift L and the correlation value C(L) respectively in the abscissa and in the ordinate. As shown in FIG. 23, the correlation value C(L) becomes minimum at a shift L where the output data of the photosensor elements have a high correlation.

Figure 24:
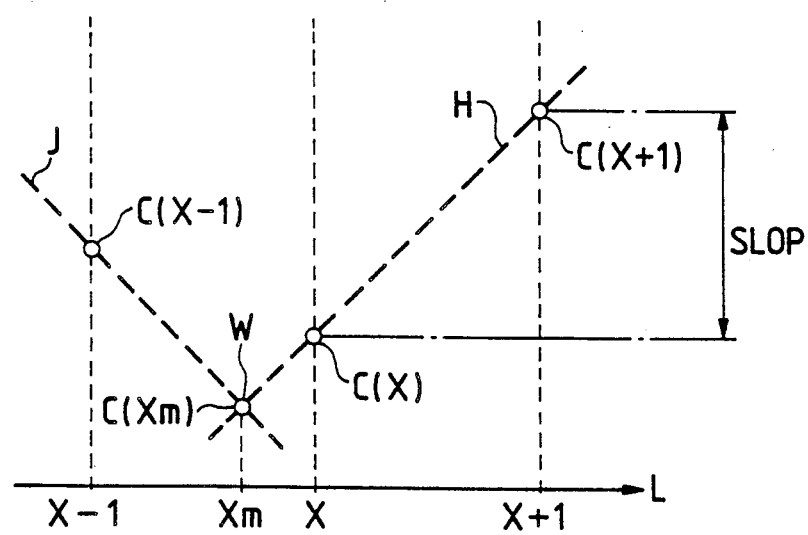

In practice, however, the correlation value C(L) can only be obtained in non-continuous points, so that the minimum value $C(L)_{min}$ for continuous change of shift is determined from three-point interpolation shown in FIG. 24. It is assumed that the non-continuous correlation C(L) reaches minimum at a shift L=x, thus assuming a value C(x). Thus the correlation values C(L) for neighboring shifts x−1 and x+1 are C(x−1) and C(x+1). Thus a straight line H is drawn passing through the minimum correlation C(x) and the larger one of two other correlation values C(x−1) and C(x+1), which is C(x+1) in the case shown in FIG. 24. Then a line J is drawn passing through the remaining correlation value C(x−1) and with an inclination opposite to that of the line H, and the crossing point W of lines H, J is determined.

The coordinates of point W, represented by a shift xm and the corresponding correlation C(xm), can be written as follows:

$$xm = x + (D/SLOP) \tag{2003}$$

$$C(xm) = C(x) - |D| \tag{2004}$$

wherein D and SLOP are defined as follows:

$$D = \{C(x-1) - C(x+1)\}/2 \tag{2005}$$

$$SLOP = MAX(C(x+1) - C(x), C(x-1) - C(x)) \tag{2006}$$

The amount of defocus DEF can be determined as follows from the shift xm obtained from (2003):

$$DEF = (KX) \times (PY) \times (xm) \tag{2007}$$

wherein PY is the pitch of photosensor elements along the direction of array, and KX is a coefficient determined by the structure of the focus detecting optical system shown in FIG. 19.

Also a larger value of the parameter SLOP determined in (2006) indicates a deeper sag in the correlation value C(L) shown in FIG. 22, thus a higher reliability of the determined defocus amount DEF.

In the foregoing there has been given the outline of the correlation calculation. In the following there will be explained the switching of the first and second detecting areas, and the method of calculating the correlation.

Figure 25A:
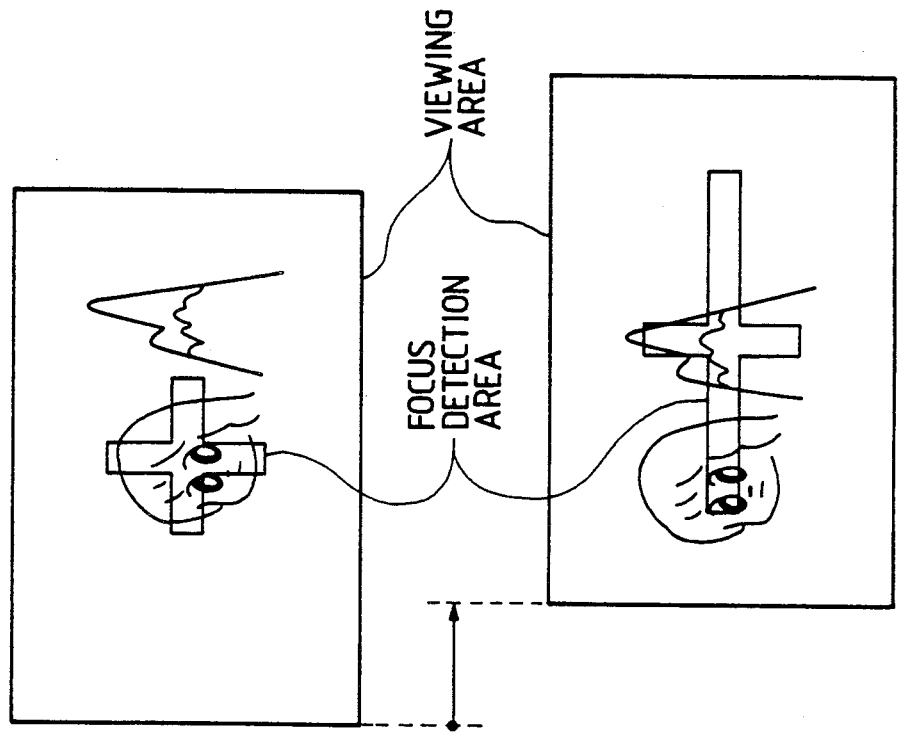
Figure 25B:
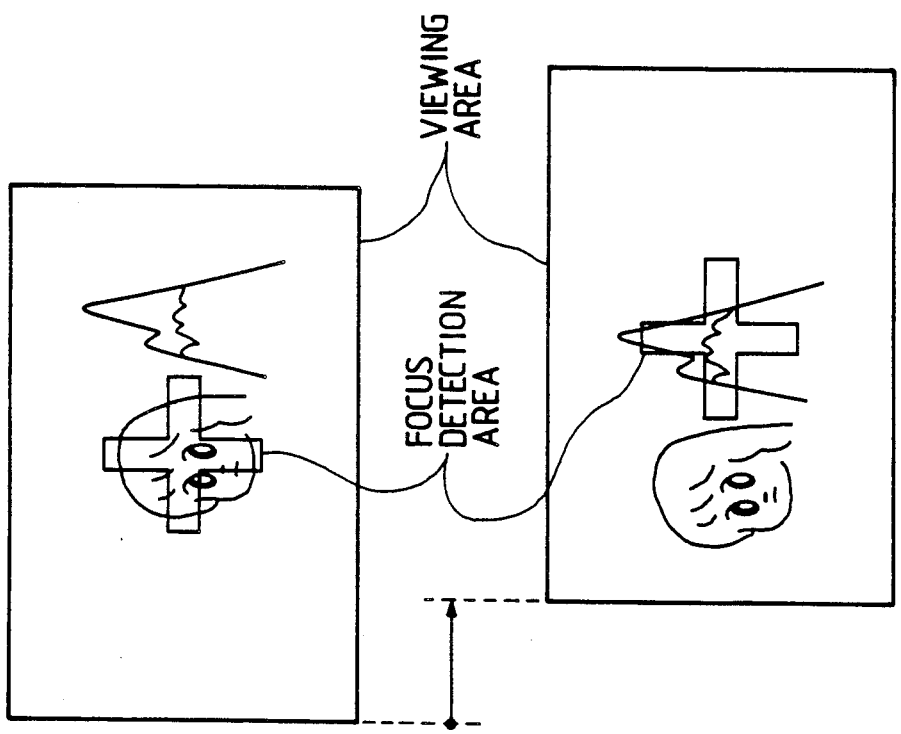

FIGS. 25A and 25B show the principle of the 2nd embodiment of the present invention. In the conventional example shown in FIG. 25A, in which the focus detecting area is fixed, the object captured in the detecting area may escape therefrom in case of a vibration (referred to earlier), and another unintended object may enter the detecting area. Thus the intended object may become out of focus because the focus detection is conducted on unintended object. On the other hand, in the present embodiment, the focus detecting area is widened in case of vibration, so that the object captured in the detecting area prior to vibration can still be retained in said area. Also the focus detecting operation in the wide detecting area selects an object close to the object captured prior to the vibration, so that it is possible to prevent unstable auto focusing in which the lens is driven for an unintended object.

Figure 26:
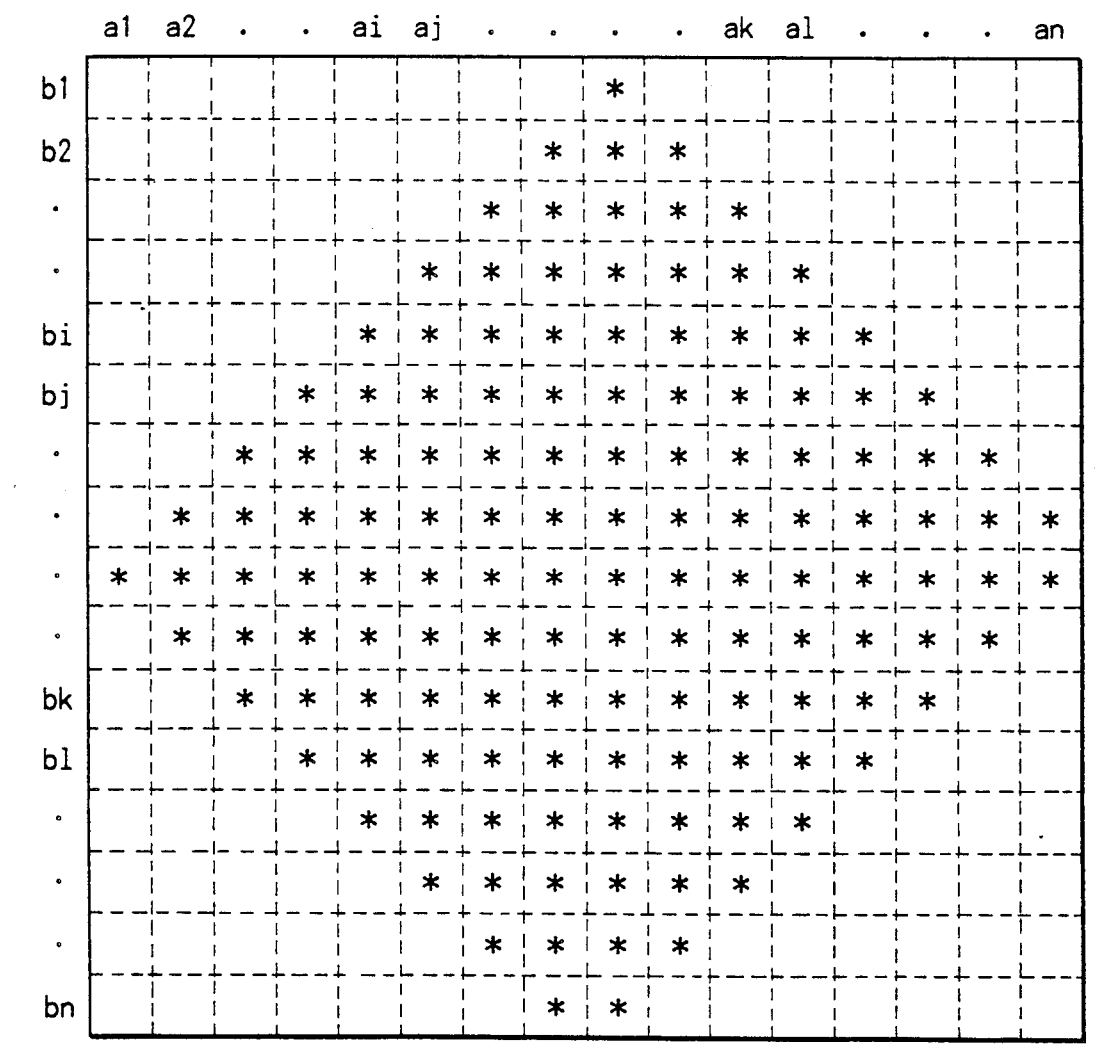

FIG. 26 is a matrix of output data ap, bp in which the marks * indicate the area of correlation calculation according to the equation (2001), in the longitudinal portions of the first focus detecting area or the zone C of the second focus detecting area. At shift L=0, the output data used for calculation are ai to al and bi to bl.

FIG. 27 is a matrix of output data ap, bp in which the marks L, R respectively indicate the areas of correlation calculation by the equation (2001) in the zones L and R of the second focus detecting area. For a shift L=0, the output data used are al to aj, bl to bj for the zone L, and ak to an, bk to bn for the zone R.

In the perpendicular portions of the first and second detecting areas, the correlation calculation is conducted in similar areas as in FIG. 26.

Figure 28A:
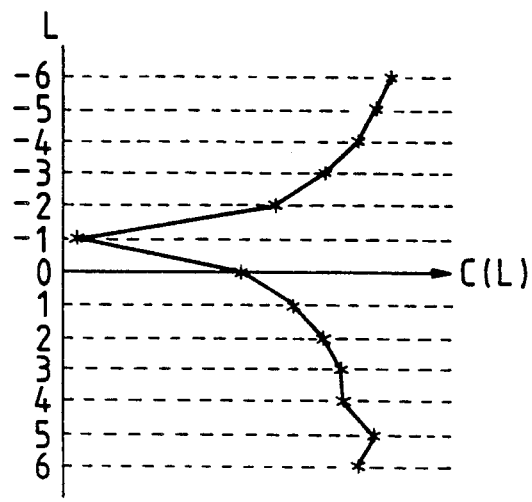
Figure 28B:
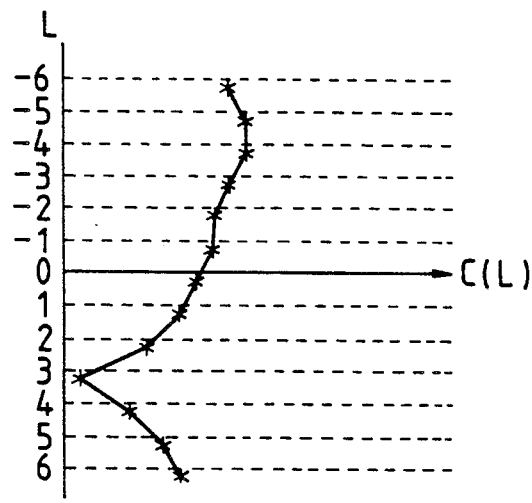
Figure 28C:
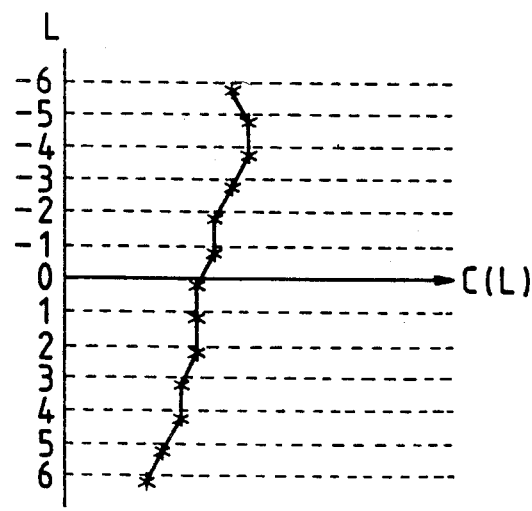

FIGS. 28A, 28B and 28C are graphs showing examples of the correlation value C(L) obtained by the correlation calculation as a function of the shift L. FIG. 28A shows a case in which the object is close to the in-focus position, and the reliability SLOP is relatively high. FIG. 28B shows a case in which the object is considerably out of focus, with a low reliability SLOP. FIG. 28C shows a case of an object of low contrast, for which the focus state detection is not possible as the correlation value C(L) does not show a sag.

Figure 29:
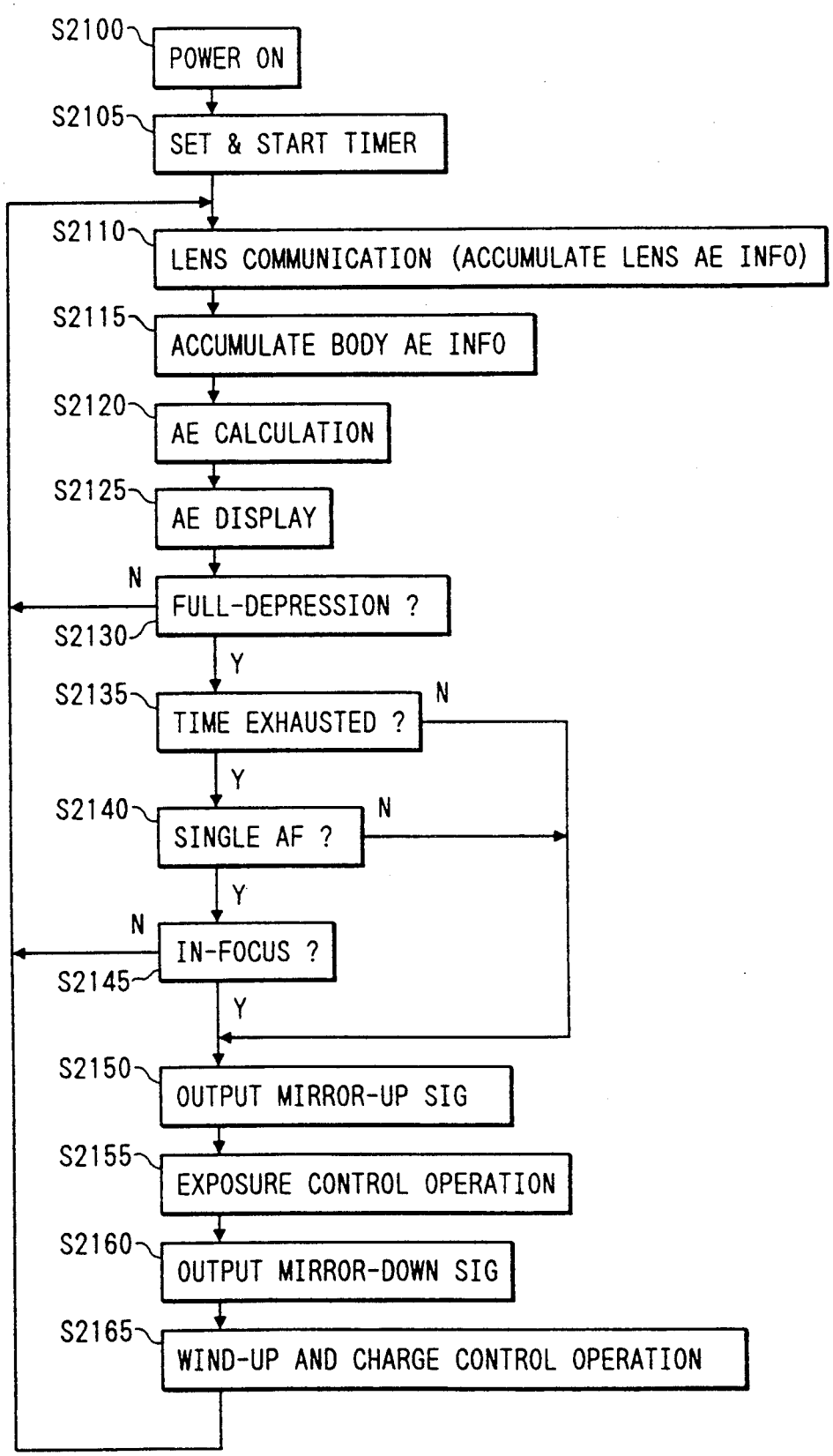
FIG. 29 is a flow chart of the control sequence of a main CPU.

FIG. 29 is a flow chart of the control sequence of the main CPU 2070.

When the shutter release button is half pushed, the main CPU 2070 is powered to start the function thereof from a step S2100. At first a step S2105 sets an internal timer, for measuring the time from the start of power supply, at a predetermined value and starts the timer. Steps S2110 to S2125 execute exposure calculation. A step S2110 collects the AE information of the lens through communication with the lens CPU. Then a step S2115 collects the AE information of the camera body from the AE information means. Then a step S2120 executes AE calculation based on the collected AE information, and a step S2125 displays the result of calculation on the display unit.

Then a step S2130 discriminates whether the release button signal RB is in a state of full-push, and, if not, the sequence returns to the step S2110 to repeat the exposure calculation. If in the full-push state, a step S2135 discriminates whether the timer set in the step S2105 has expired, and, if not expired, namely if the shutter release button is full-pushed within a predetermined time from the start of power supply by the half-push of button, an exposure control operation is started from a step S2150, regardless of the selected focusing mode. In the conventional system, the shutter cannot be released until the in-focus state is reached in the single AF mode. Consequently, if the photographer wishes to release the shutter immediately, he has to switch the camera to the continuous AF mode.

The single AF mode is to enable the focusing operation by the half-push of the shutter release button and to disable the exposure operation by the full-push of said button, and, after the focusing operation, to disable the focusing operation thereafter and to enable the exposure operation by the full-push of the release button.

On the other hand, the continuous AF mode is to simultaneously enable the focusing operation by the half-push of the release button and the exposure operation by the full-push of the release button, and, after the completion of focusing, to continue to enable the focusing operation and the exposure operation.

In the present embodiment, the shutter releasing is enabled regardless of the selected focusing mode if the release button is full-pushed within a predetermined time from the start of power supply, so that, in case of urgent necessity, the photographer can release the shutter by leaving the button once and fully pushing the button again. Thus the convenience of use can be improved.

If a step S2135 identifies that the timer has expired, a step S2140 discriminates, by the focus mode signal FM, whether the single AF mode is selected. If not, namely if the continuous AF mode is selected, the sequence proceeds to the step S2150 to initiate the exposure control operation. If the single AF mode is selected, a step S2145 discriminates, by the release enable signal RL, whether the in-focused state has been reached. If not, the exposure control operation is not conducted, and the sequence returns to the step S2110 to repeat the exposure calculation. If the in-focus state has been reached, the exposure control operation is initiated at the step S2150.

A step S2150 releases the mirror signal MR indicating a mirror-up state. A step S2155 executes exposure control, by controlling the mirror controller, shutter controller and aperture controller. A step S2160 releases the mirror signal MR indicating a mirror-down state. Then a step S2165 executes film winding and shutter charging, by controlling the winding-charging means, and the sequence then returns to the step S2110 for effecting the exposure calculation.

Figure 30:
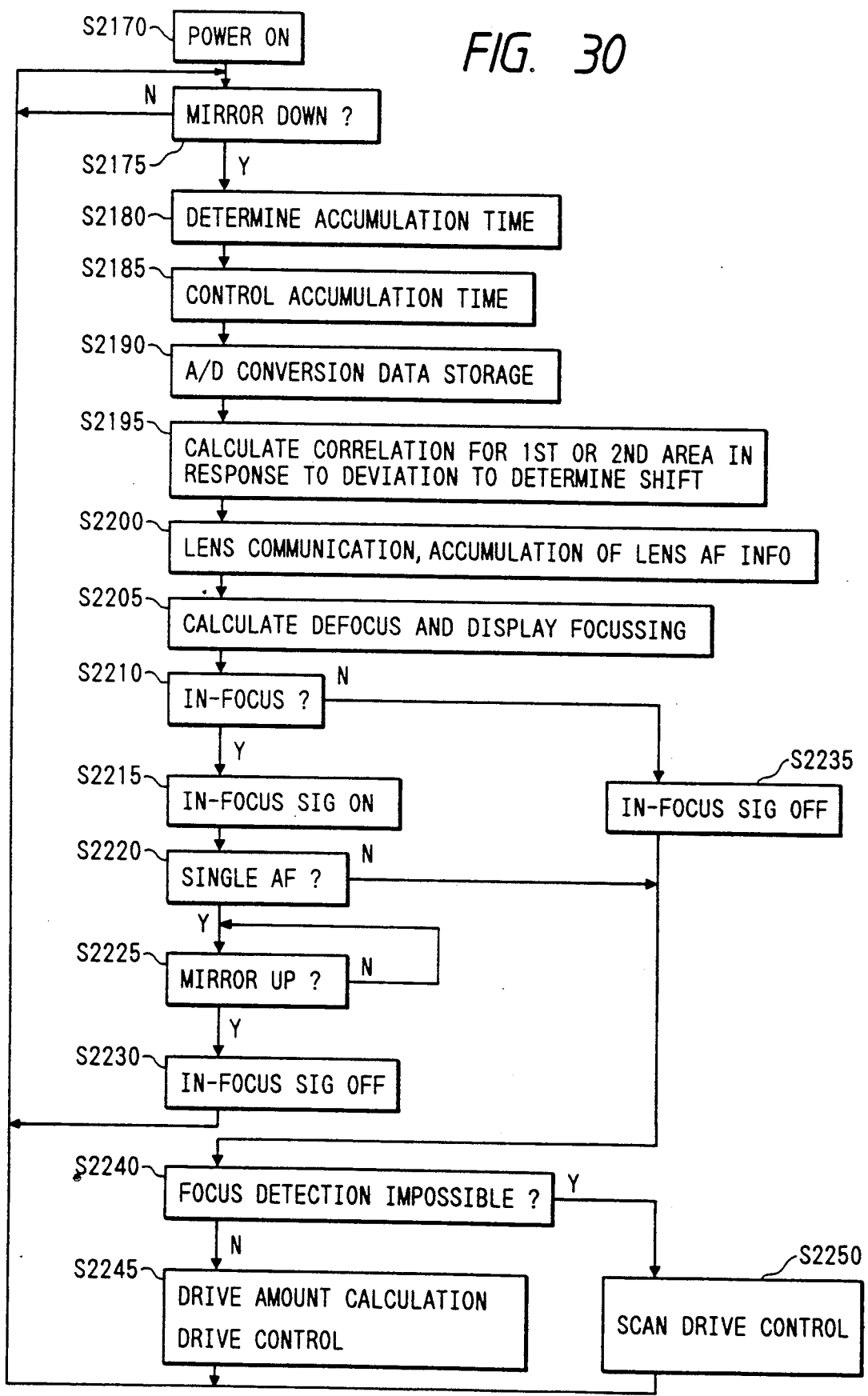
FIG. 30 is a flow chart of the control sequence of an AFCPU.

FIG. 30 is a flow chart of the control sequence of the AFCPU 2030.

When the main CPU 2070 is powered by the half-push of the shutter release button, the AFCPU is activated in a step S2170. A step S2175 identifies, by the mirror signal MR, whether the mirror is in a down-state, and, if not, step S2175 is repeated without proceeding to the charge accumulation in the photoelectric conversion means. If the mirror is down, a step S2185 determines the present charge accumulation time, based on the preceding charge accumulation time and the data of the photosensor elements. Immediately after the start of power supply, the charge accumulation time is set at a predetermined value. A step S2185 controls, by the sensor control means, the charge accumulation time of the photoelectric conversion means at the time determined in the step S2180. Then a step S2190 terminates the charge accumulation, executes A/D conversion of the output data transferred from the photosensors, and stores the data in a memory.

A step S2195 detects vibration as will be explained later, and executes correlation calculation in the relatively narrow first detecting area or in the relatively wide second detecting area respectively in the absence or presence of vibration to determine the shift amount.

A step S2200 collects the AF information of the lens by communication with the lens CPU. Then a step S2205 calculates the defocus amount based on the AF information and the shift amount determined in the step S2195, and displays the result of calculation by AF display means.

A step S2210 discriminates whether the defocus amount is in the in-focus zone, and, if not, a step S2235 shifts the signal RL to a state indicating non-focused state, and the drive control operation is started from a step S2240. If the defocus amount is in the in-focus zone, a step S2215 shifts the signal RL to an in-focus state, and a step S2220 discriminates, by the focus mode signal FM, whether the single AF mode is selected. If not, namely if the continuous AF mode is selected, the drive control operation is started in a step S2240. On the other hand, in case of the single AF mode, a step S2225 awaits the mirror-up state indicated by the mirror signal MR, and, when the mirror-up state is reached, a step S2230 shifts the signal RL to the non-focused state. Then the sequence returns to the step S2175 for detecting the mirror-down state, thus starting the next focus detecting cycle. The steps S2225 and S2230 enable, in the single AF mode, the photographing operation only once after the focusing.

The step S2240 discriminates whether the focus detection has been possible this time, and, if possible, calculates the drive amount of the photographing lens from the defocus amount determined in the step S2245 and executes the driving operation with the AF motor and the encoder based on the drive amount. Upon completion, the sequence returns to the step S2175 for detecting the mirror-down state, thereby initiating the next focus detecting cycle. If the focus detection is impossible, a step S2250 starts a lens scanning operation in a predetermined direction. Then the sequence returns to the step S2175 for detecting the mirror-down state, thereby starting the next focus detecting cycle.

Figure 31:
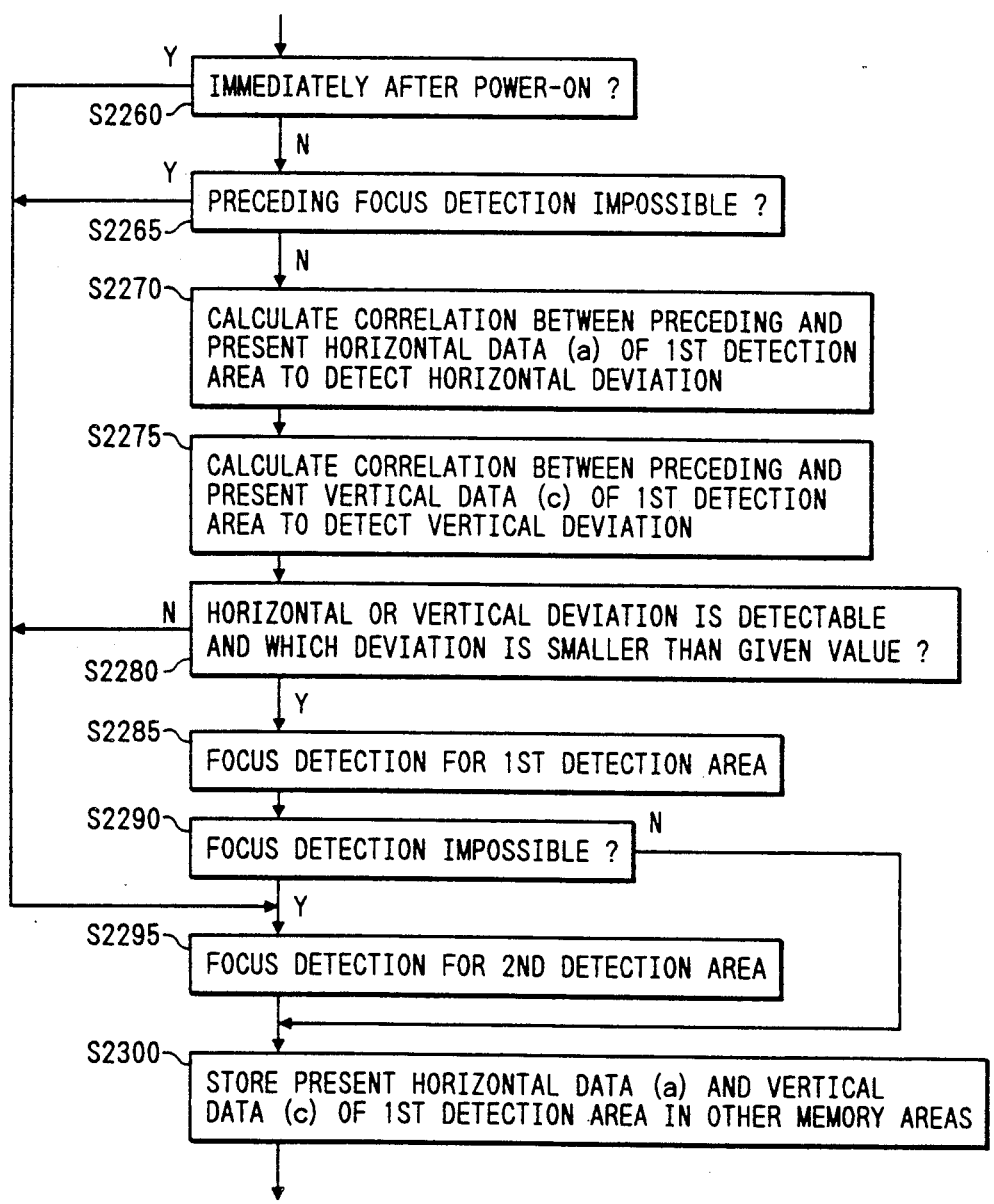
FIGS. 31, 32A and 32B are respectively a flow chart and charts showing an example of the operation of the apparatus shown in FIG. 1.

FIG. 31 is a flow chart showing the details of an example of the vibration detection and focus detection executed in the step S2195 in FIG. 30.

Figures 32A, 32B:
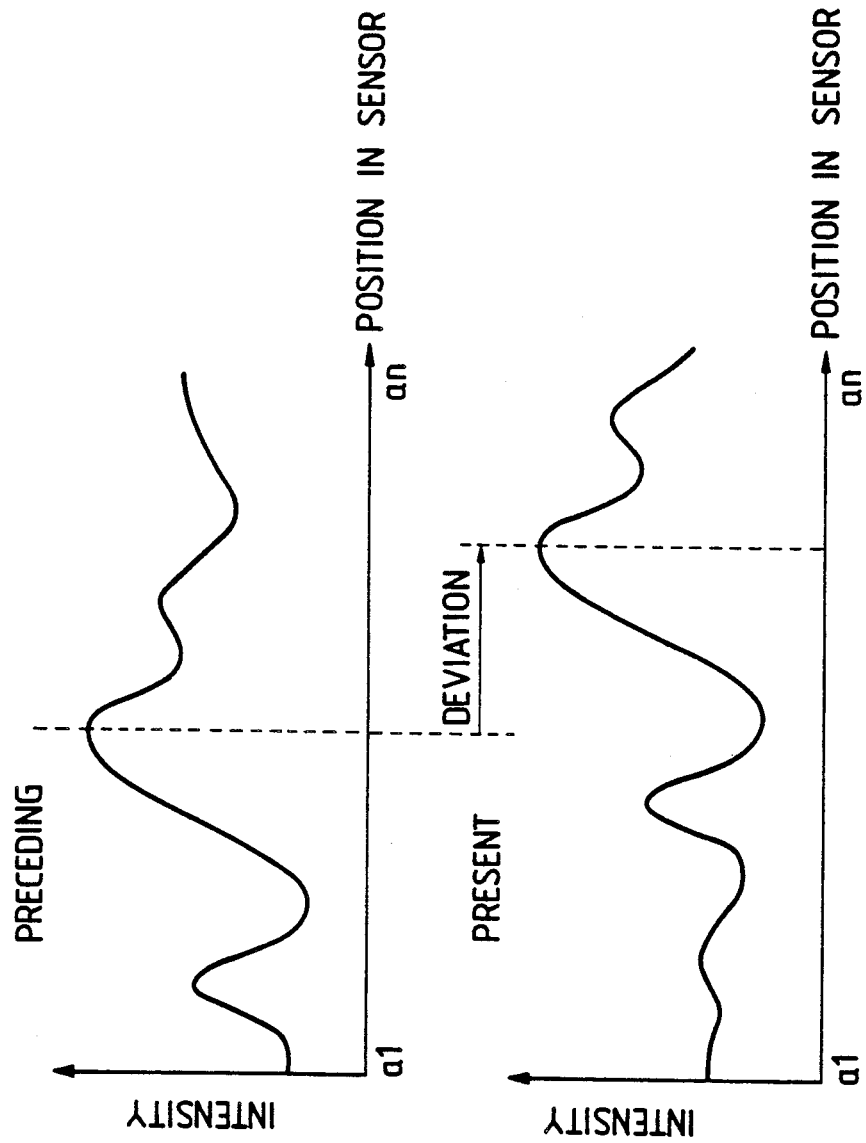

At first a step S2260 discriminates whether the power supply has just been turned on. If the power supply has just been turned on, the detection of vibration is not possible due to the lack of preceding data of the photosensor elements, so that the sequence proceeds to a step S2295 for effecting the focus state detection in the wide second detecting area. On the other hand, if the power supply has been turned on for a certain time, a step S2265 discriminates whether the focus detection was impossible in the preceding cycle. If it was impossible in the preceding cycle, the detection of vibration is impossible and the sequence proceeds to the step S2295 for effecting the focus state detection in the wide detecting area. If the focus detection was possible in the preceding cycle, a step S2270 effects the aforementioned correlation calculation with the data ap of the longitudinal portions of the first focus detecting area in the preceding cycle and the corresponding data ap of the present cycle, thereby determining the shift amount. As shown in FIG. 32, the shift between the preceding data and the present data corresponds to the mutual vibration of the object and the camera, in the direction of array of photosensor elements, during a period from the preceding cycle to the present cycle. Consequently the shift amount determined in the step S2270 indicates the vibration in the lateral direction. Then a step S2275 executes the correlation calculation with the data cq of the perpendicular portions of the first focus detecting area in the preceding cycle and the corresponding data cq of the present time, thereby obtaining the vibration in the vertical direction.

Then a step S2280 discriminates whether at least one of the horizontal vibration and the vertical vibration determined in the steps S2270 and S2275 is detectable and whether the amount of said vibration does not exceed a predetermined value. If this condition is not met, there is identified the generation of vibration, and the sequence proceeds to a step S2295 for effecting the focus detection in the wide second detecting area. On the other hand, when the condition of the step S2280 is met, vibration is considered absent and a step S2285 effects the focus detection in the narrow first detecting area. Then a step S2290 discriminates whether the focus detection has been possible, and, if impossible, a step S2295 repeats the focus detection again in the second detecting area. If the focus detection is possible in the step S2290 or if the focus detection is conducted in the second detecting area in the step S2295, the sequence proceeds to a step S2300 for storing the horizontal data ap and the vertical data cq of the first detecting area of the present cycle in different memory areas for the vibration detection next time.

Figure 33A:
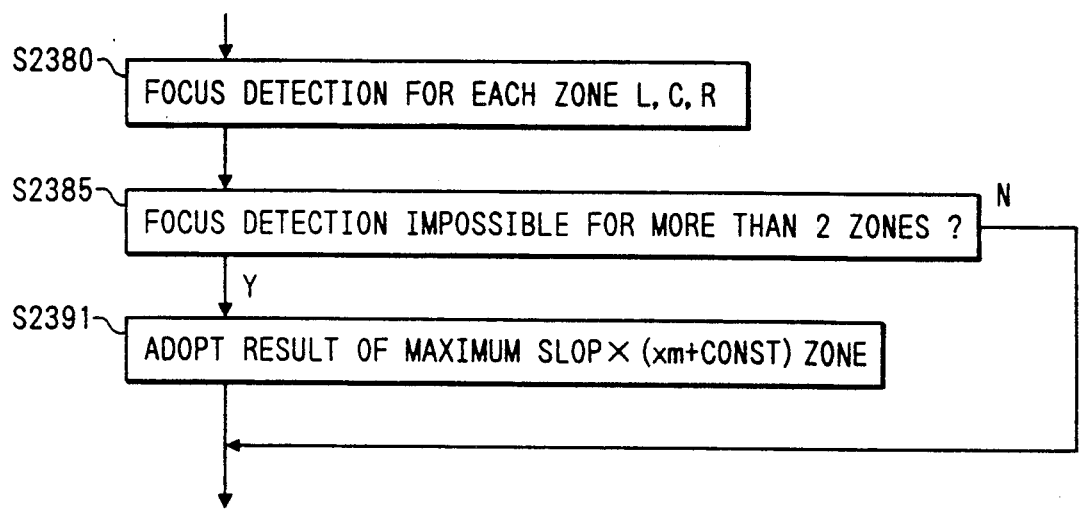
FIGS. 33A and 33B is a flow chart of focus state detection.

FIG. 33A is a flow chart showing an example of focus detection in the second focus detecting area executed in the step S2295 in FIG. 31.

A step S2380 executes correlation calculations in the zones L, C, R, employing the areas shown in FIG. 27, thus determining the shift amounts in respective zones. A step S2385 discriminates whether the focus detection has been possible in at least two zones. If the condition of the step S2385 is not met, the sequence is terminated. If the condition is met, a step S2390 selects the result of a zone. A step S2391 selects the result of focus detection of a zone for which the product of the reliability SLOP and a sum of the shift xm of best correlation and a predetermined value is largest. If the selection is made solely by the reliability, priority is given to a zone which is close to the in-focus state and which is not too much out of focus. The method of the step S2391 provides weighting the shift amount to the reliability, so that an out-of-focus object which originally has a high contrast and a high reliability can be captured.

Figure 33B:
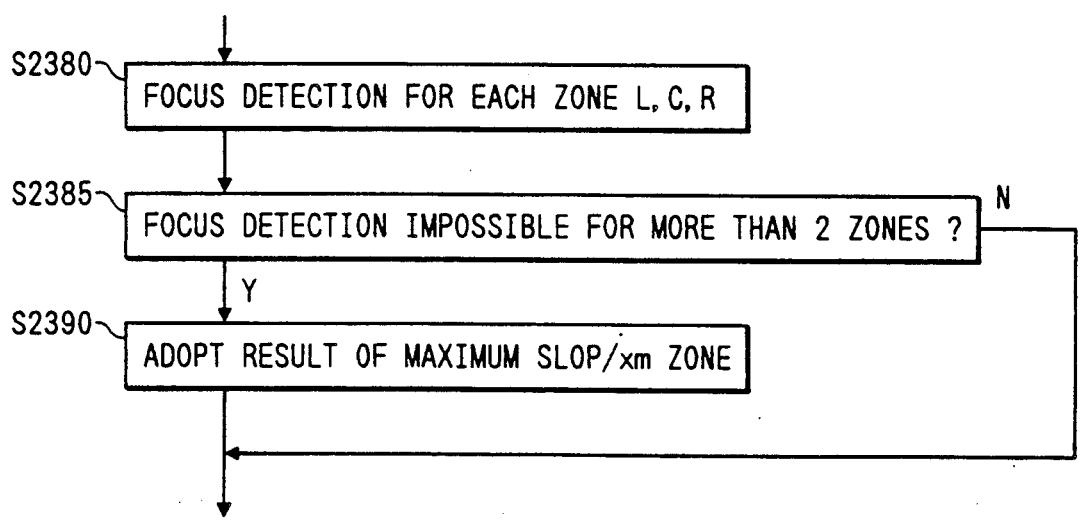

FIG. 33B is a variation of FIG. 33A and is different only in the step S2391. In FIG. 33B, the step S2391 is replaced by a step S2390 for selecting the result of focus detection in a zone for which the reliability SLOP divided by the shift xm of best correlation is largest. Thus the focus state detection in the second detecting area is completed. Priority is given to a zone of higher contrast if the selection is made solely by the reliability. On the other hand, the method of the step S2390 gives priority to a zone in the vicinity of the in-focus position, as the reliability is weighted by the reciprocal of the shift amount. In this method, even if the object escapes from the narrow detecting area, for example by vibration, after focusing therein, there is obtained a result close to the in-focus state as long as the object can be captured in the wide detecting area, so that the object can be maintained in focus.

Figure 34:
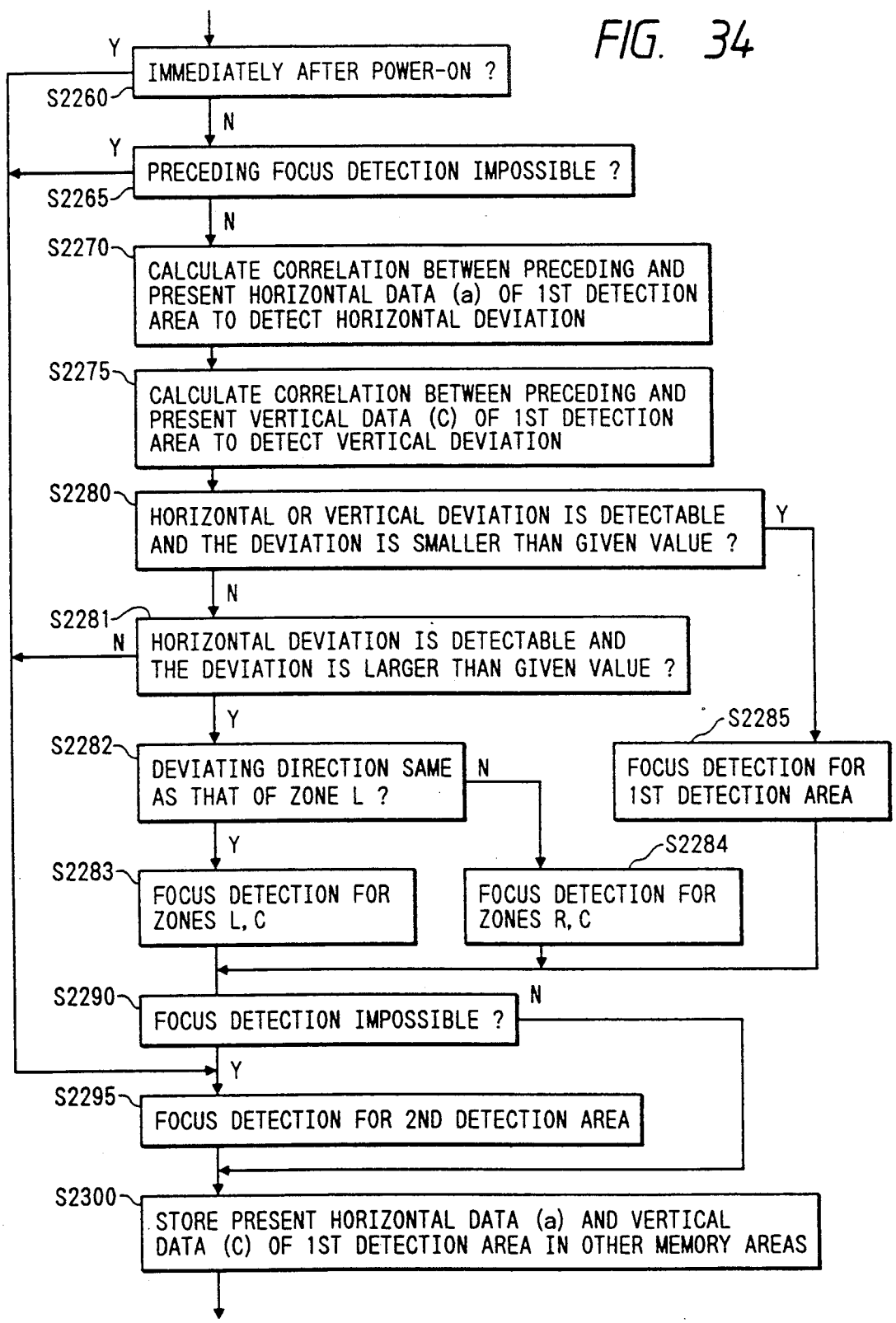
FIG. 34 is a flow chart of another example of the operation of the apparatus shown in FIG. 1.

FIG. 34 shows a variation of FIG. 31, different in the steps S2281 to S2284. In the sequence shown in FIG. 31, when the condition of the step S2280 is met, there is identified the presence of vibration and the sequence proceeds to the step S2295 for focus detection in the wide second detecting area. On the other hand, in the sequence shown in FIG. 34, when presence of vibration is identified, the detecting area is selected according to the direction of vibration. At first a step S2281 discriminates whether the horizontal vibration is detectable and exceeds a certain value. If the condition of step S2281 is not met, the sequence proceeds to the step S2295 for effecting the focus detection in the wide second detecting area. If the condition is met, a step S2282 identifies the direction of vibration, by the sign of the shift amount. If the vibration is toward the zone L, a step S2283 executes the focus detection in the zones L and C. If it is toward the zone R, a step S2284 executes the focus detection in the zones R and C. Then the sequence proceeds to the step S2290.

Figure 35:
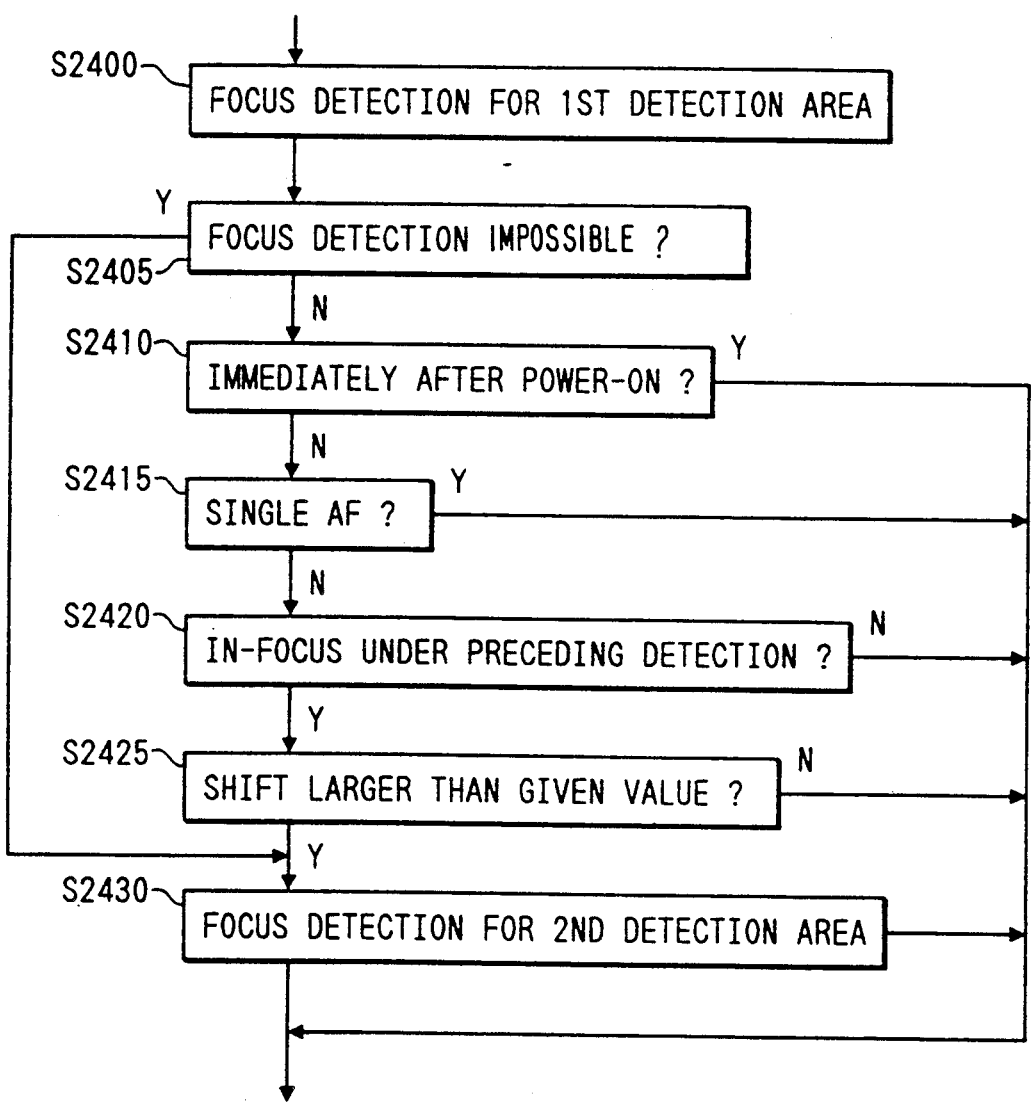
FIGS. 35 and 36 are respectively a flow chart and a chart of another example of the apparatus shown in FIG. 1.

FIG. 35 is a flow chart showing an example of the detection of vibration and focus state in the step S2195 shown in FIG. 30.

Figure 36:
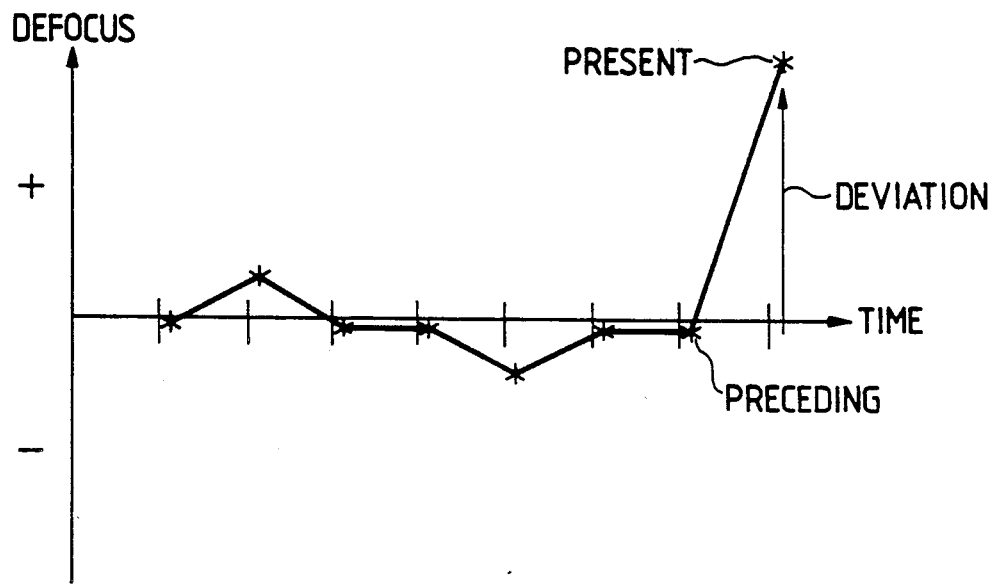

In the sequence shown in FIG. 35, the vibration is detected by a steep change in the defocus amount or in the shift amount as shown in FIG. 36. At first a step S2400 executes the focus detection in the narrow first detecting area. Then a step S2405 discriminates whether the focus detection has been impossible, and, if impossible, a step S 2430 executes the focus detection again in the wide second focus detecting area. If it has been possible, a step S2410 discriminates whether the power supply has just been turned on. If the power supply has just been turned on, the detection of vibration is impossible because of lack of the preceding result of focus detection, so that the sequence is terminated. If the power supply has been turned on for a certain time, a step S2415 discriminates, by the focus mode signal FM, whether the single AF mode is selected. In case of the single AF mode, the sequence is terminated since the focusing operation is locked after the focusing is once completed, so that correct result of focus detection cannot be obtained. If the single AF mode is not selected, a step S2420 discriminates whether the focusing is completed in the preceding cycle. If the focusing is not completed in the preceding cycle, the sequence is terminated without vibration detection. If the focusing is completed in the preceding cycle, a step S2425 detects vibration, by discriminating whether the present shift amount exceeds a predetermined value. If not, the vibration is identified absent and the sequence is thus terminated. In case of exceeding, the vibration is identified present, and a step S2430 effects the focus detection in the second detecting area.

FIG. 37 shows another embodiment for detection of vibration in the step S2195 shown in FIG. 20, wherein each of horizontal vibration detecting means 2200 and vertical vibration detecting means 2210 is composed of an acceleration sensor 2202 and an integrator 2204. A horizontal vibration signal and a vertical vibration signal generated from means 2200, 2210 are supplied to ports P13, P15 of the AFCPU 2030, and means 2200, 2210 reset by a reset signal from a port P14. The horizontal and vertical vibration detecting means 2200, 2210 are so positioned as to detect the vibrations in the longitudinal and perpendicular directions of the image frame. The acceleration sensor 2202 generates a voltage, corresponding to the acceleration, around a voltage V1 in the static state, as an acceleration signal as shown in FIG. 37. The integrator 2204 integrates the absolute value of the difference between the voltage V1 and the acceleration signal, and releases the integrated voltage as a vibration signal. The AFCPU 2030 resets the integrators 2204 in synchronization with the focus detecting cycle, or at predetermined timings (T1, T2), and executes A/D conversion on the vibration signal immediately before each resetting, thereby detecting the amount of vibration during the focus detecting cycle or at a predetermined timing. Also the vibration amount may be obtained by dividing the above-mentioned vibration amount with the interval of detections.

Figure 38:
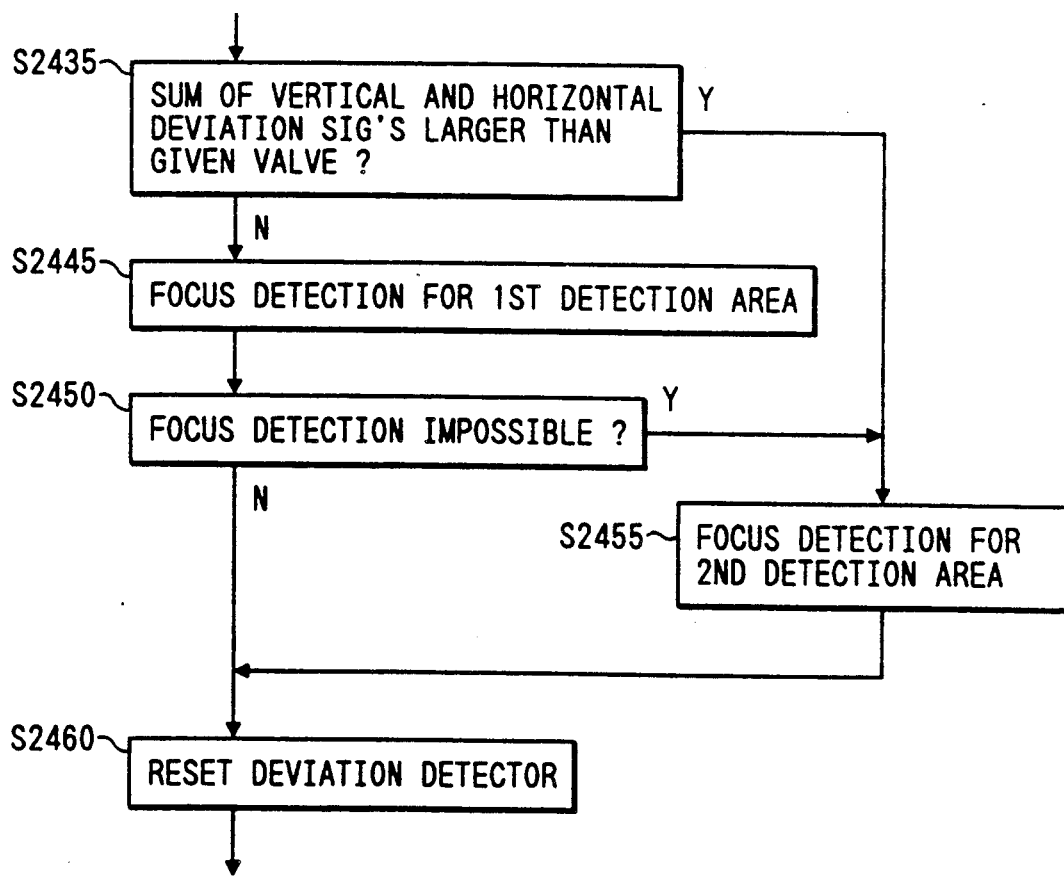

FIG. 38 is a flow chart for effecting the detection of vibration and focus state in the step S2195 in FIG. 30, utilizing the structure shown in FIG. 37.

A step S2440 executes A/D convertion of the horizontal and vertical vibration signals, and discriminates whether both are less than a certain level. If the condition of the step S2440 is met, the vibration is identified absent, and a step S2445 effects the focus detection in the narrow first detecting area. If the condition is not met, a step S2441 discriminates whether both vibration values exceed a predetermined value. If the condition of the step S2441 is met, vibration is identified present, and a step S2445 effects focus detection in the second detecting area. If the condition is not met, a step S2442 identifies a direction of smaller vibration, and, if the horizontal vibration is smaller, a step S2443 effects the focus detection with the data (a, b) of the horizontal photosensor arrays. If the vertical vibration is smaller, a step S2444 effects the focus detection with the data (c, d) of the vertical photosensor arrays. Then the sequence proceeds to a step S2450.

In the flow chart shown in FIG. 30, if the focus detection is not possible, the step S2250 scans the lens in a predetermined direction. In this method, if the direction of scanning is opposite to the direction of the object, there is required a long time before focusing to the object, because the lens has to move to a stroke end and is then reversed. In the following there will be explained an embodiment capable of minimizing the scanning time of the lens, thereby solving the above-mentioned drawback.

Figure 40A:
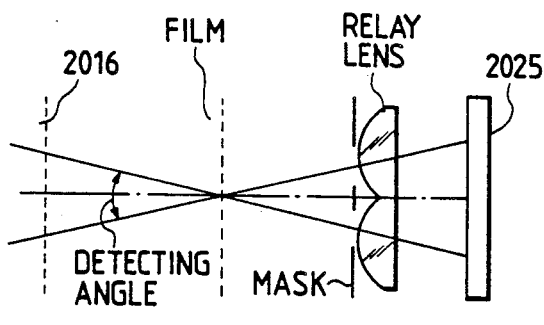
Figure 40C:
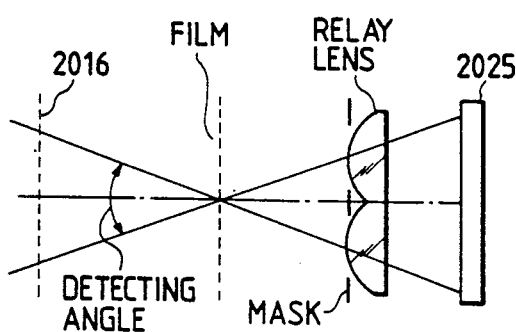
Figure 40B:
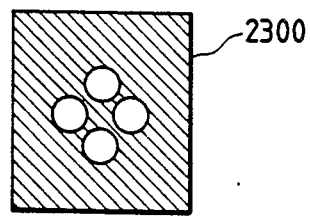
Figure 40D:
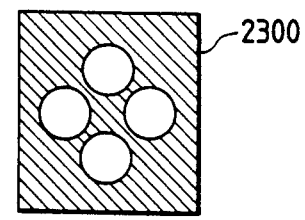
Figure 40E:
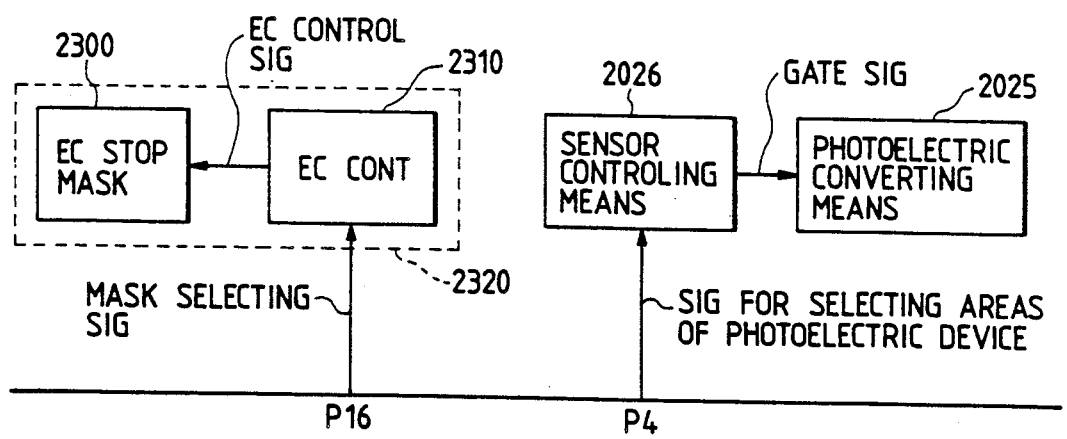

FIGS. 40A to 40E show an embodiment capable of reducing the scanning time of the lens. As shown in these drawings, an apertured mask plate 2300 positioned in front of the re-imaging lenses 2028A 2028B, 2038A, 2038B shown in FIG. 19 is composed of an electrochromic (EC) element, and the photoelectric conversion means 2025 has variable light-receiving areas. The EC mask plate 2300 is provided, as shown in FIGS. 40B and 40D, with four apertures corresponding to four re-imaging lenses, and is switchable, by an EC control signal from an EC control unit, between a state having larger apertures with larger distances between the centers of the apertures and another state having smaller apertures with smaller distances. The former state with larger apertures is selected in the normal focus detecting operation, because the detecting angle is larger and the precision of defocus detection is higher, as shown in FIGS. 40C and 40D. On the other hand, the latter state with smaller apertures is selected for detecting a large defocus amount because two images can be accommodated in the photosensor arrays even for a large defocus amount, as shown in FIGS. 40A and 40B, though the detecting angle is smaller so that the precision of defocus detection is lower. As shown in FIG. 40E, the EC mask plate 2300 and the EC control unit 2310 constitute mask control means 2320, to which the AFCPU 2030 sends a mask selection signal from a port P16, thereby selecting two states of the mask plate 2300.

Figure 41:
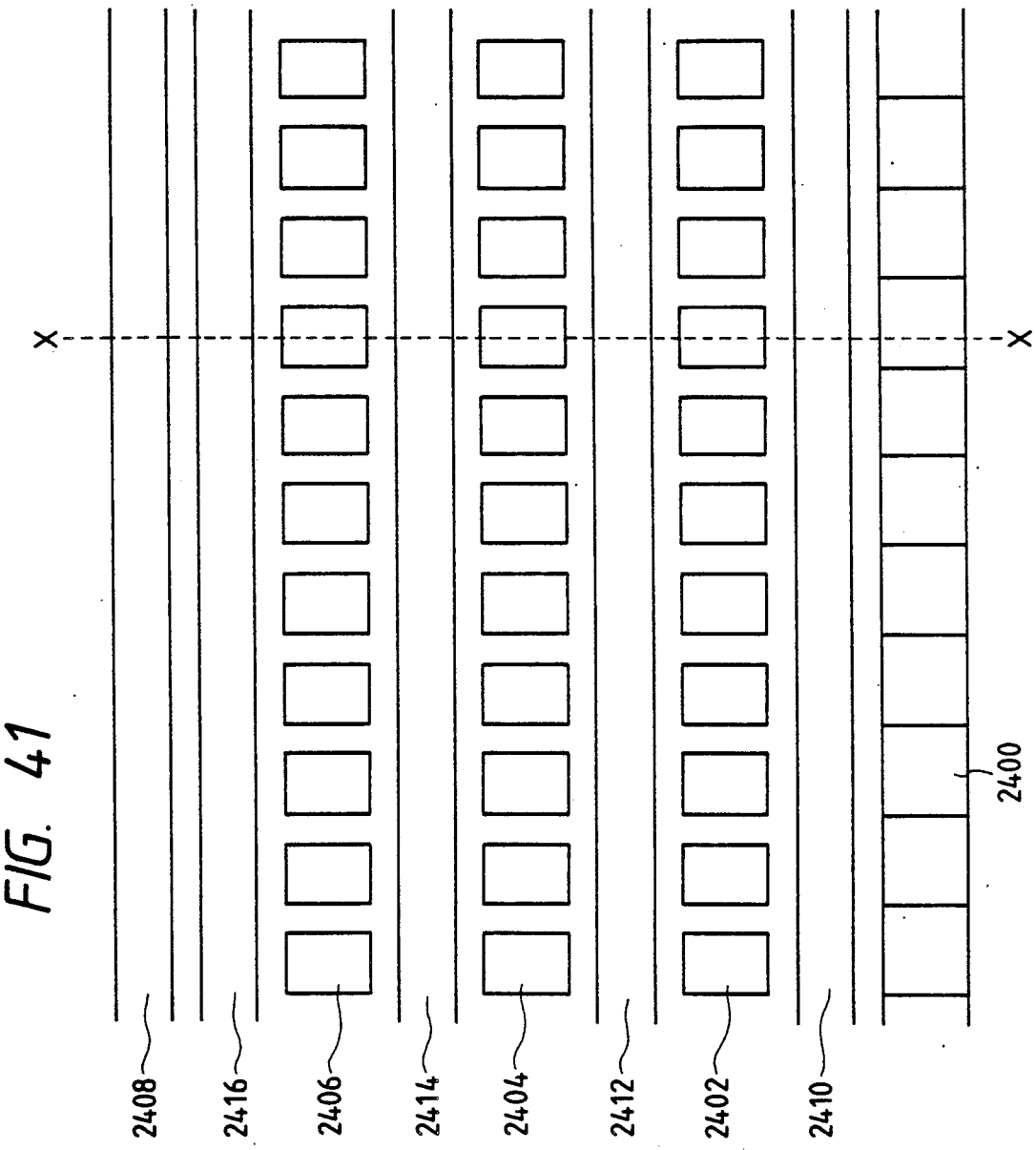
FIGS. 40A to 40E, 41, 42A, 42B and 43 are views and a flow chart of still another example of the apparatus shown in FIG. 1.

FIG. 41 shows the plan structure of the photoelectric conversion means 2025 shown in FIG. 18, in which a charge transfer unit 2400, a charge accumulation unit 2402, a first photosensor array 2404 and a second photosensor array 2406 are mutually separated by gates 2410, 2412, 2414, 2416.

Figure 42A:
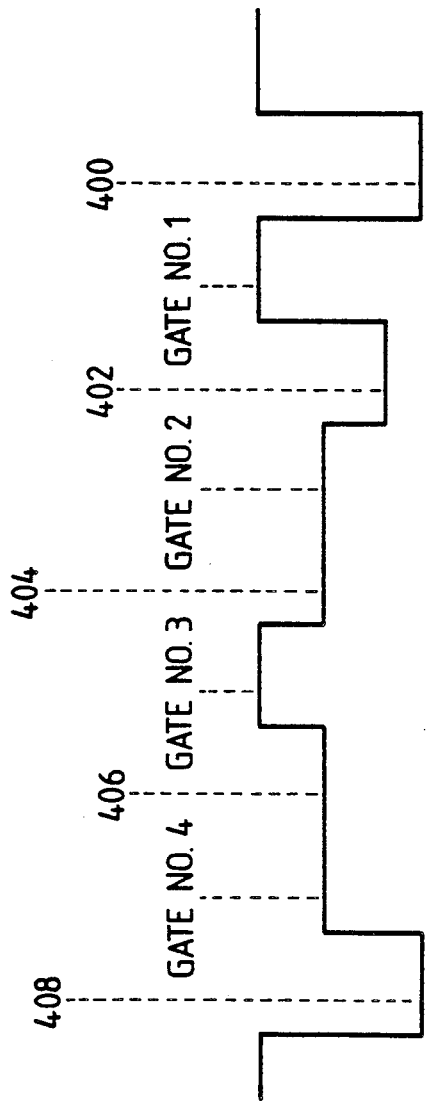
Figure 42B:
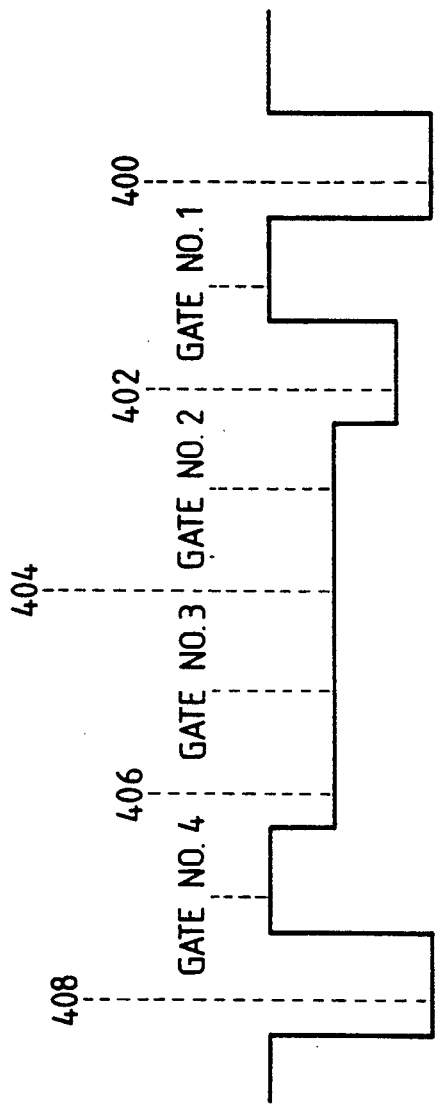

FIG. 42 shows the potential distribution along a line X—X in FIG. 41. FIG. 42A shows the potential at the charge accumulation when the area of the photosensor element is small, and FIG. 42B shows said potential when the area is large. In the state shown in FIG. 42A, the gates 1 and 3 have a high potential while the gates 2, 4 have a low potential, so that the charges generated in the second photosensor array flow into the overflow drain 2408, thus not contributing to the output signal. On the other hand, in a state shown in FIG. 42B, the gates 1, 4 have a high potential while the gates 2, 3 have a low potential, so that the charges generated in the photosensor arrays do not flow into the overflow drain 2408 but into the accumulation unit 2402, thus contributing to the output signals. In either case, after the charge accumulation is completed, the potential of the gate No. 2 is elevated while that of the gates Nos. 1, 3 and 4 is lowered, whereby the charges of the accumulation unit 2402 are transferred to the transfer unit 2400 and released externally as the output signals by the function of the transfer unit 2400. When the EC mask plate 2300 has larger apertures with larger distances between the centers of the apertures, the accumulation operation shown in FIG. 42A is selected as a sufficient light amount can be obtained. On the other hand, when the EC mask plate 2300 has smaller apertures with smaller distances as shown in FIG. 40B, the accumulation operation in FIG. 42B is selected since the amount of light is reduced. The AFCPU 2030 shown in FIG. 40E executes selection by sending a light-receiving area selecting signal from a port P4 to the sensor control means 2026, which in turn sends a gate signal to the photoelectric conversion means 2025.

Figure 43:
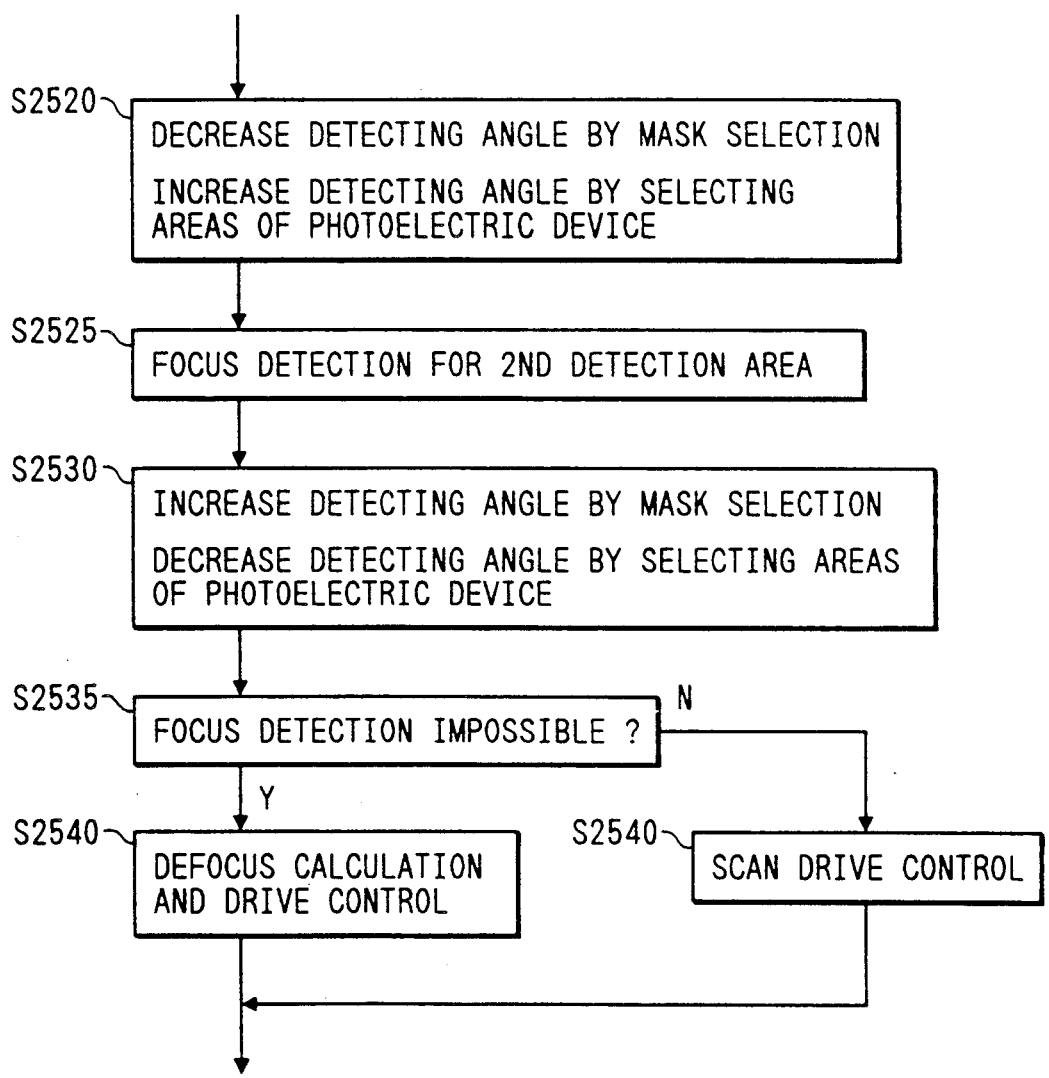

FIG. 43 is a flow chart of the procedure when the focus detection is impossible in the step S2250 shown in FIG. 30. At first, when the focus detection is impossible in a normal focus detecting operation, a step S 2520 shifts, by a mask selection signal, the EC mask plate to the state with smaller apertures and smaller distances therebetween, thereby reducing the detecting angle and facilitating the large defocus amount. At the same time the light-receiving area selecting signal is released to enlarge the light-receiving area, thereby elevating the sensitivity. A step S252 executes focus detection under such modified conditions in the second detecting area. A step S2530 then releases the mask selection signal to shift the EC mask plate to the state with larger apertures and with larger distances therebetween, thereby increasing the detecting angle. At the same time the light-receiving area selecting signal is released to reduce the light-receiving area, thereby restoring the ordinary focus detecting operation.

A step S2535 discriminates whether the focus detection has been possible in the step S2525, and, if possible, calculates the drive amount of the lens based on the defocus amount determined in the step S2525 and controls the drive operation according to the drive amount, utilizing the AF motor and the encoder. After the drive, the sequence returns to the step 2175 in FIG. 30 for detecting the mirror-down operation, thus starting the next focus detecting cycle. If the focus detection has been impossible, a step S2545 starts the lens scanning in a predetermined direction, and the sequence then returns to step 2175 in FIG. 30 thereby starting the next focus detecting cycle.

In the present embodiment, as explained in the foregoing, if the focus detection is impossible in the normal focus detection operation, the EC mask plate is replaced to reduce the detecting angle of the focus detecting optical system, thereby expanding the detectable defocus range, so that a large defocus amount which is not detectable with the ordinary focus detecting operation becomes detectable. Also the response is not deteriorated since the light-receiving area of the photosensor arrays is increased. The electrochromic material used for the mask plate in the present embodiment may naturally be replaced by another electro-optical element such as liquid crystal.

In the foregoing embodiment the focus detecting area is switched from the relatively narrow first area to the relatively wide second area in response to the detection of vibration. In the following there will be explained an embodiment in which the focus detecting area is switched when auxiliary illumination is used under a low luminance.

Figure 44:
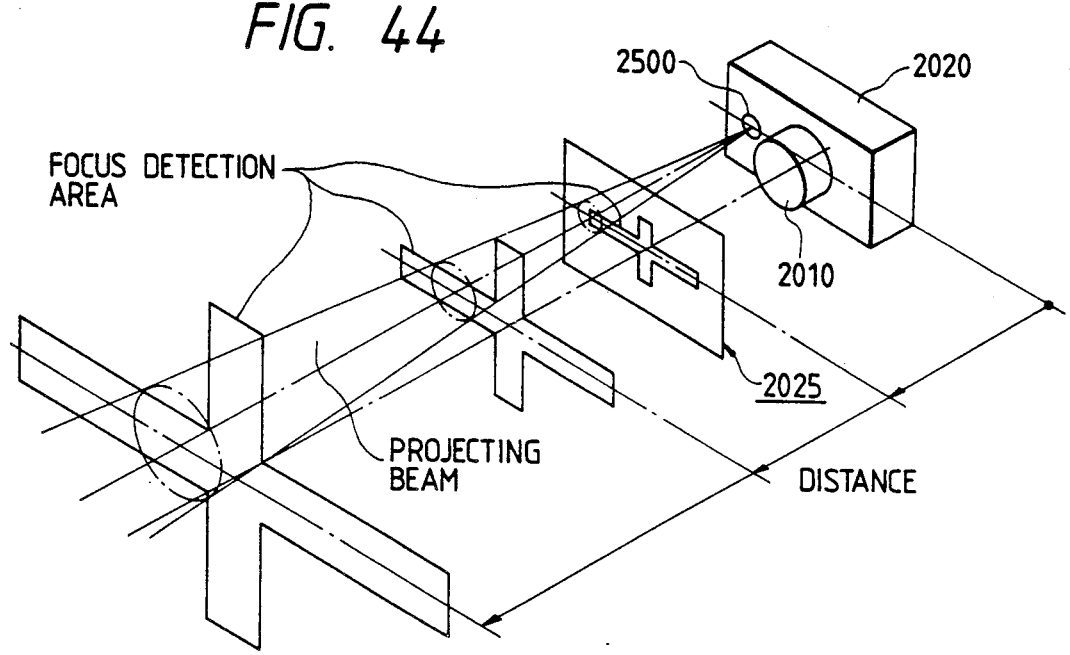
FIGS. 44, 45 and 46 are a schematic view and flow charts of still another example of the apparatus shown in FIG. 1.

FIG. 44 shows the structure of this embodiment, wherein the camera body 2020 and the lens 2010 are the same as those shown in FIG. 18. The camera body 2020 is provided with light emission means 2500 for illuminating the object with auxiliary light in the low luminance condition, and the light emission means 2500 is activated by a control signal from the AFCPU 2030. If the focus detecting area of the focus detecting module (photoelectric conversion means) 2025 is projected toward the object through the lens 2010, the light emission means 2500 is positioned in the direction of the focus detecting area extending from the optical axis of the lens 2010 longitudinally in the image frame. Also the axis of the emitted light lies in a plane containing the optical axis of the lens and extending in the direction of the focus detecting area extending longitudinally in the image frame, and is preferably parallel to the optical axis or crosses the optical axis at a certain distance. If the light emission means 2500 is positioned perpendicularly to the extending direction of the focus detecting area as in the conventional structure, there is generated a parallax depending on the distance to the object. Consequently the emitted light beam has to be widened, so that the power of the light emission means is dispersed and the limit distance of focus detection with auxiliary illumination is inevitably shortened. On the other hand, the arrangement of the light emission means 2500 in the present embodiment eliminates the parallax depending on the distance to the object, so that power of the light emission means can be concentrated with a narrower light beam. Consequently it is possible to extend the limit distance of focus detection with auxiliary illumination.

In the above-explained structure, if the focus detection is limited to the relatively narrow first detecting area, the emitted light may not hit the object in the detecting area, thus disabling the focus detection. Consequently the selection of the wide second detecting area is advantageous for the focus detection with auxiliary light emission. Also the use of the wide detecting area facilitates the adjustment of the optical axis of the light emission means.

Figure 45:
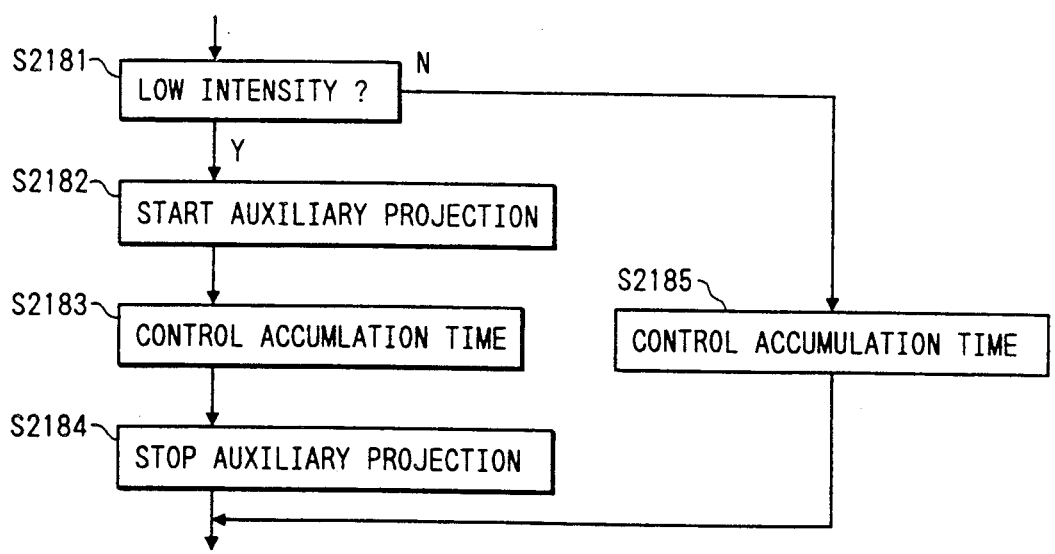

FIG. 45 is a flow chart of the accumulation time control in the step S2185 in FIG. 30, utilizing the structure of FIG. 44. A step S2181 discriminates, by light metering means or by charge accumulation time, whether the luminance is low. If not, a step S2185 executes ordinary accumulation time control. If the luminance is low, a step S2182 sends a control signal to the light emission means, thereby starting auxiliary light emission. A step S2183 control the accumulation time under auxiliary light emission. Upon completion of the accumulation, a step S2184 sends a control signal to the light emission means, thereby terminating the auxiliary light emission.

Figure 46:
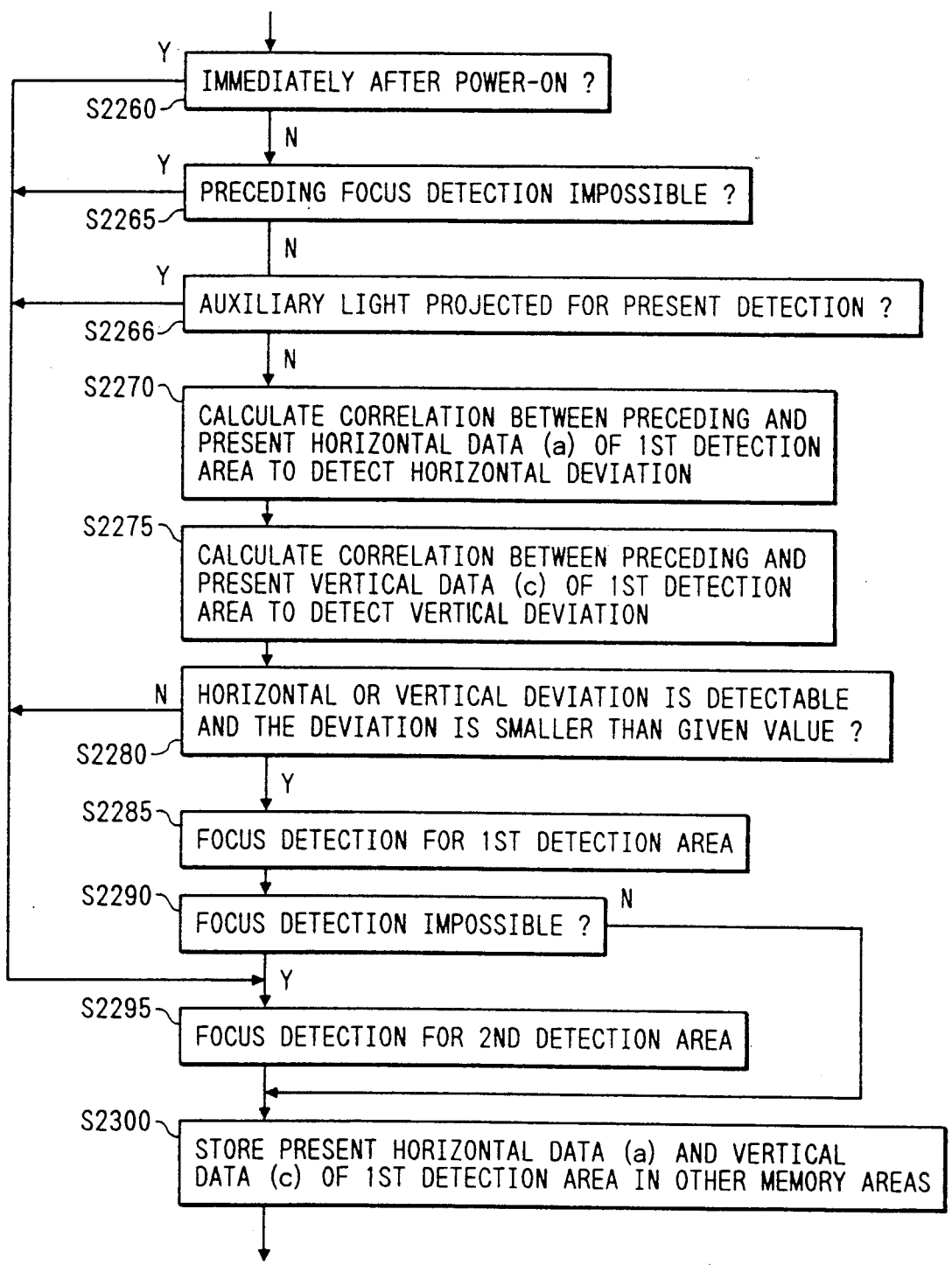
Figure 47:
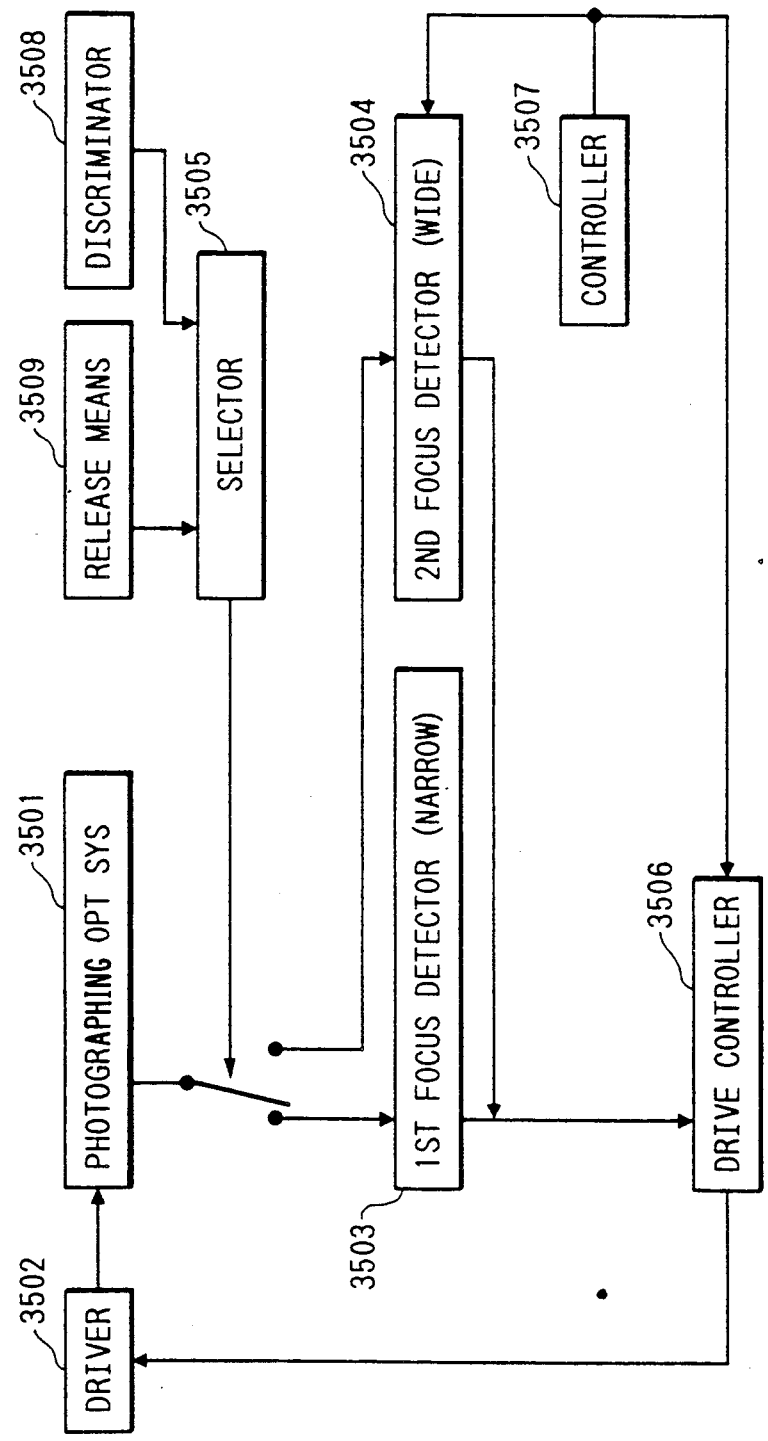
FIG. 47 is a block diagram of 5th to 9th examples of the automatic focus state detecting apparatus of the present invention.

FIG. 46 is a flow chart in which the switching of the focus detecting area under auxiliary light emission is applied to the detection of vibration and focus state shown in FIG. 31. In the sequence shown in FIG. 31, if the step S2265 identifies that the focus state detection was possible in the preceding cycle, the sequence proceeds to the detection of vibration started from the step S2270. In the sequence shown in FIG. 46, if a step S2265 identifies that the focus state detection was possible in the preceding cycle, a step S2266 discriminates whether the auxiliary light is emitted in the present cycle, and, if emitted, the sequence proceeds to a step S2295 to switch the focus detecting area for the focus state detection. If the auxiliary light is not emitted, the sequence proceeds to the vibration detection starting from a step S2270.

In the present embodiment, the focus detecting area is expanded in case the auxiliary light is emitted, so that the emitted light beam can be securely captured in the focus detecting area.

In the second embodiment explained above, the focus detecting area is automatically enlarged when vibration is detected. Consequently, if the desired object escapes from the focus detecting area by vibration of the camera, it can still be securely captured in the enlarged detecting area, so that stable and secure focus detecting operation can be achieved.

[3] 3rd embodiment

Now a 3rd embodiment of the present invention will be explained with reference to FIGS. 48-62.

Figure 48:
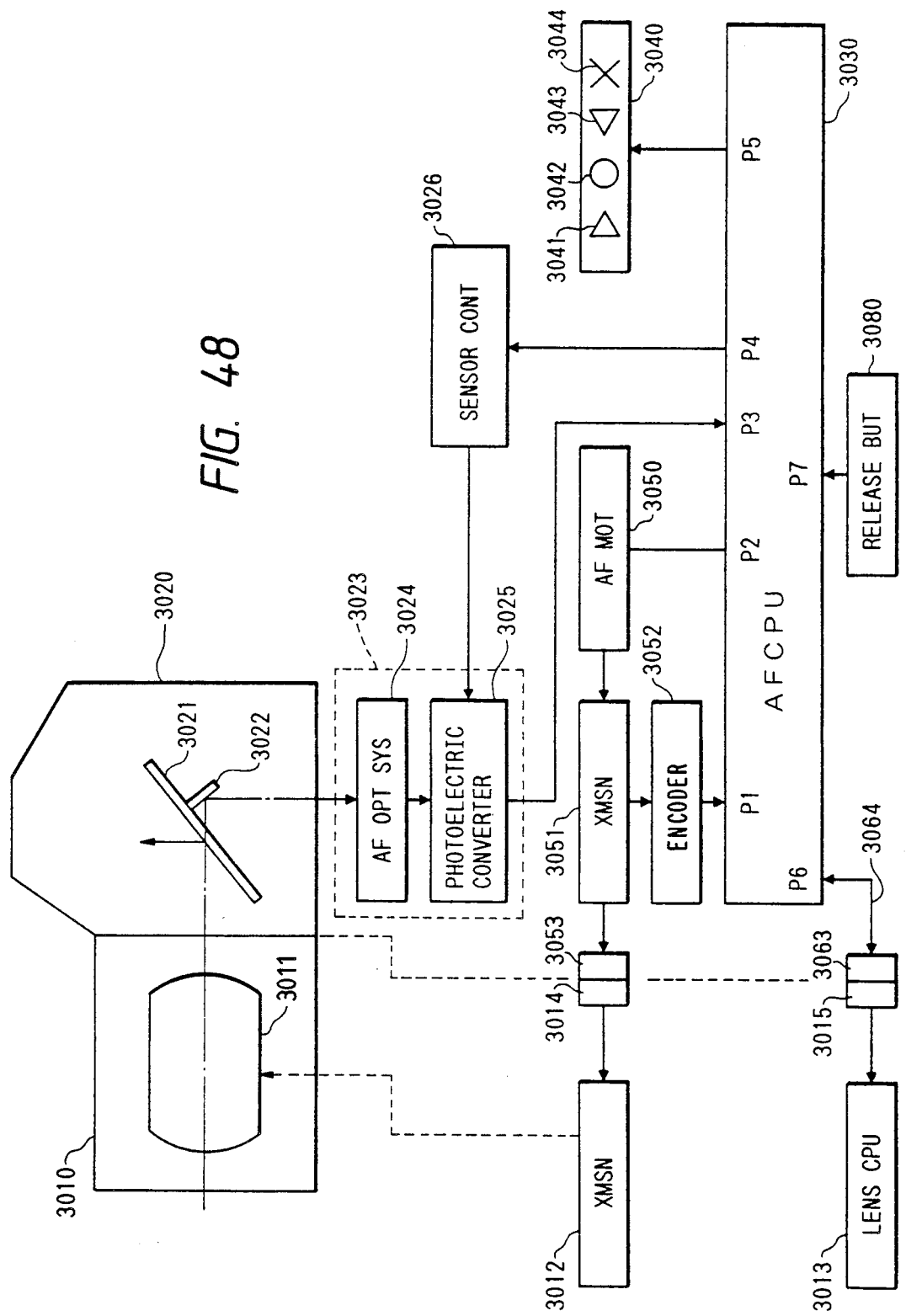

FIG. 48 shows an example of the present invention applied to a single-lens reflex camera with an interchangeable lens 3010 detachably mounted on a camera body 3020. When lens 3010 is mounted, a part of the light beam coming from an object is transmitted by a photographing lens 3011, then reflected by a main mirror 3021 provided in the camera body 3020 and guided to a view finder (not shown), while another part of the light beam is transmitted by a main mirror 3021, then reflected by a sub mirror 3022 and guided, as the focus detecting light beam, to an auto focusing module (AF module) 3023.

AF Module 3023

Figure 49:
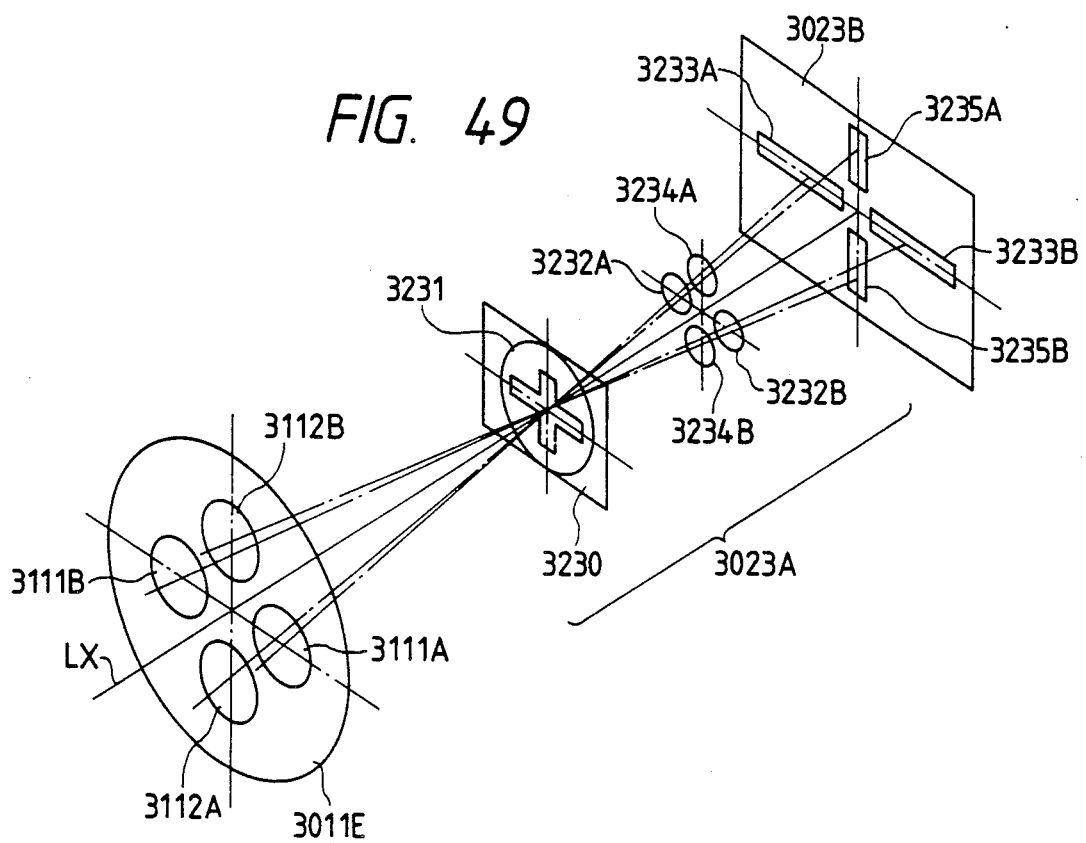
Figure 50:
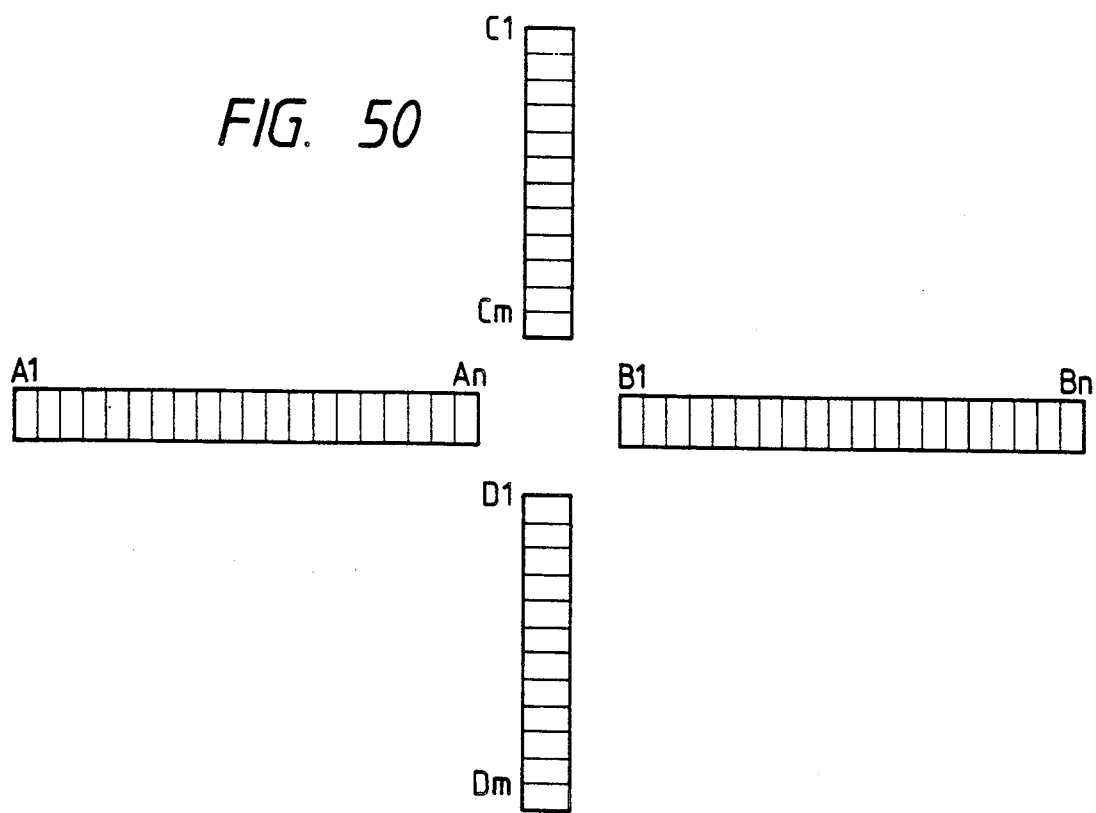

FIG. 49 shows an example of the AF module 3023, which is composed of a focus state detecting optical system 3023A consisting of a field mask 3230, a field lens 3231 and two pairs of re-imaging lenses 3232A, 3232B, 3234A, 3234B, and a CCD image sensor chip (hereinafter called CCD) 3023B having two pairs of photosensor arrays 3233A, 3233B, 3235A, 3235B.

Rays passing through two pairs of areas 3111A, 31118, 3112A, 3112B which are contained in the exit pupil 3011E of the photographing lens 3011 and are symmetrical to the optical axis LX of the lens form a primay image in the vicinity of the mask plate 3230 having an aperture corresponding to the entire focus detecting area as shown in FIG. 51A, and a part of the rays forms two pairs of secondary images on the photosensor arrays 3233A, 3233B, 3235A, 3235B of the CCD 3023B through the field lens 3231 and two pairs of re-imaging lenses 3232A, 3232B, 3234A, 3234B.

As already known, the amount of defocus of the photographing lens can be obtained from the relative positions of two secondary images along the paired photosensor arrays of the CCD 3023B. Also defocus amount can be determined in each of plural areas defined in the image frame as shown in FIG. 51A, by detecting the relative positions in the plural areas. In this case, the relatively narrow first focus detecting area is composed of the areas 3 and 7 as shown in FIG. 51B, and the wider second detecting area is composed of the areas 1–8 as shown in FIG. 51C. In the following, a system used for focus detection in the narrow first focus detecting area is called the first focus detecting system, and that used for focus detection in the wide second detecting area is called the second focus detecting system.

The paired photosensor arrays 3233A, 3233B are respectively composed of n photosensor elements Ap, Bp (n=1 to n), while the paired photosensor arrays 3235A, 32358 are respectively composed of m photosensor elements Cp, Dp (i=1 to m). Each photosensor Ap, Bp, Cp, Dp is composed of a charge accumulating element such as a photodiode, and executes charge accumulation for a period corresponding to the light intensity on the CCD 3023B, thereby providing an output signal suitable for the processing to be explained later. The photosensor arrays are so positioned that mutually corresponding photosensor elements (A1 and B1, A2 and B2, ..., An and Bn, C1 and D1, ..., Cn and Dn) provide equal output signals when the primary image coincides with a plane conjugate with the photographic film.

When the primary image is aberrated from the conjugate plane of the film, the mutual distance of paired secondary images on the CCD 3023B varies from that in the above-mentioned coinciding state, depending on the direction of axial aberration of the primary image. Thus the distance of the secondary images increases or decreases respectively in case of front focus or rear focus. Stated differently the relative positions of the secondary images are determined according to the axial difference between the image plane of the object formed by the optical system 3023A and the estimated image plane thereof.

AFCPU 3030

Again referring to FIG. 48, a sensor controller means 3026 receives commands for starting and terminating the charge accumulation from a port P4 of an auto focusing CPU (AFCPU) 3030, and sends corresponding control signals to the CCD 3023B, thereby controlling the start and termination of charge accumulation thereof. It also sends transfer clock signals to the CCD 3023B, thereby transferring the output signals of the photosensors to the AFCPU 3030 in time-sequential manner. It also sends a synchronization signal, synchronized with the start of transfer of the output signals of photosensors, to the port P4 of the AFCPU 3030, which in response starts the A/D conversion by an internal A/D converter and executes the A/D conversion of the output signals of photosensors received through a port P3, thereby obtaining A/D converted data corresponding to the number of photosensor elements. After the A/D converted data (2n+2m) are obtained, there is conducted the known calculation for focus state detection as will be explained later, for determining the defocus amount between the primary image and the conjugate plane of the film.

Based on the result of the focus state detection, the AFCPU 3030 controls the display on an AF display unit 3040 through a port P5, for example activating a triangle display 3041 for a front focus state, a triangle display 3043 for a rear focus state, a circular display 3042 in case of a focused state, or a cross-shaped display 3044 if the focus detection is impossible.

Also based on the result of focus state detection, the AFCPU 3030 controls the direction and amount of drive of an AF motor 3050, thereby moving the lens 3011 to the focused position.

At first, according to the sign of the defocus amount (front or rear focus), the AFCPU 3030 releases, from a port P2, a drive signal for rotating the AF motor 3050 in a direction for bringing the lens 3011 toward the focused position. The rotation of the AF motor 3050 is transmitted, through a transmission system 3051 composed for example of gears incorporated in the camera body 020, to a coupling 3053 of the camera body provided at a mount for the lens 3011, and further to a coupling 3014 of the lens and a lens transmission system 3012 composed of gears incorporated in the lens 3011, thereby moving the lens 3011 toward the focused position.

The drive amount of the AF motor 3050 is detected by the amount of rotation of a gear in the body transmission system 3051, and the amount of rotation is converted into pulse signals by an encoder 3052 for example composed of a photointerruptor and fed back to the AFCPU 3030 through a port P1 thereof. The AFCPU 3030 can move the lens 3011 by a predetermined amount by controlling the drive amount of the AF motor 3050, namely by counting the pulses from the encoder 3052, according to related parameters such as the reducing ratios of the body transmission system 3051 and the lens transmission system 3012. The AFCPU 3030 is provided with a pulse counter for counting the pulse signals entered from the port P1 and a comparison register and is capable of starting an internal interruption procedure when the content of pulse counter coincides with that of the comparison register The AFCPU 3030 controls the drive amount of the AF motor 3050 in the following manner.

At first the AFCPU 3030 clears the pulse counter, then sets a desired number in the comparison register, and starts the drive of the AF motor 3050. The pulse counter counts up the pulses generated by the encoder 3052 with the rotation of the AF motor 3050. When the content of pulse counter becomes equal to that of the comparison register, an interruption procedure is started whereby the AFCPU 3030 stops the AF motor 3050. In this manner the AF motor 3050 is driven for a desired number of pulses. The AFCPU 3030 is also provided with a timer and has a timer interruption function for executing an interruption procedure at a constant interval.

Further referring to FIG. 48, the lens is provided with a lens CPU 3013, which sends AF-related information required for the AFCPU 3030, such as focal length and number of rotations of the coupling 3014 per unit movement of the lens 3011, to a communication bus 3064 of the camera body through contacts 3015 of the lens and those 3063 of the camera body both provided in the lens mount.

A shutter release button 3080 can assume an non-depressed state, a preparatory half-push state in which the button is depressed over a first stroke, or a shutter release state (full-push state) in which the button is depressed over a second stroke larger than the first stroke, and the information of these states is sent to a port P7. In the non-depressed state, in response to the information indicating that state, there is conducted selection of the focus detecting area.

The foregoing is the outline of structure and function of the present embodiment applied in a single-lens reflex camera.

Figure 52:
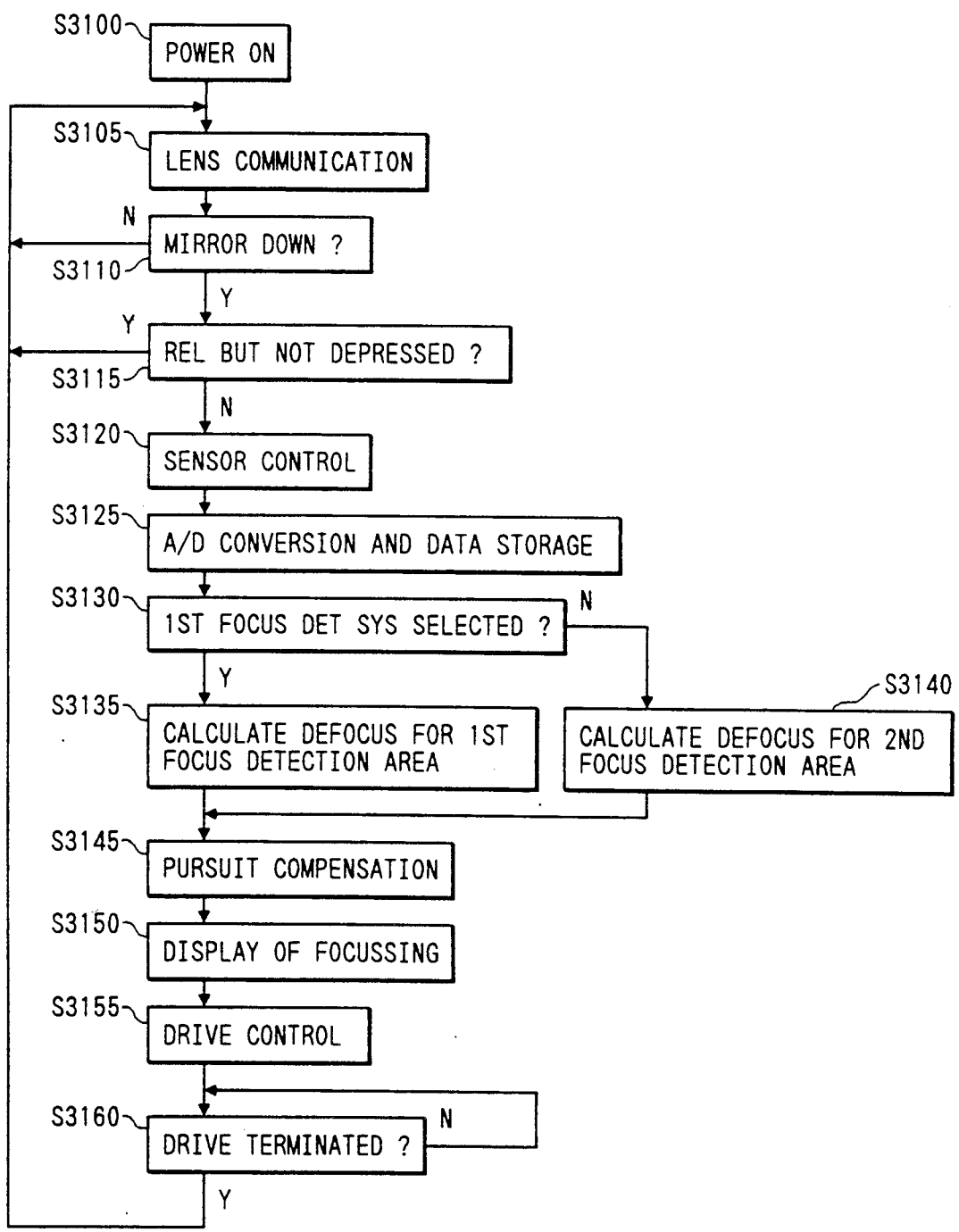

FIG. 52 is a flow chart showing the outline of control sequence of the AFCPU 3030.

When the shutter release button 3080 is half-pushed, the AFCPU 3030 is powered and starts function from a step S3100. A step S3105 collects the information on the lens by communication with the lens CPU 3013, then a step S3110 discriminates whether the main mirror 3021 is in the down state, and, if not, the sequence returns to the step S3105 without charge accumulation of the CCD 3023B. If the mirror is down, a step S3115 discriminates, through the port P7, whether the shutter release button 3080 is in the non-depressed state, and, if non-depressed, the sensor controller 3026 controls the charge accumulation time of the CCD 3028B. After the charge accumulation, a step S3125 effects the A/D conversin of the output signals transferred from the photo-sensors, and stores the obtained data in a memory.

A step S3130 discriminates whether the first focus detecting system is selected, and, if selected, a step S3135 determines the defocus amount in the first focus detecting area, but, if not selected, a step S3140 determines the defocus amount in the second focus detecting area.

Then a step S3145 determines the moving speed of the image plane from the defocus amounts obtained in plural focus detecting operations of the present and the past, and corrects the defocus amount by adding a pursuit correction value estimated from the moving speed of the image plane.

A step S3150 executes display on the AF display unit 3040 according to the defocus amount, and a step S3155 controls the driving of the AF motor 3050 according to the defocus amount. A step S3160 awaits the completion of the drive, and then the sequence returns to the step S3105 for starting the focus detecting cycle of the next time.

In the following there will be explained the data processing, selection of focus detecting areas, pursuit of moving objects, range limiting of the defocus amount and the drive control of the photographing lens system, conducted in the AFCPU 3030.

Selection of Focus Detecting Areas

At first there will be explained the manipulation of the shutter release button 3080 and the selection of the focus detecting areas, with reference to FIGS. 53A and 53B.

Figure 53A:
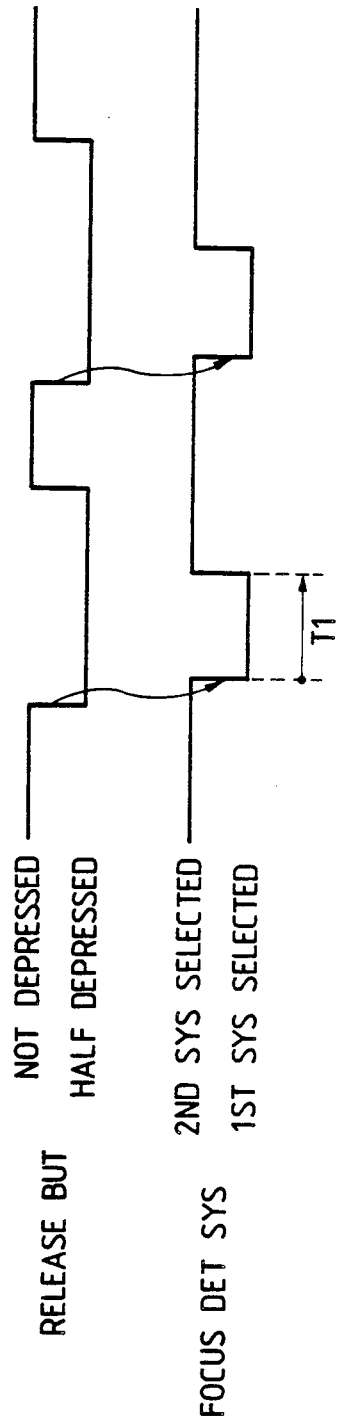
FIGS. 53A and 53B are charts showing the principle of switching of first and second focus state detecting areas.

As shown in FIG. 53A, the second focus detecting system (second focus detecting area) is normally selected, and the first focus detecting system (first focus detecting area) is selected at the transition of the shutter release button 3080 from the non-depressed state to the preparatory (half-push) state. After the lapse of a predetermined time T1 therefrom, the second focus detecting system is selected again.

Figure 1A:
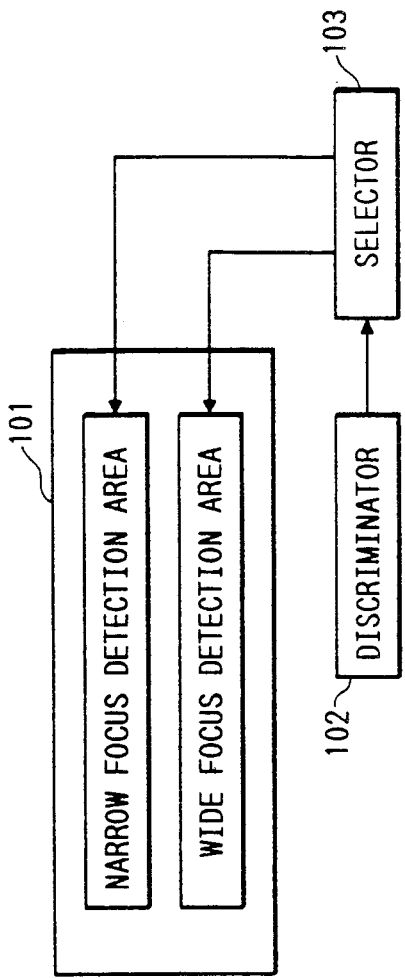
FIGS. 1A to 1C are schematic views of 1st to 3rd examples of a first embodiment of the automatic focus state detecting apparatus of the present invention.
Figure 1B:
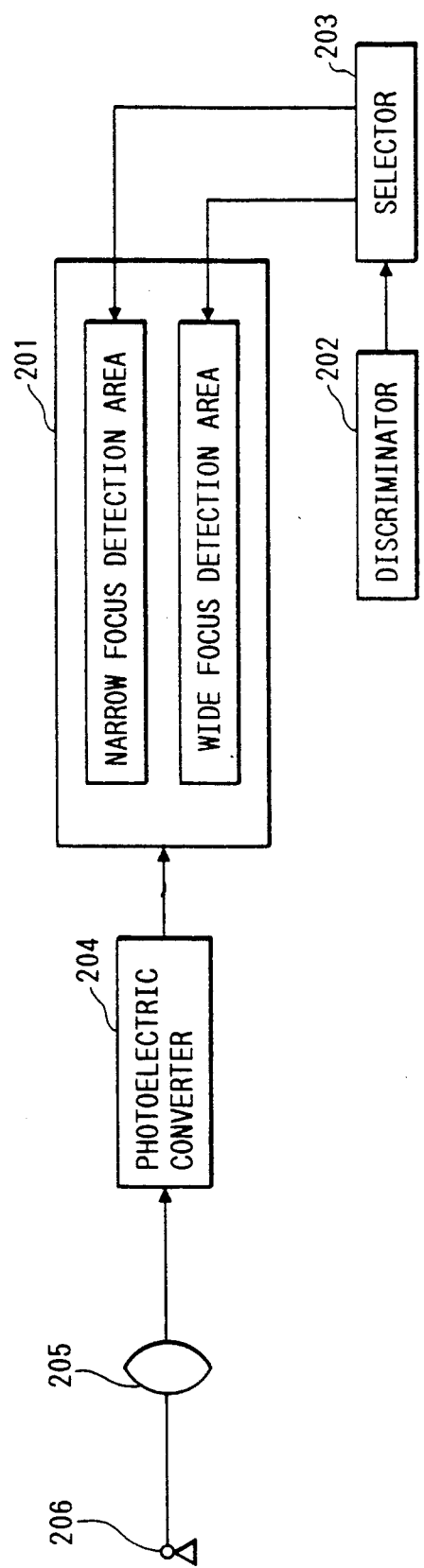
Figure 1C:
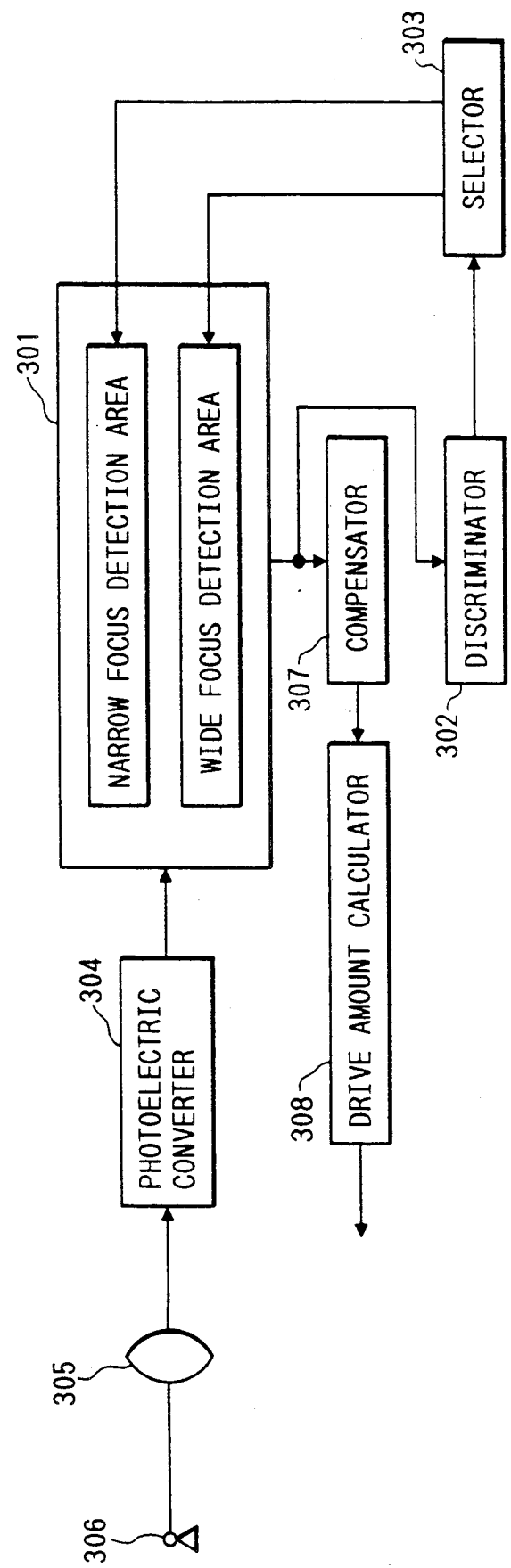
Figure 54A:
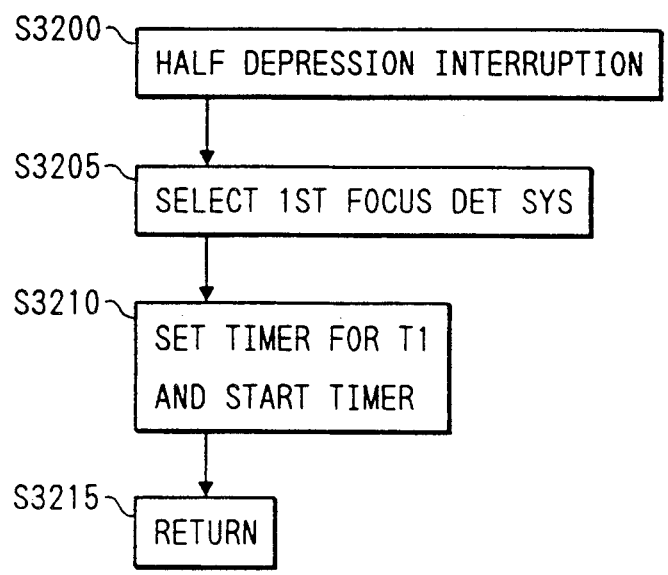
FIGS. 54A to 54C are flow charts of the control sequence thereof.
Figure 54A:
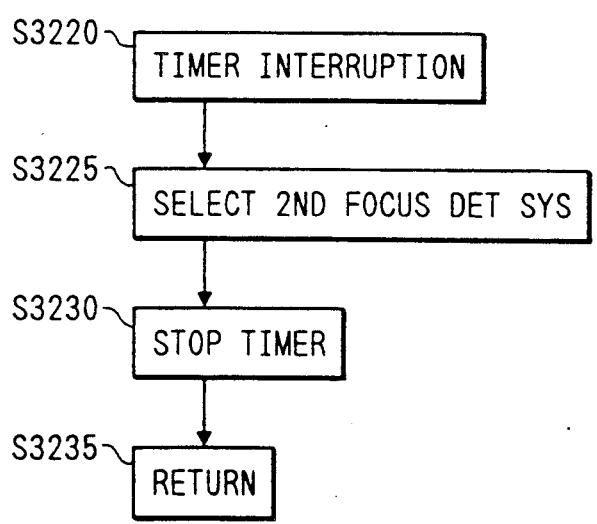

FIG. 54A–54A1 is a flow chart of the above-explained operation by the AFCPU 3030.

When the transition of the shutter release button 3080 from the non-depressed state to the preparatory state is supplied as an interruption signal to the port P7, a preparatory state interruption procedure is activated in a step S3200, and a step S3205 select the first focus detecting system. Then a step S3210 sets a predetermined time T1 in an internal timer of the AFCPU 303 and starts the timer, and a step S3215 terminates the interruption procedure. Thereafter, when the timer measures time T1, a timer interruption procedure is started in a step S3220. A step S3225 selects the second focus detecting system, then a step S3230 stops the timer, and a step S3235 terminates the interruption procedure. The selection of the focus detecting areas as shown in FIG. 53A is conducted in this manner.

Figure 53B:
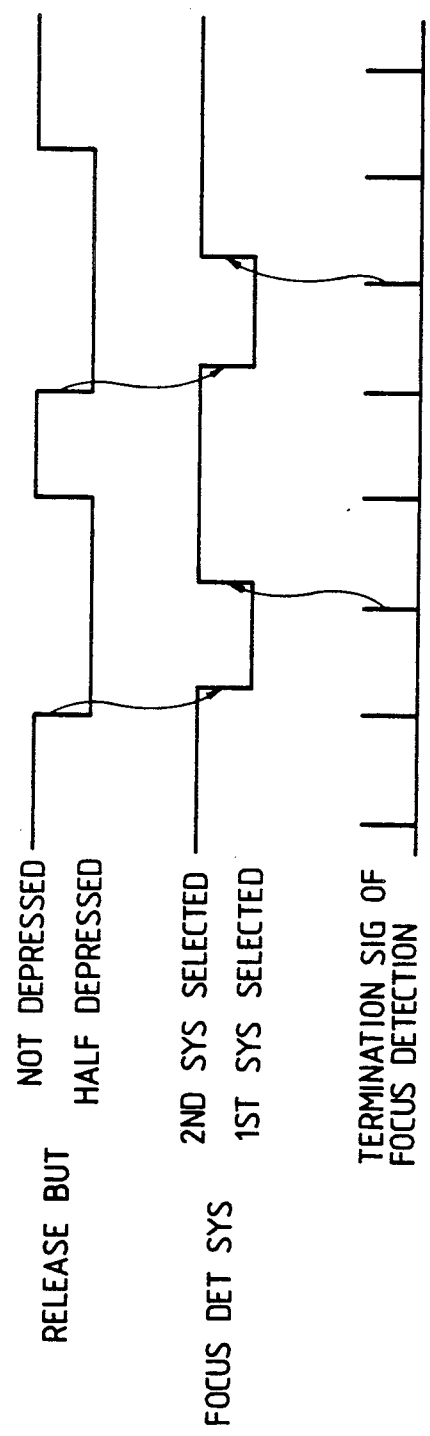

FIG. 53B shows another selection method. In this method the second focus detecting area is normally selected, and the first focus detecting area is selected at the transition of the shutter release button 3080 from the non-depressed state to the preparatory state. When the defocus amount is determined by the first focus detecting system and the drive control according to the defocus amount is completed, the second focus detecting system is selected again. The next focus detection is conducted by the second focus detecting system.

Figure 54B:
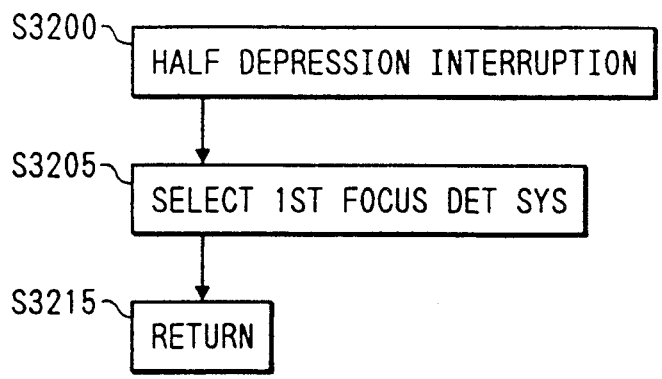
Figure 54B:
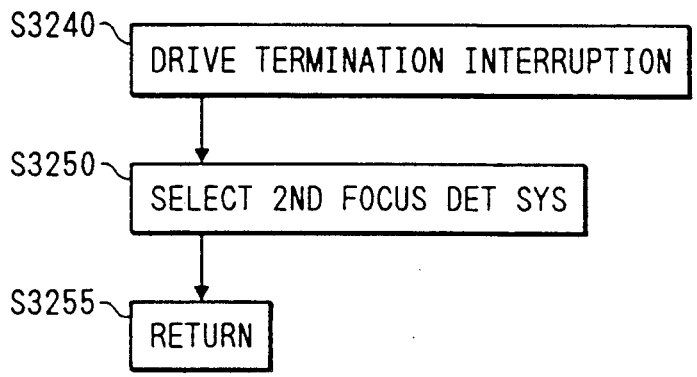

FIG. 54B–54B1 is a flow chart of the above-explained operation conducted by the AFCPU 3030.

When the transition of the shutter release button 3080 from the non-depressed state to the preparatory state is entered as an interruption signal to the port P7, a preparatory state interruption procedure is activated in a step S3200, and a step S3205 selects the first focus detecting system. A step S3215 terminates the interruption procedure. When the drive control is completed, an internal software interruption procedure is activated for terminating the drive, at a step S3240. A step S3250 selects the second focus detecting system, and a step S3255 terminates the interruption procedure.

Figure 54C:
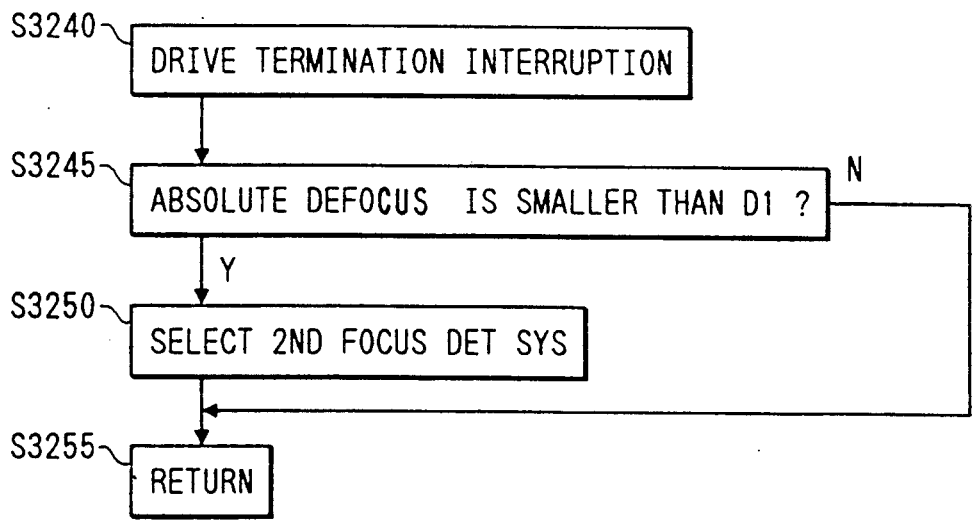

FIGS. 54C and 54D are flow charts showing still other selection methods. In the interruption procedure shown in FIG. 54B, the focus detection is conducted in the first detecting area only once after the transition of the shutter release button 3080 to the preparatory state. In the procedure shown in FIG. 54C, after the drive terminating interruption procedure is started in a step S3240, a step S3245 discriminates whether the absolute value of the detected defocus amount is less than a predetermined value D1, and, if affirmative, a step S3250 switches to the second focus detecting system, but, if negative, a step S3250 terminates the interruption procedure without switching the focus detecting system. In this case the second focus detecting system is selected after a focused state or a near-focused state is reached in the first focus detecting system, so that the photographer can observe the object on the view finder as a sharp image. Thus the desired object can be securely captured, and the drive can be stabilized.

Also as shown in FIG. 54D, it is possible, in the method shown in FIGS. 53A and 54A, to switch to the second focus detecting area if a signal indicating that the focus detection is impossible is released during the measurement of the time T1. In this case, if the signal is released after the capture, even once, of the object during time T1, the photographing lens is already aiming at the object, so that the focusing thereto is facilitated when the second focus detecting area is selected.

In the foregoing description the time T1 and the value D1 are fixed, but these values may be made adjustable by the photographer or automatically variable for example according to the luminance of the object.

Calculation for Focus State Detection

The output data of the photosensor elements obtained by A/D conversion of the AFCPU 3030 are represented by ap, bp (p=1 to n) and cq, dq (q=1 to m), respectively corresponding to the photosensor elements Ap, Bp (p=1 to n) and Cq, Dq (q−1 to m). For the purpose of simplicity, the following explanation will be given only as to the output data ap, bp, but the same applies to the output data cq, dq.

Paired output data a1 to an, b1 to bn of the paired photosensor arrays are subjected to the calculation according to the equation (3001) to determine a correlation value C(j, L):

$$C(j, L) = \sum_r \{a(r + L) - br\} \tag{3001}$$

wherein L is an integer, indicating the amount of relative shift counted by the pitch of photosensor elements in the paired photosensor arrays. In equation (3001), the range of the parameter r is selected for example as shown in FIG. 55, according to the shift L and the area j.

Figure 55:
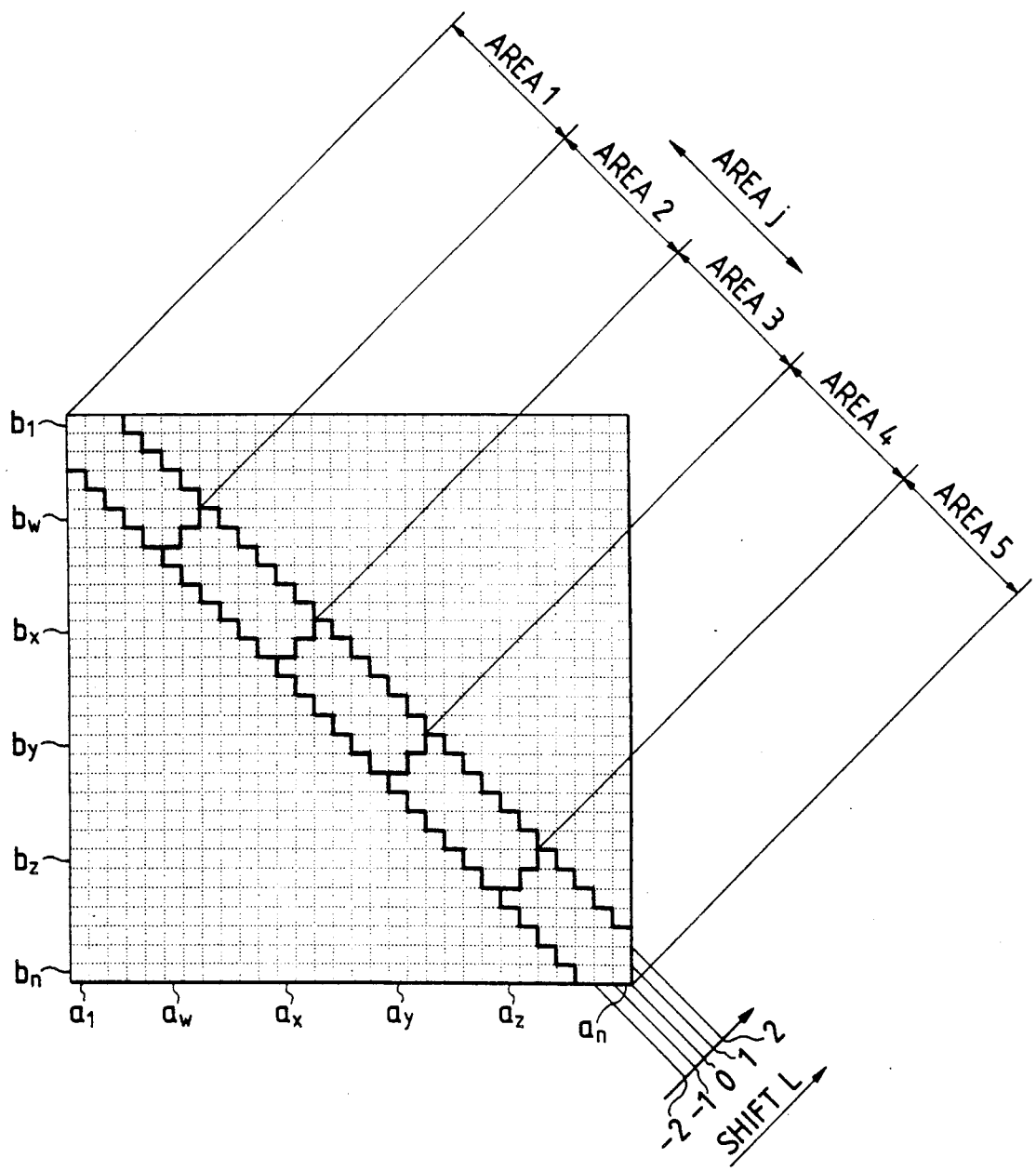

When the output data ap, bp are laid out in a matrix as shown in FIG. 55, the combination of the output data in (3001), or the range of the parameter r can be determined. In the case of FIG. 55, the shift L is changed in a range from −2 to +2, and a bold frame area indicates the combinations of output data used for calculation. The detectable shift and defocus amount can be limited by limiting the range of the shift L between limit values Lmax and Lmin. In the case shown in FIG. 55, there are employed Lmin=−2 and Lmax=2.

For a case L=0, the range of the parameter r in (3001) is as follows in each area j:

$$\begin{aligned} j &= 1; \quad r = 1 \text{ to } w \\ j &= 2; \quad r = w + 1 \text{ to } x \\ j &= 3; \quad r = x + 1 \text{ to } y \\ j &= 4; \quad r = y + 1 \text{ to } z \\ j &= 5; \quad r = z + 1 \text{ to } n \end{aligned} \tag{3002}$$

In each area, the shift xm(j) showing the highest correlation of the output data of the photosensors can be obtained by applying, to the result of the equation (3001) a three-point interpolation disclosed in the Japanese Laid-open Patent Sho 60-37513 of the present applicant.

The three-point interpolation method will be explained in the following.

Figure 56:
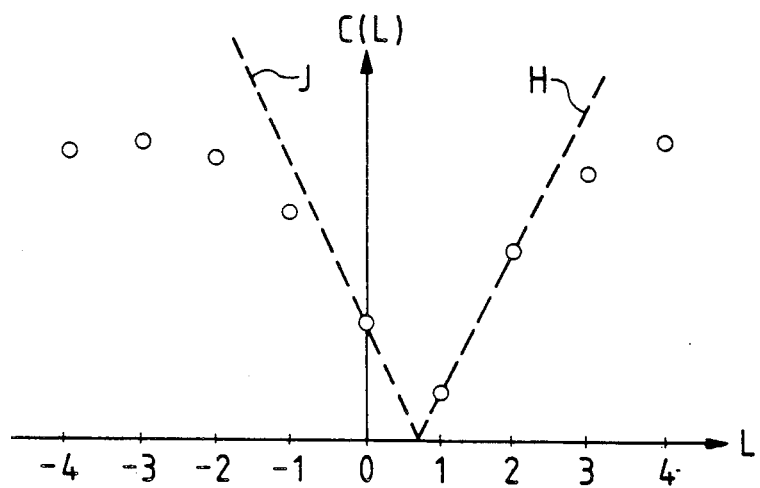

The result of calculation according to the equation (3001) is shown in FIG. 56, indicating the shift L and the correlation value C(j, L) respectively in the abscissa and in the ordinate. As shown in FIG. 56, the correlation value C(j, L) becomes minimum at a shift L where the output data of the photosensor elements have a high correlation.

In practice, however, the correlation relative shift L is determined from non-continuous data obtained from the photosensor arrays 3233A, 3233B, so that the correlation value C(j, L) is also non-continuous. It is therefore not necessarily possible to obtain the minimum correlation C(j, L)$_{min}$ directly from the calculated correlation values C(j, L).

Figure 57:
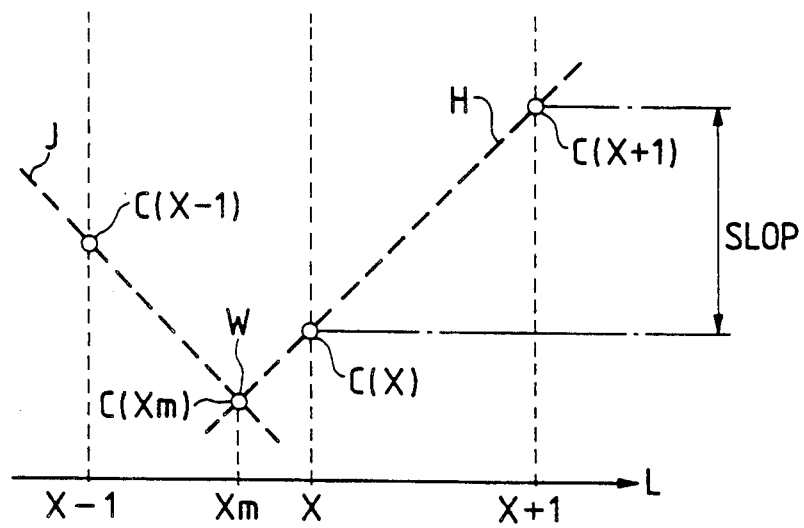

Therefore the minimum value C(j, L)$_{min}$ is obtained from the correlation values C(j, L) according to the three-point interpolation shown in FIG. 57.

It is assumed that the non-continuous correlation value C(j, L) reaches minimum at a relative shift L=x. Thus the correlation value C(j, L) for neighboring shifts x−1 and x+1 are C(j, x−1) and C(j, x+1). Thus a straight line H is drawn passing through the minimum correlation value C(j, x) and the larger one of two other correlation values C(j, x−1) and C(j, x+1), (C(j, x+1) in the case of FIG. 57). Then a line J is drawn passing through the remaining correlation value C(j, x−1) and with an inclination opposite to that of the line H, and the crossing point W of lines H, J is determined.

The coordinates of the crossing point W can be represented by the relative shift xm and the corresponding correlation value C(j, xm), corresponding to the minimum correlation value and the corresponding relative shift.

The above-explained three-point interpolation method can be represented by the following equations:

$$xm(j) = x(j) + \frac{D(j)}{SLOP(j)} \quad (3003)$$

$$C(j, xm) = C(j, x) - |D(j)|. \quad (3004)$$

In (3003) and (3004), D(j) is the deviation represented by:

$$D(j) = \frac{C(j, x-1) - C(j, x+1)}{2}. \quad (3005)$$

Also in (3003) and (3004), SLOP is the larger one of the deviations among the correlation values C(j, x−1), C(j, x) and C(j, x+1) corresponding to relative shifts x−1, x and x+1, and can be represented as follows:

$$SLOP = MAX(C(j, x+1) - C(j, x), C(j, x-1) - C(j, x)) \quad (3006).$$

In the equations (3003) to (3006), xm represents the relative shift of the output data of paired photosensor arrays. Thus the lateral relative shift of two object images formed on the CCD 3025 is:

$$SHIFT = y \times xm \quad (3007)$$

wherein y is the pitch of the photosensor elements.

Also the defocus amount DEF(j) on the focal plane can be represented as:

$$DEF = KX \times SHIFT$$

wherein KX is a coefficient determined by structural conditions of the focus detecting optical system shown in FIG. 49.

If the parameter SLOP determined by the equation (3006) is larger, the correlation value C(j, L) shown in FIG. 56 has a deeper sag, indicating a higher correlation and thus a higher reliability of the determined defocus amount DEF(j). The sign of the defocus amount DEF is positive or negative, respectively when the object is positioned closer than the distance to which the photographing optical system is adjusted (rear focus) or farther than distance (front focus).

If the defocus amount DEF(j) cannot be determined because the minimum Xm(j) cannot be found, or if SLOP(j) is small, indicating low reliability, the focus detection is identified impossible.

Figure 58:
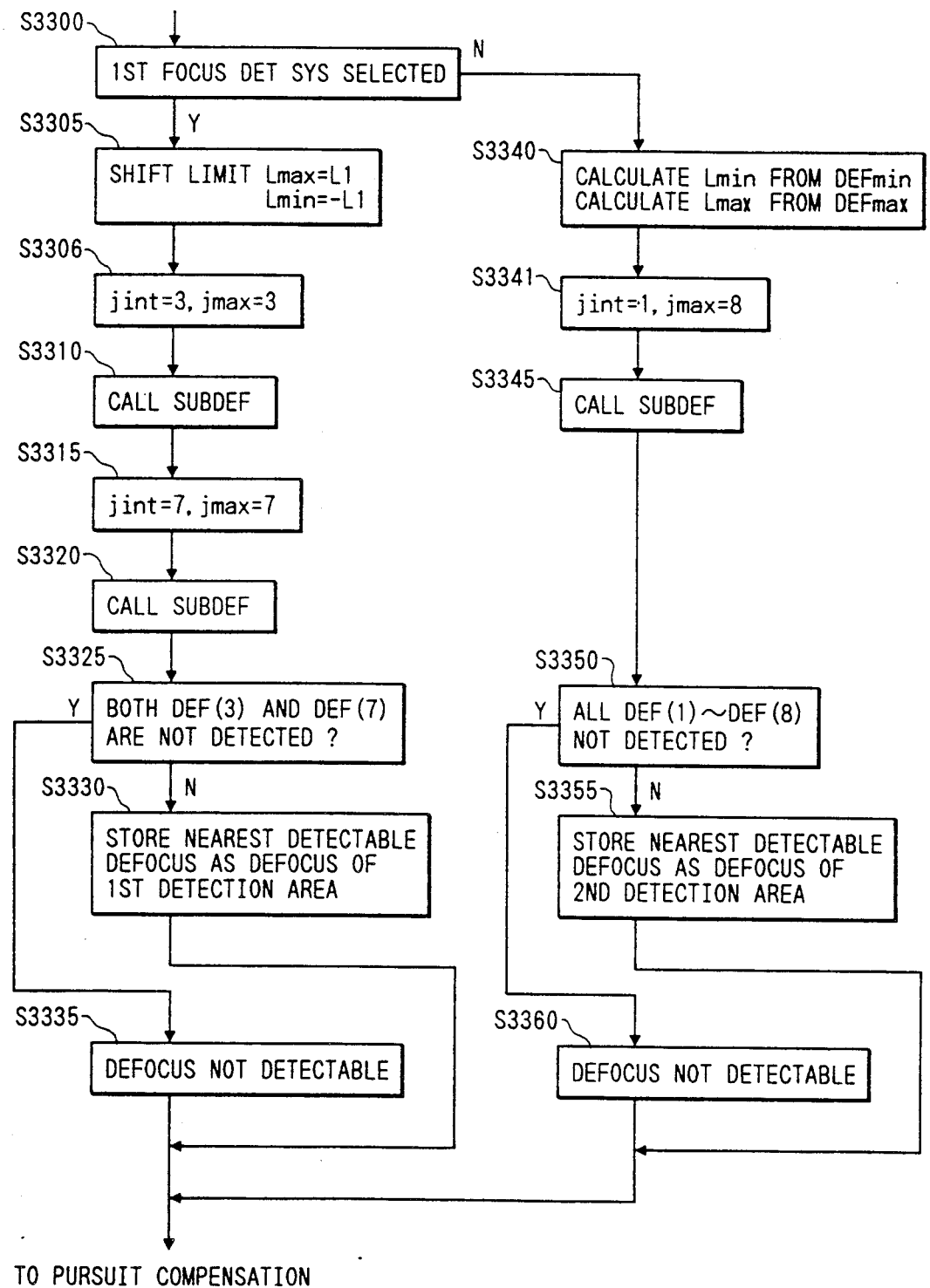

FIG. 58 is a flow chart of the above-explained functions of defocus amount detection with the first and second focus detecting systems.

At first a step S3300 discriminates whether the first focus detecting system is selected, and, if selected, a step S3305 sets limit shifts Lmin=−L1 and Lmax=L1 (>0). Then a step S3306 sets the initial area j$_{int}$ at 3, and the final area j$_{max}$ at 3. A step S3310 calls a defocus amount calculating subroutine for determining the defocus amount in the area 3. Then a step S3315 sets the initial area j$_{int}$ at 7 and the final area j$_{max}$ at 7, and a step S3320 calls the defocus amount calculating subroutine for determining the defocus amount in the area 7. A step S3325 discriminates whether the defocus amounts DEF(3) and DEF(7) of the areas 3, 7 have both been undetectable, and, if at least either is detectable, a step S3330 selects, among the detectable defocus amounts, the closest one as the defocus amount in the first focus detecting area. Then the sequence proceeds to the pursuit correction procedure. If both defocus amounts are undetectable, a step S3335 identifies the defocus amount as undetectable, and the sequence proceeds to the pursuit correction procedure.

If the step S3300 identifies that the first focus detecting area is not selected, a step S3340 calculates the limit shifts Lmin, Lmax from the predetermined limit defocus amounts DEF DEFmin, DEF max, for example by the equation (3009):

$$Lmin = INT\{\alpha \times DEFmin/(PY \times KX)\}$$

$$Lmax = INT\{\alpha \times DEFmax/(PY \times KX)\} \quad (3009)$$

wherein α is a predetermined coefficient. The values of α, DEFmin and DEF max are so determined that the limit shift amounts Lmin, Lmax obtained by the equation (3009) satisfy a condition −L1≦Lmin<Lmax≦L1. The limit defocus amounts DEFmin, DEF max may be fixed values. A step S3341 sets the initial area j$_{int}$ at 1 and the final area j$_{int}$ at 8, and a step S3345 calls the defocus amount calculating subroutine for determining the defocus amounts in the areas 1 to 8. Then a step S3350 discriminates whether the defocus amounts in the areas 1 to 8 are all undetectable, and, if the detection has been possible in at least an area, a step S3355 selects, among the detectable defocus amounts, the closest one as the defocus amount in the second focus detecting area. Then the sequence proceeds to the pursuit correction procedure.

In this case, instead of selecting the closest one, there may be selected the defocus amount with the smallest absolute value. Since the main object is often positioned in front, the defocus amount for the closest distance has a high probability that it corresponds to the main object. On the other hand, if there is selected the defocus amount of smallest absolute value, priority is given to an object to which the lens is presently focused, so that the lens is not too much moved and the driving operation becomes stabler. If the step S3350 identifies that the defocus amounts could not be detected in all the areas, a step S3360 identifies that the defocus amount is undetectable, and the sequence proceeds to the pursuit correction procedure.

Figure 59:
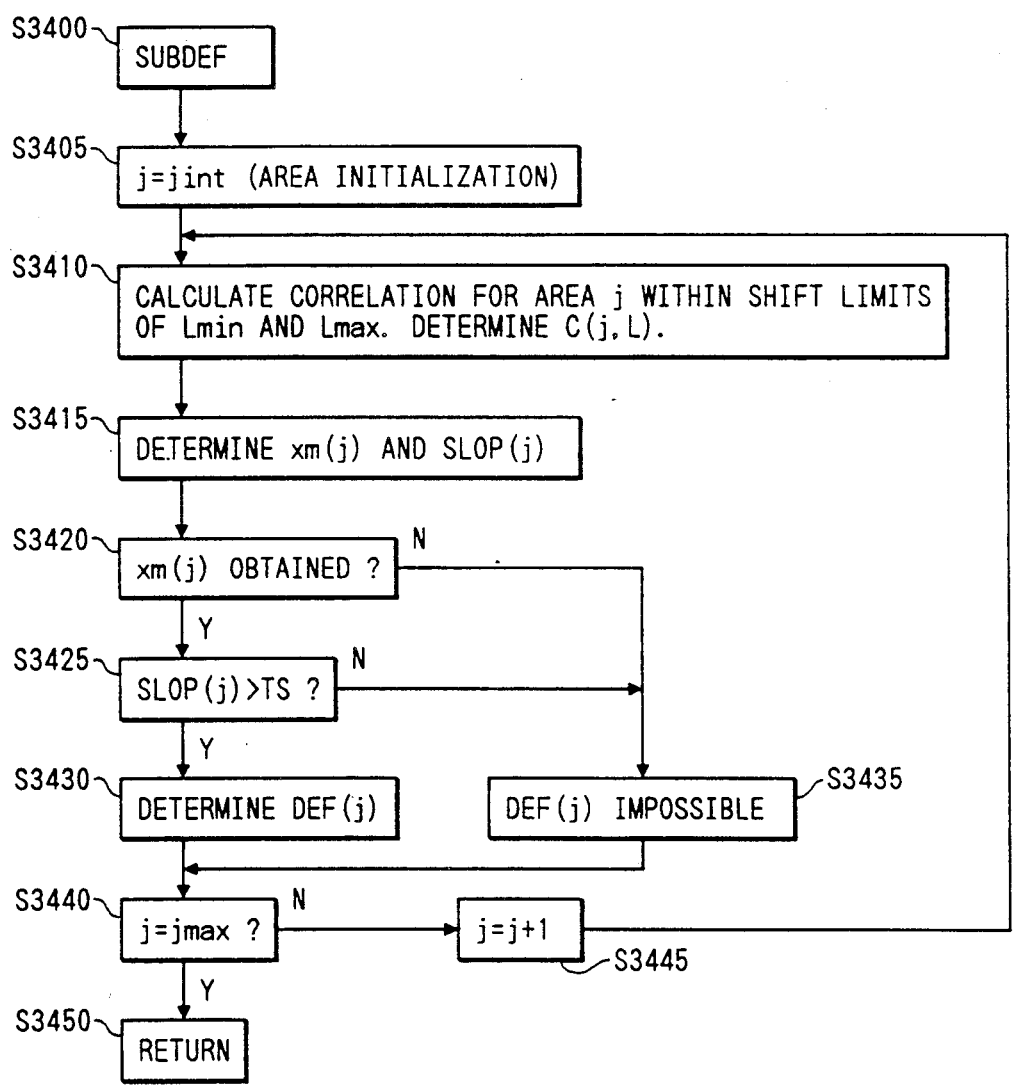

FIG. 59 is a flow chart of the defocus amount calculating subroutine SUBDEF.

When the subroutine is called in a step S3400, a step S3405 sets the area j at the initial area $j_{int}$. A step S3410 executes the correlation calculation in the area j with the limit shift amounts Lmin, Lmax to determine the correlation value C(j, L). Then a step S3415 determines Xm(j) and SLOP(j) by the three-point interpolation method. A step S3420 discriminates whether Xm(j) has been determined, and, if not, the sequence proceeds to a step S3435. If Xm(j) has been determined, a step S3425 discriminates whether SLOP(j) exceeds a predetermined value TS, and, if not, namely its reliability is low, the sequence proceeds to a step S3435. If the SLOP(j) exceeds TS in the step S3425, indicating a high reliability, a step S3430 determines the defocus amount DEF(j), and the sequence proceeds to a step S3440. If the sequence proceeds to the step S3435, this step identifies that the defocus amount is undetectable, and the sequence further proceeds to a step S3440. Step S3440 discriminates whether $j=j_{max}$ (area over) is satisfied, and, if not, a step S3445 changes the area by changing the value j to j+1. Then the sequence returns to the step S3410 for executing the correlation calculation in the next area. On the other hand, if the step S3440 identifies a condition $j=j_{max}$, the sequence proceeds to a step S3450 for terminating the subroutine.

Thus the defocus amount can be determined in the first or second focus detecting area as explained above.

In the foregoing description, a cross-shaped focus detecting area is divided into eight area as shown in FIG. 51 and the defocus amount is detected in each area, but the shape of the detecting area and the number of divisions are not limited to the example.

Pursuit Operation

In pursuing a moving object, the moving speed of the image of the object is detected from the defocus amounts at present and in the past, and the defocus amount for the moving object is thus corrected. The pursuing performance for the moving object can be further improved by combining the pursuit correction with the above-explained automatic switching of the focus detecting area.

The pursuit operation will be explained in the following with reference to FIG. 60.

Figure 60:
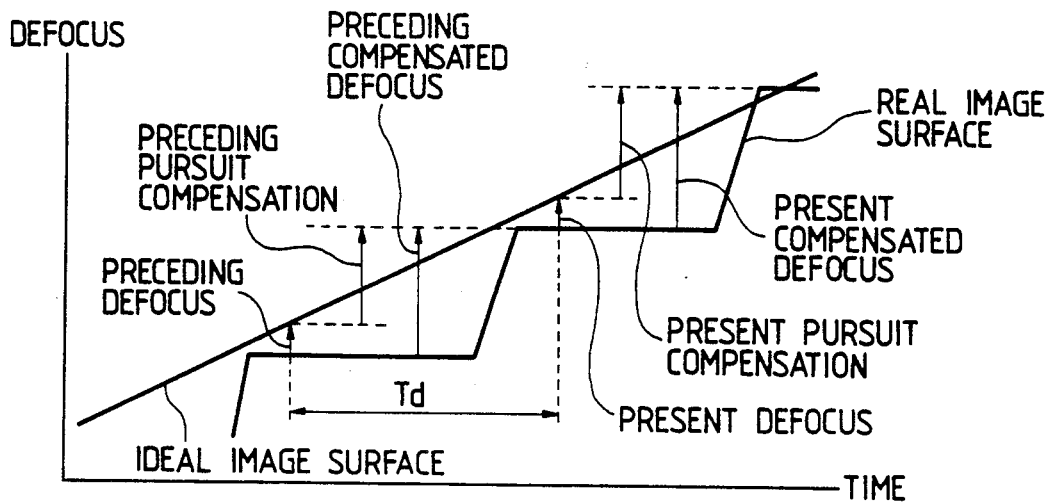

FIG. 60 shows the defocus amount in the ordinate, as a function of time in the abscissa. The trajectory of image plane resulting from the actual lens movement can be obtained by pursuing the ideal trajectory of image plane corresponding to a moving object so as to bring the detected defocus amount to zero. The actual trajectory of image plane shows steps because the focus detecting operation and the lens movement are divided in time, and the lens is stopped during the focus detecting operation. During the pursuit operation, the amount of lens movement is determined according to a corrected defocus amount obtained by adding a pursuit correction amount to the detected defocus amount. During a period Td between the present focus detection and the preceding focus detection, the defocus amount changes by the sum of the present defocus amount and the preceding pursuit correction amount. The moving speed of the image plane is represented by (present defocus amount+preceding pursuit correction amount)/Td.

Figure 61:
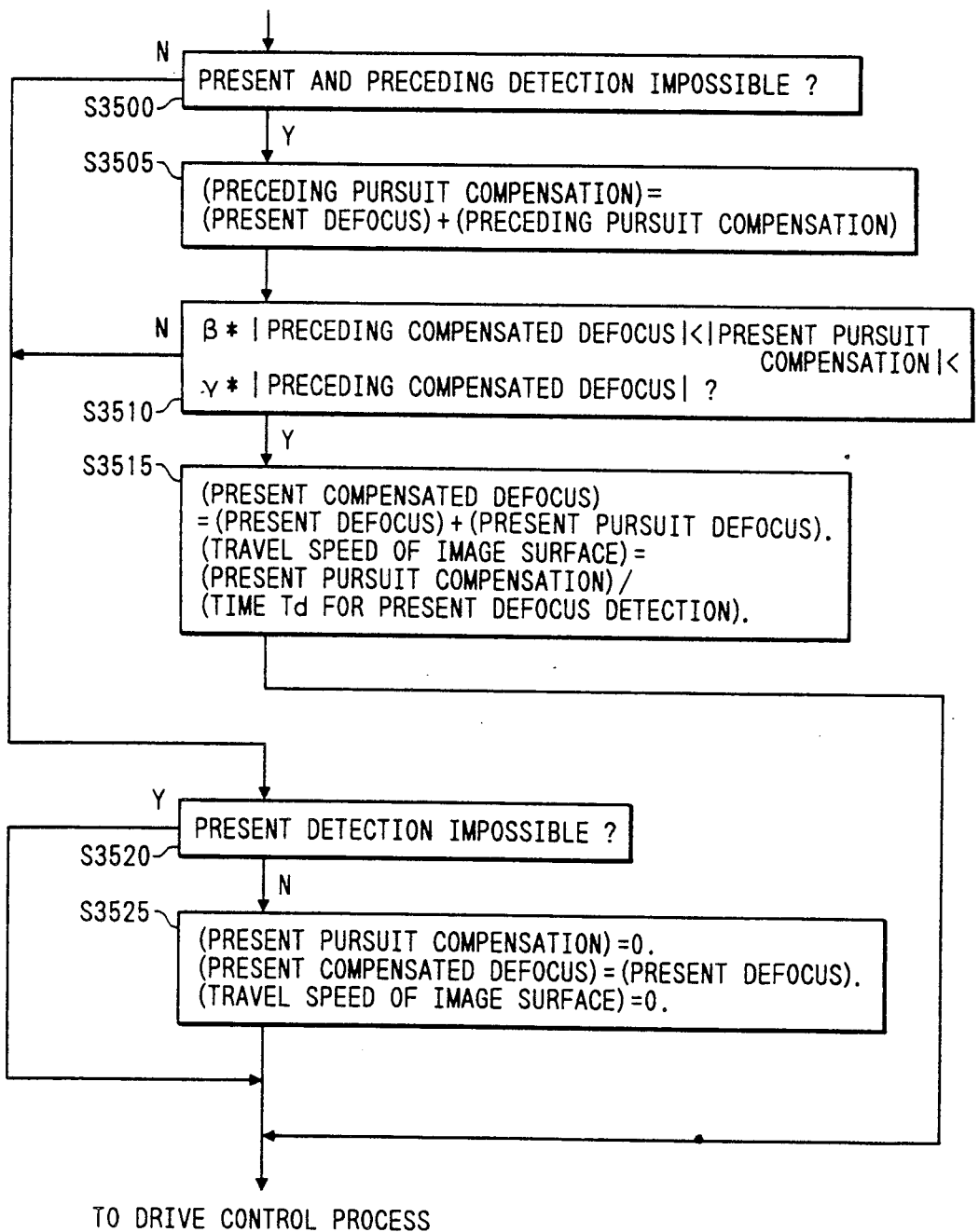

The details of such pursuit operation will be explained with reference to a flow chart shown in FIG. 61. At first a step S3500 discriminates whether the focus detection has been impossible for two consecutive times, and, if impossible, the sequence proceeds to a step S3520 without effecting the pursuit operation. If it was not impossible, a step S3505 calculates the present pursuit correction amount as the sum of the present defocus amount and the preceeing pursuit correction amount. When this step is executed for the first time after the start of power supply, the preceding pursuit correction amount is set as zero. A step S3510 then discriminates whether a condition $\beta \times |$preceding defocus amount$| < |$present pursuit correction amount$| < \gamma \times |$preceding corrected defocus amount$|$, and, if this condition is not satisfied, the object is identified as not moving and the sequence proceeds to a step S3520 without effecting the pursuit correction. If the condition is satisfied, the object is identified as moving and the sequence proceeds to a step S3515 for calculating the pursuit correction amount. $\beta$ is selected in a range 1/10 to 1/1.5, while $\gamma$ is selected in a range 1.5-10. If this step is executed for the first time after the start of power supply, the preceding corrected defocus amount is selected as zero. A step S3515 calculates the present corrected defocus amount as the sum of the present defocus amount and the present pursuit defocus amount, and the moving speed of image plane as the present pursuit correction amount divided by the present defocus detecting time Td, and the sequence proceeds to the next drive control procedure.

On the other hand, when the pursuit correction is not conducted, the step S3520 discriminates whether the focus detection of the present time has been impossible, and, if impossible, the sequence proceeds directly to the next drive control procedure. If it has been possible, 0 is stored as the present pursuit correction amount, the present defocus amount as the present corrected defocus amount, and 0 as the image plane moving speed, in preparation for the next pursuit operation, and the sequence proceeds to the next drive control procedure. Thus the corrected defocus amount becomes equal to the defocus amount when the pursuit correction is not conducted.

Range Limiting of Defocus Amount

When the second focus detecting system is selected, the defocus amount detecting range of the system, or the range of drive amount of the photographing lens is limited. Such limitation enables the camera to prevent the detection of objects other than the desired object, or to prevent the lens drive corresponding to such other objects even when they are detected.

The limit defocus amounts DEF min, DEF max may be selected as fixed values stored in a memory, or made manually adjustable by the photographer, or automatically selected for example according to the image magnification of the photographing optical system.

In the following there will be explained a case in which the limit values are set according to the image magnification.

Figure 62:
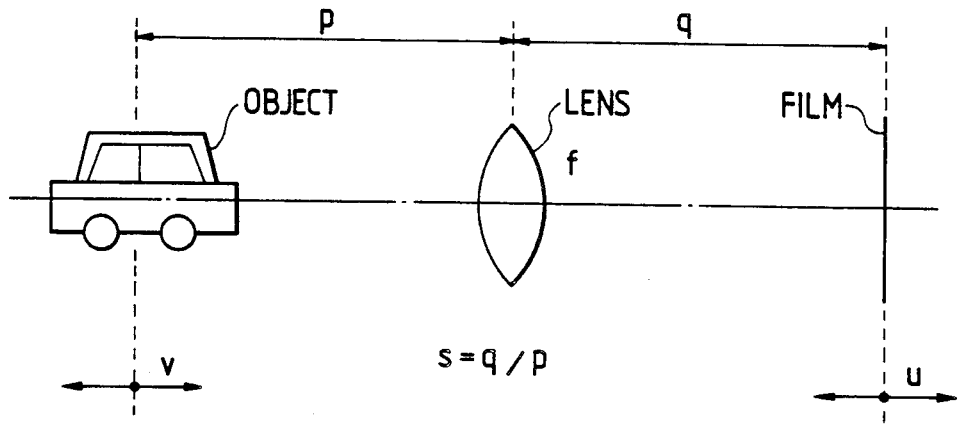

Now let us consider a fixed focus lens shown in FIG. 62.

The image magnification s can be represented as:

$$s = q/p = (q-f)/f \tag{3010}$$

wherein q is the absolute position of the focusing lens from the film plane, p is the distance from the lens to the object, and f is the focal length of the lens. The absolute position q can be detected by an absolute position encoder, or by up-down counting of relative position pulses generated by an encoder such as a photointerruptor with reference at the infinite distance. Also the detected defocus amount may be utilized to obtain the absolute position q focused to the object. In case of a zoom lens, the magnification s can be determined by taking the absolute position of the zoom lens into consideration. The upper limit speed of the object moving away from the lens and pursuable with auto focusing is represented by vf, and that of the object moving closer and pursuable with auto focusing is represented by vn, wherein the speed is taken as negative when the object moves away. Then the corresponding moving speeds of the image plane are represented by $uf = s \times vf$, $un = s \times vn$. The limit defocus amounts DEF min, DEF max can be represented as:

$$DEF\, min = c \times uf \times Tc$$

$$DEF\, max = c \times uf \times Tc \tag{3011}$$

wherein Tc is the cycle time of focus detection, and c is a coefficient.

In (3011), the time Tc may be selected as a fixed value, or may be an actually measured value. Also the upper limit speed v of the object need not necessarily be a fixed value, but may be manually adjusted by the photographer, or automatically selected for example according to the luminance of the object. Also in consideration of the calculated image plane moving speed Dv, there may be adopted the following equations:

$$DEF\, min = (c \times uf + Dv) \times Tc$$

$$DEF\, max = (c \times uv + Dv) \times Tc \tag{3012}$$

Also it is possible to add the calculated present pursuit correction amount to DEFmin in (3011).

Figure 63:
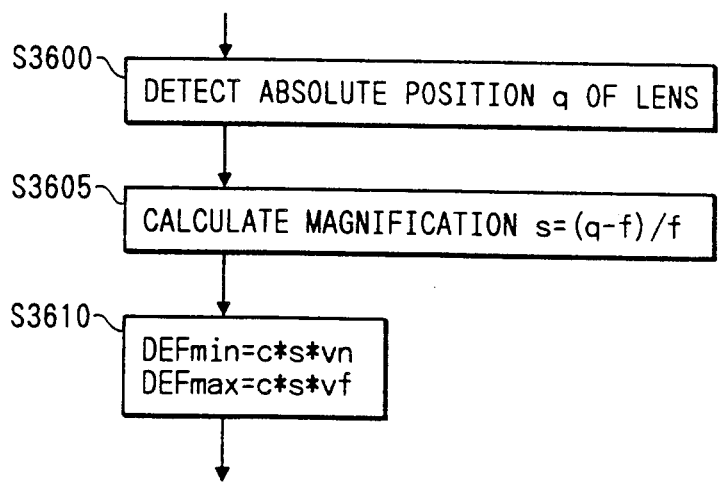
FIG. 63 is a flow chart therefor.

FIG. 63 is a flow chart for calculating such limited defocus amount.

At first a step S3600 detects the absolute position q of the lens, and a step S3605 calculates the magnification s from the absolute position q and the focal length f. Then a step S3610 calculates the limited defocus amounts DEFmin, DEFmax from the coefficient c, upper limit speeds vf, vn of the object and magnification s. The above-explained sequence is executed prior to the process for the second focus detecting system, or the process for the drive control means.

In the above-explained operation, the pursuit is made to a moving object because the detected defocus amount does not change rapidly, but pursuit is not made in case an unintended object enters in front of the main object, or in case the main object escapes from the focus detecting area momentarily, whereby the defocus amount shows an abrupt change.

Lens Drive Control

Now reference is made to a flow chart in FIG. 64, for explaining the lens drive control.

A step S3700 discriminates whether the present focus detection has not been possible, and, if impossible, the sequence proceeds to a drive end detecting procedure without effecting the lens drive. If the detection has been possible, a step S3705 discriminates whether an in-focus state has been reached at present. An in-focus state is identified by the facts that the absolute value of the present defocus amount is within a predetermined value and that the present pursuit correction value is zero. If such in-focus state is identified, the sequence proceeds to the drive end detecting procedure, without effecting the lens drive. If the in-focus state has not been reached, a step S3710 discriminates whether the second focus detecting system has been selected, and, if not, the sequence proceeds to a step S3720. If it has been selected, a step S3715 discriminates whether the present defocus amount is positioned between the limit defocus amounts DEFmin and DEFmax, and, if not, the sequence proceeds to the drive end detecting procedure without the lens drive. If affirmative, a step S3720 discriminates whether a pursuit operation is in progress (whether the present pursuit correction amount is 0), and, if not in progress, a step S3725 controls the lens position with a motor etc. according to the present defocus amount. Then the sequence proceeds to the drive, end detecting procedure. If the pursuit operation is in progress, a step S3730 controls the lens position according to the present corrected defocus amount, and the sequence then proceeds to the drive end detecting procedure.

As explained above, when the second focus detecting area is selected, the range of drivable defocus amount is limited. Consequently the lens is driven according to the detected defocus amount when it does not show a rapid change as in the case of movement of the main object, but the lens is not driven if the defocus amount shows an abrupt change as in the case in which an undesired object enters in front of the main object or in which the main object momentarily escapes from the focus detecting area. Consequently the main object can be maintained in focus.

In the above-explained embodiment, plural focus detecting areas are arranged in a cross shape as shown in FIG. 51, but the areas may be arranged in another shape or in a two-dimensional pattern. Also the present invention is not limited to the TTL focus detecting apparatus, but is likewise applicable to an external focus detecting apparatus. Also in the foregoing explanation, the first focus detecting area is selected by the half-push operation of the shutter release button, and the second focus detecting area is selected under various conditions, but such selection may be made by an exclusive operating button.

As explained in the foregoing, the third embodiment limits the detected defocus amount or the lens drive amount, in case the focus detection is conducted at first in a relatively narrow focus detecting area and then in a relative wide detecting area. Consequently, even if the second focus detecting area is selected while the main object can not be captured in the narrow first focus detecting area, the focus detection and auto focusing to the main object are made easier, so that the object can be arbitrarily selected. The above-mentioned advantages can be further amplified by selecting the wide focus detecting area only when the focusing is nearly completed in the narrow focus detecting area.

What is claimed is:

1. An automatic focus state detecting apparatus of a camera, comprising:
   focus state detecting means for effecting a focus state detection repeatedly, said focus state detecting means having a narrow focus state detecting area and a wide focus state detecting area;
   discrimination means responsive to successive focus state detections for discriminating whether an object to be photographed moves in a direction along the optic axis of a photographing lens; and
   selection means for causing said focus state detecting means to effect the focus state detection in said wide focus state detecting area when said discrimination means determines that the object moves in the direction along the optic axis of the photographing lens.

2. An apparatus according to claim 1, wherein said selection means is adapted, when said object is identified as not moving by said discrimination means, to cause said focus state detecting means to effect the focus state detection in said narrow focus state detecting area.

3. An apparatus according to claim 1 or 2, further comprising:
   manually actuated area mode selection means for causing said focus state detecting means to effect the focus state detection in said wide focus state detecting area or said narrow focus state detecting area.

4. An automatic focus state detecting apparatus of a camera, comprising:
   photoelectric conversion means for receiving light which is transmitted by a photographing lens from an object to be photographed and converting the received light into electrical signals in successive manner;
   defocus amount calculating means responsive to said electrical signals for calculating, in successive manner, a defocus amount with respect to the distance between a predetermined plane and an image of the object formed by the photographing lens;
   selection means for selecting either of a narrow focus state detecting area and a wide focus state detecting area, and causing said defocus amount calculating means to calculate said defocus amount on the basis of said electrical signals corresponding to the selected focus state detecting area; and
   discrimination means for discriminating whether an object to be photographed moves;
   wherein said selection means is adapted to select said wide focus state detecting area when said discriminating means determines that the object moves in a direction along the optic axis of the photographing lens.

5. An apparatus according to claim 4, wherein said selection means is adapted to automatically select said narrow focus state detecting area when said discrimination means determines that said object is stationary.

6. An apparatus according to claim 4 or 5, wherein said discrimination means is adapted to discriminate the movement of said object, based on said repetitively calculated defocus amounts.

7. An apparatus according to claim 4 or 5, further comprising:
   manually actuated area mode selection means for causing said defocus amount calculating means to effect the focus state detection on an object in said wide focus state detecting area or to effect the focus state detection on an object in said narrow focus state detecting area.

8. An automatic focus state detecting apparatus of a camera, comprising:
   photoelectric conversion means for receiving light which is transmitted by a photographing lens from an object to be photographed and converting the received light into electrical signals in successive manner;
   defocus amount calculating means responsive to said electrical signals for calculating, in successive manner, a defocus amount with respect to the distance between a predetermined plane and an image of the object formed by the photographing lens;
   discrimination means for discriminating, based on the successive calculated defocus amounts, whether an object to be photographed moves;
   selection means capable of selecting either of a narrow focus state detecting area and a wide focus state detecting area dependent upon discrimination by said discrimination means, and for causing said defocus amount calculating means to calculate said defocus amount on the basis of said electrical signals corresponding to the selected focus state detecting area;
   correction means responsive to said discrimination means for correcting the defocus amount to cause the photographing lens to pursue the movement of the object; and
   drive amount calculating means for calculating the drive amount of said photographing lens on the basis of the defocus amount corrected by said correction means.

9. An apparatus according to claim 8, wherein said selection means is adapted to cause said defocus amount calculating means to calculate the defocus amount on an object in said narrow focus state detecting area when said discrimination means determines that said object is stationary.

10. An apparatus according to claim 8 or 9, further comprising:
    manually actuated area mode selection means for causing said defocus amount calculating means to calculate the defocus amount on an object in said wide focus state detecting area or to calculate the defocus amount on an object in said narrow focus state detecting area.

11. An apparatus according to claim 8 or 9, wherein:
    said discrimination means is adapted to identify said object as moving when a change in the defocus amount successively calculated by said defocus amount calculating means exceeds a predetermined range; and
    said selection means is adapted, when said wide focus state detecting area is selected, to divide said wide focus state detecting area into plural small areas, to cause said defocus amount calculating means to calculate the defocus amount in each of said small areas, and to adopt a defocus amount with smallest absolute value from the calculated defocus amounts.

12. An apparatus according to claim 8 or 9, wherein said discrimination means is adapted to identify said object as moving, when a change in the defocus amount successively calculated by said defocus amount calculating means exceeds a predetermined range and when the camera is not in a continuous photographing operation.

13. An apparatus according to claim 8 or 9, further comprising focusing mode selection means for manually selecting whether or not to activate said discrimination means.

14. An apparatus according to claim 13, further comprising manually actuatable area mode selection means for causing said defocus amount calculating means to calculate the defocus amount for an object in said wide focus state detecting area or to calculate the defocus amount for an object in said narrow focus state detecting area, and wherein said focusing mode selection means is adapted, upon selecting a focusing mode to activate said discrimination means, to cause said defocus amount calculating means to calculate the defocus amount for an object in a focus state detecting area selected by said selection means according to the result of discrimination by said discrimination means, rather than in a focus state detecting area selected by said area mode selection means.

15. An apparatus according to claim 13, further comprising manually actuatable area mode selection means for causing said defocus amount calculating means to calculate the defocus amount for an object in said wide focus state detecting area or to calculate the defocus amount for an object in said narrow focus state detecting area, and wherein said focusing mode selection means is adapted, upon selecting a focusing mode not activating said discrimination means, to cause said defocus amount calculating means to calculate a defocus amount for an object in a focus state detecting area selected by said area mode selection means, rather than in a focus state detecting area selected by said selection means.

16. An automatic focus state detecting apparatus, comprising:
focus state detecting means capable of effecting focus state detection in each of plural focus state detecting areas of different sizes present in an object field;
displacement detection means for detecting the displacement of a photographing optical system in a direction crossing an optic axis of the photographing optical system or for detecting the relative displacement between the photographing optical system and the object in the direction crossing the optic axis of the photographing optical system, and
switching means for switching the focus state detection by said focus state detecting means between focus state detecting areas of different sizes, when the amount of displacement detected by said displacement detection means exceeds a predetermined value.

17. An apparatus according to claim 16, wherein said switching means is adapted, in response to a displacement detection by said displacement detection means, to switch a current focus state detecting area to a wider focus state detecting area.

18. An apparatus according to claim 16 or 17, wherein said focus state detection means comprises:

a focus state detecting optical system for forming an image of an object; and
photoelectric conversion means composed of plural photosensor elements and generating object image signals corresponding to the light intensity distribution of said object image in said plural focus state detecting areas;
wherein said focus state detecting means is adapted to effect the focus state detection by applying a predetermined calculation to said object image signals.

19. An apparatus according to claim 18, wherein said displacement detection means is adapted to detect the displacement by comparing the object image signals from said photoelectric conversion means at different times.

20. An apparatus according to claim 19, wherein said displacement detection means is adapted to detect the displacement by comparing said object image signals of different times by correlation calculation.

21. An apparatus according to claim 19, wherein:
said photoelectric conversion means comprises photosensor arrays arranged in two mutually perpendicular directions in the object field; and
said displacement detection means is adapted to detect the displacement in said two directions, based on the object image signals from said photosensor arrays.

22. An apparatus according to claim 16 or 17, further comprising:
a photographing optical system for forming an image of an object on a predetermined plane; and wherein said focus state detecting means comprises:
a focus state detecting optical system for forming an image of the object by a light beam transmitted by said photographing optical system; and
photoelectric conversion means composed of plural photosensor elements and adapted to generate object image signals corresponding to the light intensity distribution of said object image; and
wherein said focus state detecting means is adapted to detect the defocus amount of a current object image plane with respect to said predetermined plane, by applying a predetermined calculation to said object image signals.

23. An apparatus according to claim 22, wherein said displacement detection means is adapted to detect the displacement based on a change of said defocus amount with time.

24. An apparatus according to claim 23, wherein said displacement detection means detects the presence of displacement, after a defocus amount close to the in-focus state is obtained by said focus state detecting means, when the absolute value of the last mentioned defocus amount exceeds a predetermined value.

25. An apparatus according to claim 16 or 17, wherein said displacement detection means comprises a displacement sensor and is adapted to detect the displacement based on an output of said sensor.

26. An apparatus according to claim 25, wherein said displacement detection means is adapted to detect the displacement, based on the output of said sensor integrated over a predetermined time or during a focus state detecting cycle of said focus state detecting means.

27. An apparatus according to claim 16 or 17, wherein said displacement detection means is also adapted to detect the direction of the relative displacement between the photographing optical system and an object.

28. An apparatus according to claim 27, wherein said switching means is adapted to switch the focus state detection, according to the direction of displacement detected by said detection means.

29. An apparatus according to claim 28, wherein said focus state detection means comprises:
   a focus state detecting optical system for forming an image of an object; and
   photoelectric conversion means composed of plural photosensor elements and adapted for generating object image signal corresponding to the light intensity distribution of said object image in said plural focus state detecting areas;
   wherein said focus state detecting means is adapted to effect the focus state detection by applying a predetermined calculation to said object image signals; and
   said displacement detection means is adapted to detect the displacement and the direction thereof, based on the output of said photoelectric conversion means.

30. An apparatus according to claim 29 wherein:
   said photoelectric conversion means is a linear image sensor array having plural areas corresponding to said plural focus state detecting areas; and
   said displacement detection means is adapted to detect displacement along the direction of array of said image sensor array and to cause said switching means to switch between said areas of said image sensor array.

31. An apparatus according to claim 16 or 17, wherein said displacement detection means is adapted to detect the displacement in vertical and horizontal directions of the object field.

32. An automatic focus state detecting apparatus, comprising:
   focus state detecting means comprising a first photoelectric converting element array composed of plural photoelectric converting elements arranged along a particular direction, and a second photoelectric converting element array composed of plural photoelectric converting elements arranged along a direction different from said particular direction, and adapted to effect focus state detection by detecting the position of object images on said first or second photoelectric converting element array;
   displacement detecting means for detecting displacement of the automatic focus state detecting apparatus in a direction crossing an optic axis of a photographing lens or for detecting the relative displacement between said focus state detecting apparatus and the object in the direction crossing the optic axis of the photographing lens; and
   selection means for selecting either of outputs of said first photoelectric element array or outputs of said second photoelectric element array according to a detection output of said displacement detecting means, and causing said focus state detecting means to effect focus state detection with respect to the selected outputs.

33. An apparatus according to claim 32, wherein said displacement detecting means is adapted to detect the displacement of said automatic focus state detecting apparatus itself or the relative displacement between said focus state detecting apparatus and the object, based on the outputs of said first and second photoelectric converting element arrays.

34. An apparatus according to claim 32 or 33, wherein said selection means is adapted, based on the output of said displacement detecting means, to select the outputs of one of said first and second photoelectric converting element arrays, in which the displacement of an object image is smaller.

35. An apparatus according to claim 32, wherein said particular direction and said different direction are mutually perpendicular.

36. An automatic focus state detecting apparatus of a camera, comprising:
   a photographing optical system for forming an image of an object to be photographed;
   focus state detecting means for calculating a defocus amount of the image with respect to a predetermined plane, said focus state detecting means having a first focus state detecting area and a second focus state detecting area which is wider than said first focus state detecting area;
   selection means for selecting either of said first and second focus state detecting areas for focus state detection by said focus state detecting means;
   drive means for driving said photographing optical system on the basis of said defocus amount; and
   limiting means for limiting the defocus amount to be detected or the drive amount of said photographing optical system when said second focus state detecting area is selected.

37. An apparatus according to claim 36, wherein said limiting means has detecting means for detecting that said defocus amount is outside a predetermined range and generating a detection signal, and means for inhibiting said drive means from driving said photographing optical system in response to said detection signal.

38. An apparatus according to claim 36, wherein said drive means calculates the driving amount of said photographing optical system on the basis of said defocus amount and drives said photographing optical system in accordance with said calculated driving amount, wherein said limiting means has detecting means for detecting that said calculated driving amount is outside a predetermined range and generating a detection signal, and means for inhibiting said drive means from driving said photographing optical system in response to said detection signal.

39. An apparatus according to claim 36, wherein said focus state detecting means has first and second image sensor means and correlation calculation means for performing a correlation calculation between outputs of said first and said second image sensor means on the basis of a predetermined image shift range, and wherein said limiting means changes said predetermined shift range so that said predetermined shift range for said second focus state detecting area is narrower than that for said first focus state detecting area.

40. An automatic focus state detecting apparatus of a camera, comprising:
   a photographing optical system for forming an image of an object to be photographed;
   drive means for driving said photographing optical system;
   focus state detecting means for detecting a defocus amount of the image with respect to a predetermined plane, said focus state detecting means having a first focus state detecting area and a second focus state detecting area which is wider than said first focus state detecting area;

discrimination means for discriminating, based on said defocus amount, that said photographing optical system is within a predetermined range including an in-focus position and generating a discrimination signal;

selection means for selecting said second focus state detecting area for focus state detection in response to said discrimination signal; and drive control means for controlling said drive means on the basis of said defocus amount.

41. An automatic focus state detecting apparatus of a camera, comprising:

a photographing optical system for forming an image of an object to be photographed;

drive means for driving said photographing optical system;

focus state detecting means for detecting a defocus amount of the image with respect to a predetermined plane, said focus state detecting means having a first focus state detecting area and a second focus state detecting area which is wider than said first focus state detecting area;

selection means for selecting said second focus state detecting area for focus state detection after the lapse of a predetermined time from selection of said first focus state detecting area for focus state detection; and drive control means for controlling said drive means on the basis of said defocus amount.

42. An apparatus according to claim 41, wherein said selection means is adapted to select said second focus state detecting area if the detection of the defocus amount by said focus state detecting means is not possible before the lapse of said predetermined time.

43. An apparatus according to claim 41, wherein said predetermined time is variable.

44. An automatic focus state detecting apparatus of a camera, comprising:

a photographing optical system for forming an image of an object to be photographed;

drive means for driving said photographing optical system;

focus state detecting means for repeatedly detecting a defocus amount of the image with respect to a predetermined plane, said focus state detecting means having a first focus state detecting area and a second focus state detecting area which is wider than said first focus state detecting area;

selection means for selecting said second focus state detecting area for focus state detection after a predetermined number of focus state detections in said first focus state detecting area only; and drive control means for controlling said drive means on the basis of said defocus amount.

45. An apparatus according to claim 44, wherein said selection means is adapted to select said second focus state detecting area if the detection of the defocus amount by said focus state detecting means is not possible, even before the completion of focus state detections of said predetermined number.

46. An apparatus according to claim 44, wherein said predetermined number is variable.

47. An apparatus according to claim 40, 41, or 44, further comprising limiting means for limiting the defocus amount to be detected or the drive amount of the photographing optical system, when said second focus state detecting area is selected by said selection means.

48. An apparatus according to claim 47, wherein said limiting means is adapted to vary said defocus amount or said drive amount, according to photographing image magnification.

49. An apparatus according to claim 40, 41 or 44, wherein said selection means is adapted to select the first focus state detecting area immediately after transition from an unoperated state to a preparatory state of a releasing member which can assume at least an unoperated state, a preparatory state and a releasing state.

50. An automatic focus state detecting apparatus of a camera, comprising:

focus state detecting means for effecting a focus state detection repeatedly, said focus state detecting means having a narrow focus state detecting area and a wide focus state detecting area;

displacement detection means for detecting the displacement of a photographing optical system in a direction crossing an optic axis of the photographing optical system or detecting the relative displacement between the photographing optical system and the object in the direction crossing the optical axis of the photographing optical system; and means for causing said focus state detecting means to effect the focus state detection in said wide focus state detecting area when said displacement detecting means detects the displacement of the photographing optical system or the relative displacement between the photographing optical system and the object in the direction crossing the optic axis of the photographing optical system.

51. An automatic focus state detecting apparatus, comprising:

focus state detecting means capable of effecting focus state detection in each of plural focus state detecting areas of different sizes present in an object field;

displacement detection means for detecting the displacement of a photographing optical system in a direction crossing an optic axis of the photographing optical system or for detecting the relative displacement between the photographing optical system and the object in the direction crossing the optic axis of the photographing optical system, and switching means for switching the focus state detection by said focus state detecting means between focus state detecting areas of different sizes, according to the result of displacement detection by said displacement detection means, wherein said switching means is adapted in response to a displacement detection by said displacement detection means, to switch a current focus state detecting area to a wider focus state detecting area.

* * * * *